METHOD AND APPARATUS FOR MAGNETIC CURRENCY DETECTORS

Original Filed Oct. 27, 1959 12 Sheets-Sheet 1

INVENTORS
THEODORE H. SMITH
SIGMUND KRAMER
DONALD M. DANKO
BY Roy Eilers ATTY.

METHOD AND APPARATUS FOR MAGNETIC CURRENCY DETECTORS

INVENTORS
THEODORE H. SMITH
SIGMUND KRAMER
DONALD M. DANKO
BY Roy Eilers ATTY.

April 12, 1966 T. H. SMITH ETAL 3,245,534

METHOD AND APPARATUS FOR MAGNETIC CURRENCY DETECTORS

Original Filed Oct. 27, 1959 12 Sheets-Sheet 3

INVENTORS
THEODORE H. SMITH
SIGMUND KRAMER
DONALD M. DANKO
BY Roy Eilers ATTY.

METHOD AND APPARATUS FOR MAGNETIC CURRENCY DETECTORS

Original Filed Oct. 27, 1959 12 Sheets-Sheet 4

INVENTORS
THEODORE H. SMITH
SIGMUND KRAMER
DONALD M. DANKO
BY Roy Eilers ATTY.

METHOD AND APPARATUS FOR MAGNETIC CURRENCY DETECTORS

Original Filed Oct. 27, 1959

INVENTORS
THEODORE H. SMITH
SIGMUND KRAMER
DONALD M. DANKO
BY Roy Eilers ATTY.

METHOD AND APPARATUS FOR MAGNETIC CURRENCY DETECTORS

Original Filed Oct. 27, 1959

12 Sheets-Sheet 6

INVENTORS
THEODORE H. SMITH
SIGMUND KRAMER
DONALD M. DANKO
BY Roy Eilers ATTY.

April 12, 1966 T. H. SMITH ETAL 3,245,534

METHOD AND APPARATUS FOR MAGNETIC CURRENCY DETECTORS

Original Filed Oct. 27, 1959 12 Sheets-Sheet 7

INVENTORS
THEODORE H. SMITH
SIGMUND KRAMER
DONALD M. DANKO
BY Roy Eilers ATTY.

INVENTORS
THEODORE H. SMITH
SIGMUND KRAMER
DONALD M. DANKO
BY Roy Eilers ATTY.

METHOD AND APPARATUS FOR MAGNETIC CURRENCY DETECTORS

Original Filed Oct. 27, 1959 12 Sheets-Sheet 9

INVENTORS
THEODORE H. SMITH
SIGMUND KRAMER
DONALD M. DANKO
BY Roy Eilers ATTY.

April 12, 1966 T. H. SMITH ETAL 3,245,534

METHOD AND APPARATUS FOR MAGNETIC CURRENCY DETECTORS

Original Filed Oct. 27, 1959 12 Sheets-Sheet 10

INVENTORS
THEODORE H. SMITH
SIGMUND KRAMER
DONALD M. DANKO
BY Roy Eilers ATTY.

April 12, 1966 T. H. SMITH ETAL 3,245,534

METHOD AND APPARATUS FOR MAGNETIC CURRENCY DETECTORS

Original Filed Oct. 27, 1959 12 Sheets-Sheet 11

INVENTORS
THEODORE H. SMITH
SIGMUND KRAMER
DONALD M. DANKO
BY Roy Eilers ATTY.

METHOD AND APPARATUS FOR MAGNETIC CURRENCY DETECTORS

INVENTORS
THEODORE H. SMITH
SIGMUND KRAMER
DONALD M. DANKO
BY Roy Eilers ATTY.

United States Patent Office 3,245,534
Patented Apr. 12, 1966

3,245,534

METHOD AND APPARATUS FOR MAGNETIC CURRENCY DETECTORS

Theodore H. Smith, Dunedin, and Sigmund Kramer, Orlando, Fla., and Donald M. Danko, Cleveland, Ohio, assignors to National Rejectors, Inc., St. Louis, Mo., a corporation of Missouri Continuation of application Ser. No. 849,066, Oct. 27, 1959. This application Oct. 14, 1963, Ser. No. 317,103
25 Claims. (Cl. 209—111.8)

This invention, which is a continuation of application Serial No. 849,066, filed Oct. 27, 1959, now abandoned, relates to improvements in currency detectors. More particularly, this invention relates to improvements in methods and apparatus for identifying authentic paper currency.

It is, therefore, an object of the present invention to provide an improved method and apparatus for identifying authentic paper currency.

For a number of years, the merchandise vending machine industry has felt the need of methods and apparatus for identifying authentic paper currency and for separating that currency from spurious paper currency. Until such methods and apparatus become commercially available, the price ranges of the articles that can be vended by merchandise vending machines will necessarily be somewhat limited. In recognization of this long-standing need, a number of devices have been proposed; and some of those devices have been built. However, none of those devices, for identifying authentic paper currency and for separating that currency from spurious paper currency, has proven to be commercially acceptable. Some of those devices were unduly large and bulky, others were unduly complex and costly, and still others failed to provide sufficiently precise and accurate identification of the authentic paper currency. For these various reasons, prior devices for the identification of authentic paper currency and for the separation of that currency from spurious paper currency have been found to be objectionable. The present invention obviates these objections by providing apparatus that can identify authentic paper currency and separate that currency from spurious paper currency, and that is compact and simple and that precisely and effectively identifies authentic paper currency.

Most of the prior devices for the identification of authentic paper currency and for the separation of that currency from spurious paper currency utilized optical methods. Specifically, most of those devices illuminated an inserted bill and then compared predetermined portions of that bill with a standard. The optical methods utilized by those devices kept those devices from being as effective in testing worn paper currency as they were in testing fresh paper currency, because worn paper currency usually is dirty and has less contrast than does fresh paper currency. Moreover, worn paper currency is usually wrinkled, and the presence of wrinkles can adversely affect the operation of devices utilizing optical methods. In addition, the optical methods can be adversely affected by aging of the lamps used to illuminate the inserted bills; and those methods can be adversely affected by the memory characteristics of the photoelectric cells employed in carrying out those methods. Furthermore, the optical methods may become even less efficient where the atmosphere tends to become dirty, smoky, or foggy. For these various reasons, devices that utilize optical methods for identifying authentic paper currency and for separating that currency from spurious paper currency are objectionable. The present invention obviates these objections by utilizing a magnetic method of identifying authentic paper currency and for separating that currency from spurious paper currency. Such a method permits precise and accurate identification of authentic paper currency irrespective of the cleanliness or lack of cleanliness of that currency and irrespective of the absence or presence of wrinkles. Moreover, that method is not subject to the problems inherent in the aging of lamps or in the memory characteristics of photoelectric cells. Also, dirty, smoky or foggy atmospheres will not reduce the efficiency of that method. It is, therefore, an object of the present invention to provide a magnetic method of identifying authentic paper currency and of separating that currency from spurious paper currency.

Traditionally, certain portions of the paper currency of the United States of America are printed with ink that has magnetic properties. The present invention utilizes the magnetic properties of the ink on those portions of the paper currency to generate signals and then uses those signals to cause the paper currency to be accepted. The present invention does this by causing relative movement between those portions of the paper currency and a magnetic head; that relative movement causing the ink on those portions of the paper currency to vary the magnetic reluctance of that magnetic head. That variance, in the magnetic reluctance of that magnetic head, causes the coil or coils on that head to experience minute voltage variations. Those minute voltage variations are amplified and used to cause the paper currency to be accepted. It is, therefore, an object of the present invention to provide relative movement between a bill and a magnetic head to vary the magnetic reluctance of that head and thereby cause the coil or coils on that head to experience voltage variations.

Each different denomination of paper currency of the United States of America has a distinctive portrait thereon, and each of those portraits is set off against a background of darker tone. Those backgrounds are actually grids formed from fine, black, vertical and horizontal lines; and those lines are usually formed from ink having magnetic properties. The vertical and horizontal lines of those grids are spaced apart predetermined distances; and, therefore, when relative movement between a bill and a magnetic head is effected at a predetermined rate, in a direction perpendicular to the vertical lines or to the horizontal lines, the voltage of the coil or coils of the magnetic head will vary at a predetermined rate. The grid lines have predetermined widths; and those widths coact with the relative movement at the predetermined rate to predetermine the durations of the voltage variations. The voltage variations thus vary at a predetermined rate, and they have predetermined durations; and those voltage variations will be introduced into a tuned amplifier which can respond to those voltage variations to cause the bill to be accepted. Such an arrangement is very desirable because it provides a direct and immediate testing of a bill and obviates all need of a negative, of a record, or some other simulation of portions of a standard bill. Further, such an arrangement obviates all of the problems, costs, and uncertainties inherent in trying to align and register an inserted bill with a negative, a record or some other simulation of portions of a standard bill. It is, therefore, an object of the present invention to provide relative movement between the grid lines in the portrait background of a bill and a magnetic head to obtain voltage variations in the coil or coils of said head and to use those voltage variations to cause that bill to be accepted.

The magnetic properties of the ink used in engraving the grid lines in the portrait backgrounds of currency of the United States of America are quite limited; and, consequently, the voltage variations that are obtainable by the magnetic sensing of those grid lines necessarily have low signal-to-noise ratios. This means that thermionic emission, transients and other noise can produce voltage variations that can simulate the voltage variations generated by relative movement between the grid lines, in the portrait background of a bill, and the air gap of a magnetic head. Because the magnetic properties of the ink used in engraving the portrait backgrounds of currency of the United States of America are wholly and completely beyond the control of manufacturers of currency detectors, there are positive limits to the signal-to-noise ratios of the voltage variations generated by the grid lines in the portrait backgrounds of bills. As a result, the problem of discriminating between voltage variations due to the grid lines and voltage variations due to noise is critical. For example, it would be impractical to base the acceptance or rejection of an inserted bill on the mere counting of a predetermined number of voltage variations as the portrait background of that bill moved past the air gap of the magnetic head, because a sizable and unpredictable proportion of those voltage variations could be due to noise rather than to grid lines. Further, it would not be satisfactory to base the acceptance or rejection of an inserted bill on the repetition rates of the leading and trailing edges of the grid lines because voltage variations due to noise could occasionally have those repetition rates. To be truly satisfactory, the acceptance or rejection of an inserted bill should be based upon the phase and the duration, as well as the repetition rate, of the voltage variations experienced as the portrait background of a bill is moved past the air gap of a magnetic head. The present invention bases the acceptance or rejection of an inserted bill upon the phase and duration and the repetition rate of the voltage variations experienced as the portrait background of a bill is moved past the air gap of a magnetic head; and, in doing so, that invention provides reliable identification of authentic currency and reliable rejection of spurious currency.

The present invention provides bill transports that hold the inserted bill immediately adjacent the magnetic head throughout the time the portrait and the background for the portrait (and the background for the portrait) are in register with that head. The portion of the background between the leading edge of the portrait frame and the leading edge of the portrait will enable the tuned amplifier to provide one validating signal, and the portion of the background between the trailing edge of the portrait and the trailing edge of the portrait frame will enable that amplifier to provide a second validating signal. Those two validating signals will then be used to cause acceptance of the inserted bill. By requiring two separate and distinct validating signals from each inserted bill, the present invention prevents the acceptance of spurious bills which might provide one validating signal, but could not provide two separate and distinct validating signals. Also, by obtaining one validating signal from the right-hand half of the inserted bill and by obtaining the other validating signal from the left-hand half of that bill, the present invention avoids the acceptance of authentic bills that have been cut or split along their transversely extending center lines. It is, therefore, an object of the present invention to obtain one validating signal from the portion of the background intermediate the leading edge of the portrait frame and the leading edge of the portrait of a bill and to obtain a second validating signal from the portion of the background intermediate the trailing edge of the portrait and the trailing edge of the portrait frame of that bill.

Many persons fold their paper currency along the longitudinally extending center lines of that paper currency. Where paper currency is repeatedly subjected to such folding, the longitudinally extending center lines of that paper currency can become worn and frayed; and some of the ink at those center lines can be rubbed off and lost. The present invention avoids any rejection of authentic paper currency, that might arise because of the loss of ink at the longitudinally extending center lines of that paper currency, by mounting the magnetic head in register with portions of the paper currency that are offset laterally from the longitudinally extending center lines of such paper currency. It is, therefore, an object of the present invention to mount the magnetic head in register with portions of the paper currency that are offset laterally from the longitudinally extending center lines of that paper currency.

The portions of the backgrounds that are at opposite sides of the portraits on paper currency are not uniform in width. Those variations in width are due to the fact that the backgrounds are ovate, to the fact that the portraits are not "full face," and to the fact that artistic considerations made width variations desirable. Those width variations keep the total number of vertical or horizontal grid lines in the oppositely disposed portions of the backgrounds for the portraits of bills from being uniform; and, hence, those width variations make it impossible to obtain accurate and precise validating signals from those oppositely disposed portions of the backgrounds for the portraits merely by adding up the total number of vertical or horizontal grid lines in those oppositely disposed portions. This would be the case even if the magnetic head were in register with the longitudinally extending or the transversely extending center line of the inserted bill; but it is even more the case where the magnetic head is set in register with portions of the inserted bill that are laterally offset from the longitudinally extending or the transversely extending center line of the bill and where the bill must be tested with its portrait either upright or inverted.

The preferred embodiments of the present invention make it possible to mount the magnetic head in register with portions of the inserted bill that are laterally offset from the longitudinally extending center line of that bill, and make it possible to obtain two accurate and precise validating signals from the oppositely disposed portions of the background for the portrait of that bill whether that bill is inserted with its portrait upright or inverted; and they do so by responding to the phase, duration and repetition rate, rather than to the total number, of the voltage variations due to the vertical grid lines in the oppositely disposed portions of the background for the portrait. such an arrangement is desirable because it keeps errors in the registry of the printed area of the bill with the perimeter of the bill, due to errors in the printing or cutting of the bill, from interfering with the generation of the required validating signals. Further, such an arrangement is desirable because it enables the required validating signals to be generated by authentic bills that are not held precisely parallel to the path of movement of those bills, but, instead, are slightly skewed. It is, therefore, an object of the present invention to test for the phase, duration and repetition rate, rather than for the total number of the voltage variations due to the grid lines in the oppositely disposed portions of the backgrounds for the portraits of paper currency.

The voltage variations generated by the vertical or horizontal grid lines in the oppositely disposed portions of the backgrounds for the portrait of a bill can be fed into a tuned amplifier that will amplify them and then use them to trigger a threshold-type control element to provide validating signals. The tuned amplifier will be set to respond to a number of voltage variations that is slightly less than the minimum number of grid lines that will pass by the magnetic head as the narrower of the oppositely disposed portions of the background for the portrait passes by that magnetic head. Consequently, each of the oppositely disposed portions of the background for the portrait will be able to generate a validating signal. The use of a threshold-type control element is desirable because once such a control element has been triggered, it cannot restore itself as long as it continues to receive amplified voltage variations. However, the nonreceipt of amplified voltage variations, when the portrait passes by the magnetic head, will allow the control element to restore itself. This means that if either of the backgrounds for the portrait has more grid lines than are needed to trigger the threshold-type control element, the additional grid lines will not be able to cause that control element to provide a second validating signal. Consequently, the present invention is able to obtain one, and only one, validating signal from each of the oppositely disposed portions of the background for the portrait on an inserted bill. It is, therefore, an object of the present invention to feed the voltage variations, obtained by the passage of an inserted bill, into a tuned amplifier that will trigger a threshold-type control element to provide one, and only one, validating signal from each of the oppositely disposed portions of the background for the portrait on an inserted bill.

The preferred form of tuned amplifier provided by the present invention includes a resonant circuit; and that amplifier amplifies the voltage variations obtained from the magnetic head, responds to those amplified voltage variations to provide quantums of energy, limits the maximum quantitative value of each quantum of energy, and then introduces those quantums of energy into the said resonant circuit without appreciably loading that resonant circuit. If the phase and repetition rate of those quantums of energy substantially coincide with those of the characteristic wave form of said resonant circuit, and if the duration of those quantums of energy are such that the energy in each of those quantums of energy is slightly greater than the losses of said resonant circuit at some predetermined current value of said resonant circuit, and if enough of those quantums of energy are introduced within a predetermined period of time, the value of the voltage across a predetermined part of said resonant circuit will gradually increase to a point at which a threshold-type control element will become actuated. The limiting of the maximum quantitative value of each quantum of energy coacts with the requirement that the repetition rate and the phase of those quantums of energy substantially coincide with those of the characteristic wave form of said resonant circuit and with the further requirement that the durations of those quantums of energy be such that the energy in each of those quantums of energy slightly exceed the losses of said resonant circuit at some predetermined current value of said resonant circuit, to enable said resonant circuit to interact with the control element to pass a certain band of frequencies and to provide virtually infinite rejection of all other frequencies. This is very desirable because it enables the currency detector provided by the present invention to reject spurious paper currency that is printed with magnetic ink, but that does not provide voltage variations which have the requisite phase, duration and repetition rate. It is, therefore, an object of the present invention to provide a tuned amplifier that has a resonant circuit and that amplifies voltage variations, responds to those amplified voltage variations to provide quantums of energy, limits the maximum quantitative value of each quantum of energy, and then introduces those quantums of energy into said resonant circuit, without appreciably loading that resonant circuit, to enable said resonant circuit to operate a control element.

The low signal-to-noise levels of the voltage variations, generated when the inserted bill is moved past the air gap of the magnetic head, make it necessary to base the identification of authentic paper currency on the checking of a large number of grid lines. If the identification of authentic paper currency were to be based upon the checking of just three, four or five grid lines, three, four or five voltage variations due to noise could cause the acceptance of spurious paper currency. Any such acceptance of spurious paper currency would be objectionable, and it is avoided in the present invention by basing the identification of authentic paper currency on the checking of a large number of grid lines. Thus, the present invention bases the identification of authentic paper currency upon the checking of a minimum of twelve grid lines; six of those grid lines being intermediate the leading edge of the background frame and the leading edge of the portrait, and the other six grid lines being intermediate the trailing edge of the portrait and the trailing edge of the background frame. It is, therefore, an object of the present invention to provide a currency detector that bases the identification of authentic paper currency upon the checking of a minimum of twelve grid lines in the portrait backgrounds of inserted bills.

To keep the voltage variations generated by one, two, three, four or five grid lines from effecting the actuation of the control element, the present invention limits the maximum amplitude of all voltage variations generated as the inserted bill passes the air gap of the magnetic head. As a result, the resonant circuit cannot experience a rapid rise of voltage that would trigger the control element. Instead, the resonant circuit must experience a controlled cumulative voltage growth as the six or more voltage variations from the six or more grid lines are introduced into the resonant circuit. In this way, full checking of six or more grid lines is attained and definite identification of authentic paper currency results. It is, therefore, an object of the present invention to provide a tuned amplifier that limits the maximum amplitude of the voltage variations being translated thereby and that introduces those limited voltage variations into a resonant circuit to effect a controlled cumulative voltage in that resonant circuit.

It is important and desirable to be able to pass a certain band of frequencies and to reject all other frequencies. It is even more important to be able to pass a certain band of frequencies and to provide virtually infinite rejection of all other frequencies. Where this is done, more of the frequency spectrum can be utilized effectively because less of that frequency spectrum is needed to space apart the various bands of frequencies. The present invention makes it possible to pass a certain band of frequencies and to provide virtually infinite rejection of all other frequencies; and it is, therefore, an object of the present invention to pass a certain band of frequencies and to provide virtually infinite rejection of all other frequencies.

The present invention is enabled to pass a certain band of frequencies and to provide virtually infinite rejection of all other frequencies by providing a resonant circuit, by providing a control element that has a high threshold value, and by introducing energy into said resonant circuit, which has a maximum quantitative value that does not exceed a predetermined value, which has a quantitative value that is slightly greater than the losses of said resonant circuit at some predetermined current value of said resonant circuit, which has a repetition rate and phase substantially coincident with those of the characteristic wave form of said resonant circuit, and which is supplied in sufficient quantity within a predetermined period of time to enable the voltage across a predetermined part of said resonant circuit to rise to a point where said control element will operate. That energy can be in the form of a generated wave form, a modulation, or voltage variations. Where that energy is initially formed in such a way that its quantitative value is within the required limits, neither limiting nor amplification of that energy will be required; but where that energy is not initially formed in such a way that its quantitative value is within the said limits, limiting or amplification will be provided as required. In each case, the said resonant circuit will, if the energy has the required quantitative value and has the required repetition rate and phase, and if sufficient quantities of that energy are introduced within a predetermined period of time, experience a sufficient increase in the voltage across a predetermined part thereof to operate the control element. It is therefore, an object of the present invention to provide a resonant circuit, to provide a control element that has a high threshold value, and to introduce energy, into said resonant circuit, which has a maximum quantitative value that does not exceed a predetermined value which has a quantitative value that is slightly greater than the losses of said resonant circuit at a predetermined current value of said resonant circuit, which has a repetition rate and phase substantially coincident with those of said resonant circuit, and which is supplied in suffiicent quantity within a predetermined period of time to enable the voltage across a predetermined part of said resonant circuit to rise to a point where said control element will operate.

The grids in the portrait backgrounds of the paper currency of the United States of America vary slightly with the denomination of that paper currency. By properly adjusting the tuned amplifier of the present invention, it is possible to differentiate between authentic one dollar bills and authentic bills of the United States of America having different denominations. As a result, the currency detector of the present invention cannot only distinguish between spurious paper currency and authentic paper currency, but it can also differentiate between authentic paper currency having different denominations. It is, therefore, an object of the present invention to provide a currency detector that can differentiate between authentic paper currency having different denominations.

The authentic paper currency of the United States of America usually has a green ink face and a black ink face; and it is the ink in the black ink face that is magnetic. The magnetic properties of the ink in the black ink faces of paper currency of the United States of America are so limited that those faces must intimately abut the air gap of the magnetic head. It is usually possible, by means of suitable operating instructions, to cause the persons inserting bills in the currency detector of the present invention to place those bills with the black ink faces up; and those black ink faces will then be moved into intimate engagement with the air gap of a magnetic head. Those black ink faces will, irrespective of whether the portraits are upright or inverted, coact with the air gap of the magnetic head to provide the required voltage variations. If the patrons in a particular area do not insert the bills with the black ink face up, some of the embodiments of the currency detector provided by the present invention will still be able to identify and accept those bills. In those embodiments of the currency detector, one magnetic head is mounted to confront and engage one face of the inserted bills, and a second magnetic head is mounted to confront and engage the other face of those bills. Consequently, the black ink face of an inserted bill will necessarily engage one or the other of the magnetic heads and thus be able to provide the requisite voltage variations in the coil or coils of that particular magnetic head.

A bill which is to be tested by the currency detector provided by the present invention must be moved past an adjacent magnetic head at a predetermined rate of speed. That predetermined rate of speed must be high enough to provide a usable signal-to-noise ratio. Further, the bill must be raised to that predetermined rate of speed very quickly, because that bill must be moving at a predetermined rate of speed when the leading edge of the portrait frame approaches that magnetic head; and the distance between the leading edge of a bill and the leading edge of the portrait frame is necessarily less than one-half of the over-all length of the bill. The need of quickly raising the inserted bill to a high, predetermined rate of speed creates a problem, because the currency detector must use a small motor if that detector is to be small and compact. The need of holding the the bill in intimate engagement with one or two magnetic heads during the testing of that bill adds a further complication because that intimate engagement creates appreciable frictional drag; and such drag would tend to keep the bill from quickly reaching its high, predetermined rate of speed. The present invention makes it possible to use a small motor and to hold the bill in intimate engagement with one or two magnetic heads during the testing of that bill, and yet quickly raises that bill to a high, predetermined rate of speed, by not urging the magnetic head or heads into intimate engagement with that bill until after that bill has been raised to its predetermined rate of speed. Once the motor has raised the bill to its high, predetermined rate of speed, that motor can continue to move that bill at that rate of speed despite the frictional drag created by the intimate engagement of one or two magnetic heads with that bill. It is, therefore, an object of the present invention to provide a currency detector that does not urge the magnetic head or heads into intimate engagement with an inserted bill until that ball has been raised to a high, predetermined rate of speed.

To assure the requisite intimate engagement between the black ink face of an inserted bill and the magnetic head that is to engage that black ink face, a pressure member must be mounted in register with that magnetic head. Where the currency detector is equipped with two magnetic heads, two pressure members will be required; and one of those pressure members will press against one face of the bill to urge the opposite face of that bill against one of the magnetic heads, while the other pressure member will press against the said opposite face of the bill to urge the said one face of that bill against the other magnetic head. Each magnetic head and its pressure member are in such intimate proximity in the positions they occupy when the bill is being tested that they would prevent the ready introduction between them of the leading edge of an inserted bill if they always remained in those positions. Yet, such ready introduction of the leading edge of an inserted bill is vital to the successful operation of a currency detector, because anything less than ready introduction of that leading edge could cause crumpling, bending or rolling of the inserted bill; and a crumpled, bent, or rolled bill cannot be moved adequately, much less tested adequately. Even fresh paper currency has only limited resistance to crumpling, bending or rolling, and will worn paper currency has little or no resistance to crumpling, bending or rolling. The preferred embodiments of the present invention assure ready introduction of the leading edge of an inserted bill between each magnetic head and its pressure member by spacing that magnetic head and pressure member apart until after the leading edge of that bill has passed between them; and those embodiments assure subsequent intimate engagement between the inserted bill and that magnetic head by subsequently causing that magnetic head and its pressure member to tightly clamp that bill between them. It is, therefore, an object of the present invention to hold the magnetic head and its pressure member apart until after the leading edge of an inserted bill has passed between them, and then subsequently to cause that magnetic head and its pressure member to tightly clamp that bill between them.

The inserted bill must be pressed against the air gap of the magnetic head with considerable force to keep wrinkles in the bill from causing some of the grid lines in the portrait background to bow outwardly and away from that air gap. The present invention makes certain that the grid lines of inserted bills cannot bow outwardly and away from the air gap of the magnetic head, but instead, must intimately engage that air gap, by providing a pressure member that is in register with that air gap and that bends that bill into engagement with a substantial area of the face of that magnetic head. The resulting surface-to-surface engagement will be positive and certain whereas mere line contact might not. It is, therefore, an object of the present invention to provide a pressure member that is in register with the air gap of the magnetic head and that smooths out wrinkles in the inserted bills and that presses each grid line in the portrait backgrounds of those bills into intimate engagement with the air gap of that magnetic head.

Where an inserted bill is tested and does not provide the voltage variations which an authentic bill should provide, that inserted bill must be returned to the person who inserted it. In the preferred embodiments of the present invention, such a bill is moved back to the opening through which it was inserted. This means that unaccepted bills will retrace the movement they experienced during their testing. It would be impractical to try to make an unaccepted bill retrace its movement if the magnetic head and its pressure member continued to remain in the positions they assumed during the testing of that bill. Furthermore, it would be undesirable to have an unaccepted bill pass in intimate engagement with the magnetic head during its return movement; because that bill might be able to generate a validating signal during that return movement which could coact with a validating signal generated during the forward movement of that bill to provide an "accept" signal. The present invention assures full and free return movement of unaccepted bills, and also keeps unaccepted bills from generating validating signals during their return movement, by holding the magnetic head and its pressure member apart during the return movement of unaccepted bills.

A bill that is to be tested must be readily gripped by the currency detector, must be held tightly by that detector until it has been tested, must be promptly moved to the cash box if it is found to be an authentic bill, and must be returned to the person who inserted it if it is found to be unacceptable. Further, the gripping of the bill must be accomplished in such a way that the bill experiences no damage. The present invention makes it possible for the currency detector of the present invention to meet all of these conditions; and it does so by equipping that currency detector with bill-engaging surfaces that are normally spaced apart and that come together after the cycle of the currency detector has been initiated. Those bill-engaging surfaces positively hold a bill as they transport that bill past the magnetic head, and they move that bill past that head at a predetermined rate of speed. If that bill is accepted, those surfaces will permit that bill to be moved toward the cash box; but if that bill is not accepted, those surfaces will return that bill to its initial position. As those surfaces return the unaccepted bill to its initial position, those surfaces will move out of engagement with that bill and thereby enable the person who inserted that bill to retrieve it.

In some embodiments of the present invention, the bill-engaging surfaces are a movable support and eccentrically mounted, gripping jaws that are biased into engagement with that movable support. Those gripping jaws are normally spaced away from that movable support, but they move toward that movable support to grip an inserted bill as soon as that movable support starts to move. The eccentric mounting of those gripping jaws enables those jaws to respond to efforts to withdraw the bill to move into even tighter gripping engagement with the bill. Those jaws are moved away from the movable support after the bill has been tested, thereby facilitating movement of that bill to the cash box if that bill has been found to be authentic. Those gripping jaws again move toward the movable support when that movable support starts its return movement; and, therefore, if an inserted bill has been found to be unacceptable, those jaws will grip it and return it to the person who inserted it. It is, therefore, an object of the present invention to provide a movable support and eccentrically mounted gripping jaws that are held out of engagement with that movable support when the currency detector is at rest and when the bill has been tested, and that are immediately adjacent those surfaces during the forward and return movement of that movable support.

Once the currency detector has determined that an inserted bill is authentic, an acceptance mechanism becomes operable and quickly transfers that bill to the cash box. In some embodiments of the present invention, the acceptance mechanism causes the accepted bills to pass adjacent an eccentrically mounted element that freely and readily permits movement of those bills toward the cash box, but fully and completely prevents movement of those bills in the opposite direction. That eccentrically mounted element thus makes it virtually impossible for a person to attach a string, a thread, a wire, a strip of paper, a strip of cloth, or other "tail" to an inserted bill and withdraw that bill from the currency detector after that bill has generated validating signals. It is, therefore, an object of the present invention to provide an acceptance mechanism that transfers authentic bills to the cash box and moves said bills past an eccentrically mounted element that prevents return movement of said bills.

The currency detector provided by the present invention is provided with an over-level control which will present the acceptance of inserted bills that have ink with excessive magnetic properties. This over-level control will reject any spurious bills that have unduly strong, magnetic ink, and the tuned amplifier of the currency detector will reject any spurious bills that have insufficiently strong magnetic ink. As a result, a counterfeiter would not only have to match the spacing and widths of the grid lines in the backgrounds of the portraits of bills, but he would also have to match the magnetic properties of the ink used. It is, therefore, an object of the present invention to provide an over-level control for a currency detector.

Other and further objects and advantages of the present invention should become apparent from an examination of the drawings and accompanying description.

In the drawings and accompanying description, several embodiments of the present invention are shown and described, but it is to be understood that the drawing and accompanying description are for the purpose of illustration only and do not limit the invention and that the invention will be defined by the appended claims.

Figures 1, 2, 3:
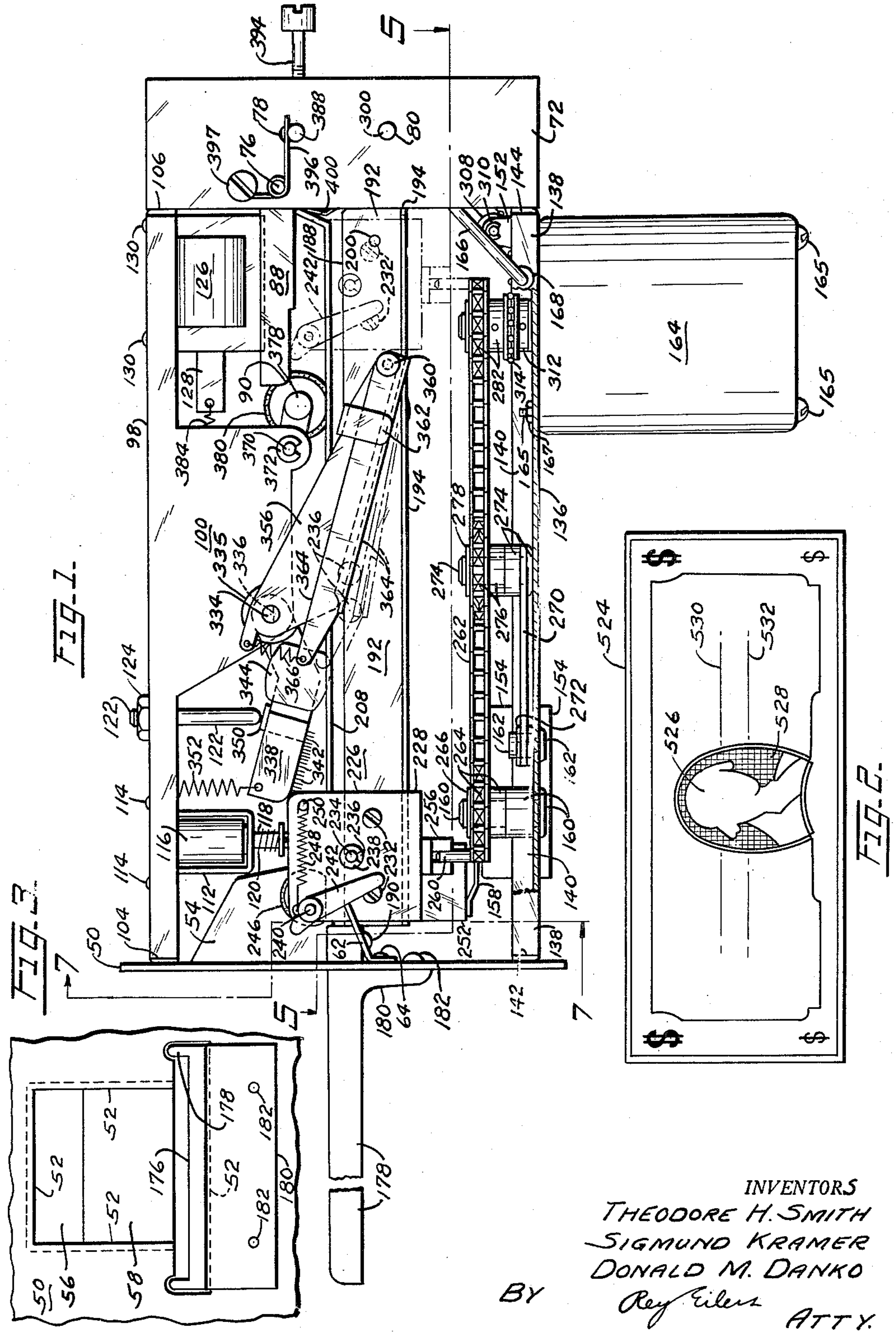
FIGURE 1 is a partially-sectioned, partially-broken side elevational view of one embodiment of currency detector that is made in accordance with the principles and teachings of the present invention.
FIGURE 2 is a diagrammatic suggestion of the portrait and background of a one dollar bill of the United States of America.
FIGURE 3 is a front elevational view of a portion of the front plate of the currency detector of FIGURE 1.

*Components of embodiment of currency detector shown by FIGURES 1–10*

Referring to FIGURES 1–10, the numeral 50 denotes the front plate of an embodiment of currency detector that is provided by the present invention. That plate has an opening 52 through which has the form of an inverted T. A finger-receiving recess is provided on that front plate in register with the opening 52, and that recess extends rearwardly from the upper portion of that opening. That recess has side wall 54, has a sharply inclined upper rear wall portion 56, and has a less sharply inclined rear portion 58. The bottom of that finger-receiving recess is open.

Figure 4:
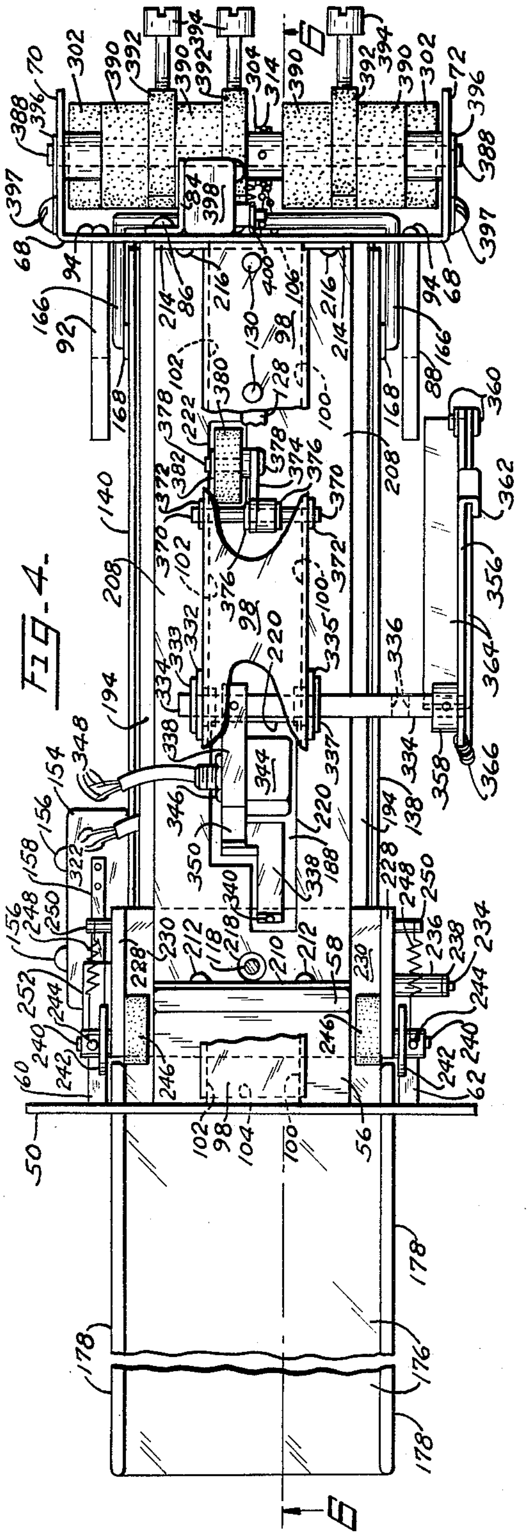
FIGURE 4 is a partially broken plan view of the currency detector of FIGURE 1.
Figures 6, 9:
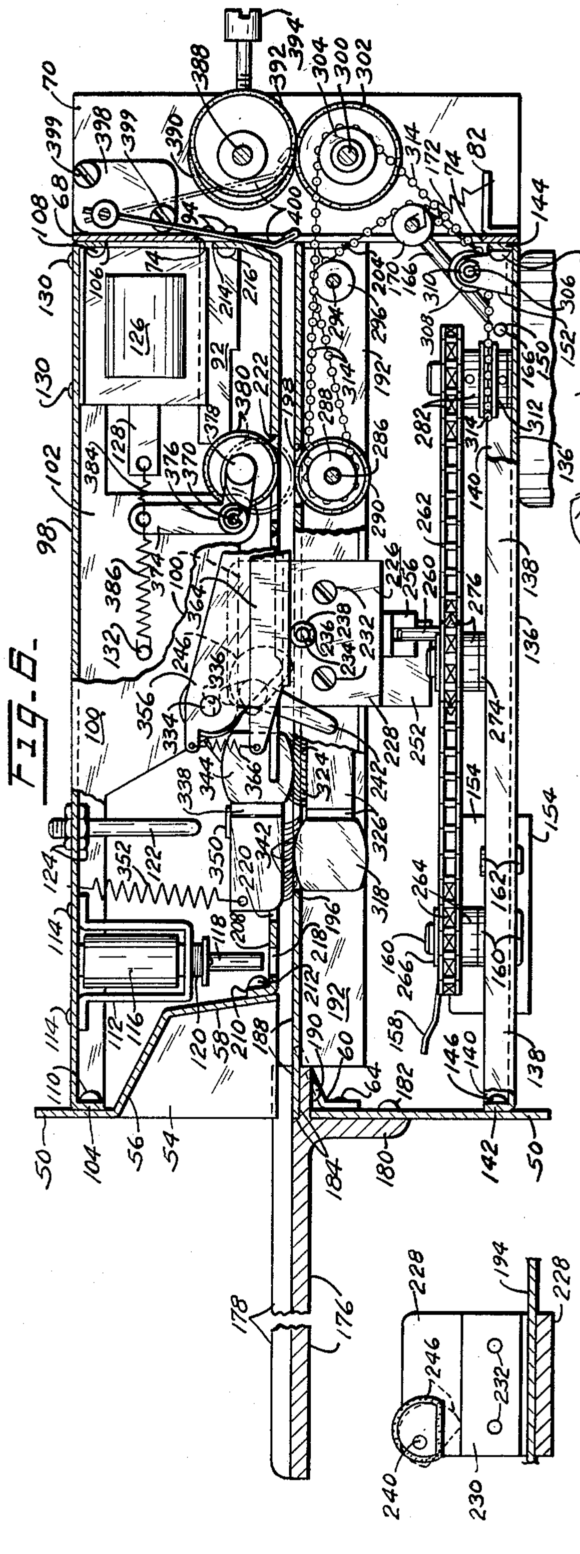
FIGURE 6 is a sectional view through the currency detector of FIGURE 1, and it is taken along the plane indicated by the line 6—6 in FIGURE 4.
FIGURE 9 is a sectional view through the currency detector of FIGURE 1, and it is taken along the plane indicated by the line 9—9 in FIGURE 7.

A generally L-shaped stop 60, particularly by FIGURES 4 and 6, is secured to the rear face of the front plate 50 at a point below and to the left of the opening 52. A substantially identical stop 62 is secured to the rear face of that front plate at a point below and to the right of the opening 52. Fasteners 64, such as rivets, bolts or the like, extend through the front plate 50 and permanently secure the stops 60 and 62 in position at the rear face of that plate. As indicated particularly by FIGURE 1 and by FIGURE 6, the stops 60 and 62 extend upwardly and rearwardly from the rear face of the front plate 50.

The numeral 68 denotes the rear plate of the currency detector shown by FIGURES 1–10; and that rear plate is vertically directed and has rearwardly extending flanges 70 and 72 at the opposite sides thereof. The rear plate 68 has a large, centrally located, generally rectangular opening 74 through it. A pin 76 is secured to and projects outwardly from the rearwardly extending flange 72 of the rear plate 68, as shown by FIGURE 1. A threaded opening, not shown, is provided in the flange 72 above the level of the pin 76, and a vertically elongated opening 78 is provided in that flange at a point to the right of, and slightly below the level of, the pin 76, as shown by FIGURE 1. A circular opening 80 is provided in the flange 72 below the level of the opening 78.

An L-shaped bracket 82 is secured, by welding or otherwise, to the rear face of the rear plate 68 adjacent the bottom edge of the opening 74, as shown by FIGURE 6. That L-shaped bracket is horizontally directed, but it is shorter than the width of the opening 74. A second L-shaped bracket 84 is secured to the rear face of the rear plate 68, as shown by FIGURE 4. That bracket is spaced inwardly from the flange 70, and it is vertically directed. That bracket is located above the level of the opening 74 in rear plate 68; and fasteners 86, such as rivets, screws, or the like, secure that L-shaped bracket to the rear plate 68.

A bar 88 with a rounded face 90 is secured to, and projects forwardly from, the front face of the rear plate 68, as shown by FIG. 1. That bar 88 is disposed closely adjacent one of the sides of the rear plate 68, as shown by FIG. 4. A bar 92 which is identical to the bar 88 is also secured to, and projects forwardly from, the front face of the rear plate 68. That bar is closely adjacent the other side of the rear plate 68, and it is on the same level as the bar 88. Fasteners 94, such as rivets, riveted-over extensions of the bars 88 and 92, or screws, are provided at the rear face of the rear plate 68 to permanently hold the bars 88 and 92 in assembled relation with that rear plate.

The numeral 98 denotes the elongated top plate of the currency detector shown by FIGS. 1–10. That top plate is provided with a downwardly extending flange 100 at one of the elongated sides thereof; and it is provided with a second, and substantially identical, downwardly extending flange 102 at the opposite side thereof. Each of the side flanges (see FIG. 1) has a shallow, horizontally directed portion extending rearwardly from the front thereof, has a downwardly and rearwardly inclined portion contiguous with the rear of said shallow, horizontally directed portion, has a deep, horizontally directed portion contiguous with and extending rearwardly from the bottom of the downwardly and rearwardly inclined portion, has an arcuate downwardly extending protuberance adjacent the rear edge of said deep horizontally directed portion, has a vertically directed portion extending upwardly from the rear edge of said protuberance, and has a third horizontally directed portion contiguous with and extending rearwardly from the top of said vertically directed portion. The various portions of the flanges 100 and 102 are squarely in register with each other. A shallow flange 104 extends downwardly from the front edge of the top plate 98, and that flange is as deep as the shallow, horizontally directed portions adjacent the front edges of the flanges 100 and 102. A shallow flange 106 extends downwardly from the rear edge of the top plate 98, and that flange is as deep as the rearmost horizontally directed portions of the flanges 100 and 102. Fasteners 108, such as rivets, bolts or the like, extend through alined openings in the rear flange 106 and in the rear plate 68 to permanently secure the top plate 98 to the rear plate 68. Fasteners 110, such as rivets, bolts or the like, extend through alined openings in the front flange 104 and in the front plate 50 to permanently secure the top plate 98 to the front plate 50.

A U-shaped bracket 112 is provided with laterally directed flanges at the upper ends of the arms thereof, and those flanges abut the under face of the top plate 98 at a point close to the front end of that top plate. Fasteners 114, such as rivets, bolts or the like, extend through alined openings in the top plate 98 and in the flanges at the upper ends of the arms of the U-shaped bracket 112 to permanently secure that bracket to that top plate. The numeral 116 denotes a solenoid which is fixedly held by the bracket 112 and which has a plunger 118 that extends downwardly through a small opening in the bottom of that bracket. A helical compression spring 120 has the upper end thereof abutting the lower end of the bracket 112 and has the lower end thereof abutting a washer which is held in position on the plunger 118 by a pin. The spring 120 biases the plunger 118 for movement downwardly relative to the bracket 112; but the solenoid 116 is able, whenever it is energized, to overcome the force of the spring 120 and to raise the plunger 118 to the retracted position shown by FIG. 6. However, when the solenoid 116 is deenergized, as it is when the embodiment of currency detector shown by FIGS. 1–10 is at rest, the spring 120 will hold the plunger 118 in the lower position shown by FIG. 1.

The numeral 122 denotes a vertically directed pin which has a threaded upper end extending upwardly through an opening in top plate 98 at a point rearward of the U-shaped bracket 112. A nut 124 is threaded onto the upper end of the pin 122 before that upper end is passed through the opening in the top plate 98; and a second nut is subsequently threaded onto that upper end of the pin 122. The nuts 124 fixedly secure the pin 122 in position relative to the top plate 98.

The numeral 126 denotes a solenoid which has laterally-extending flanges at the top thereof. Those flanges abut the under side of the top plate 98 adjacent the rear of that top plate; and fasteners 130, such as rivets, bolts or the like, extend through alined openings in those flanges and in the top plate 98 to permanently secure that solenoid to that top plate. The solenoid 126 has an armature 128 that extends to the left from that solenoid. The solenoid 126 is larger and more powerful than the solenoid 116.

A pin 132 is secured to the flange 102 intermediate the pin 122 and the plunger 128 of the solenoid 126, as shown by FIG. 6. That pin is disposed below the level of the top plate 98, and it extends horizontally toward the flange 100.

The numeral 136 denotes the elongated bottom plate of the currency detector shown by FIGS. 1–10; and that bottom plate has shallow, upstanding flanges 138 and 140 at the sides thereof. A shallow flange 142 extends upwardly from the front of the bottom plate 136, and the upper edge of that flange is at the level of the upper edges of the flanges 138 and 140. A shallow flange 144 extends upwardly from the rear of the bottom plate 138, and the upper edge of that flange is at the level of the upper edges of the flanges 138 and 140. Fasteners 146, such as rivets, bolts or the like, extend through alined openings in the front flange 142 and in the front plate 50 to permanently secure the bottom plate 136 to the front plate 50. Fasteners 148 such as rivets, bolts or the like, extend through alined openings in the rear flange 144 and in the rear plate 68 to permanently secure the bottom plate 136 to the rear plate 68.

A small opening 150 is provided in the flange 140 adjacent the rear of that flange. A similar opening, not shown, is provided in the flange 138 adjacent the rear of that flange; and the axes of those openings are alined.

A U-shaped bearing bracket 152, with spaced upstanding arms, is suitably secured to the bottom plate 136 intermediate the side flanges 138 and 140. That bearing bracket is immediately adjacent the rear flange 144; and alined openings are provided in the upstanding arms of that bearing bracket.

The numeral 154 denotes a single-pole, single-throw switch that is secured to the outer face of the flange 140 on the bottom plate 136. That switch is secured to that flange by fasteners 156, such as screws, which extend through passages in the switch housing and which seat in threaded openings in the flange 140. The contacts of that switch are biased toward closed position, but the resilient actuator 158 of that switch can be moved downwardly to cause those contacts to open.

The numeral 160 denotes a stud which has a reduced diameter lower end than extends downwardly through the opening in the bottom plate 136 and is then riveted over to permanently secure that stud to that bottom plate. The upper end of the stud 160 is also reduced in diameter, and that upper end serves as a pivot. The numeral 162 denotes a smaller diameter stud which has a reduced diameter lower end than extends through an opening in the bottom plate 136 and is then riveted over. The upper end of the stud 162 also serves as a pivot.

The numeral 164 denotes a motor which is encased in an iron or steel housing; and that housing will confine the stray fields emanating from the motor. Elongated screws 165 extend upwardly through the housing of the motor 164 and through openings in the bottom plate 136. Nuts 167 are threaded onto the upper ends of those screws, and they will co-act with those screws to hold the motor 164 and its housing in assembled relation with the bottom plate 136. The motor 164 is a synchronous motor and it will move an inserted bill through the currency detector at a predeterminned speed.

The numeral 166 denotes a U-shaped bracket which is adjacent the rear of the bottom plate 136, and that bracket has inwardly extending projections at the free ends of the arms thereof. Those projections are dimensioned to extend through the opening 150 in the flange 140 and through the corresponding opening, not shown, in the flange 138. Washers 168 are telescoped over the inwardly extending projections on the arms of the bracket 166 before those projections are passed through the the openings in the flanges 138 and 140, and those washers facilitate ready rotation of that bracket relative to those flanges. A guide pulley 170, for bead chain, is rotatably mounted on, and carried by, the closed end of the bracket 166. A helical extension spring 172 has one end thereof hooked around the closed end of the bracket 166, and has the other end thereof passed through an opening, not shown, in the L-shaped bracket 82 secured to the rear face of rear plate 68. That spring urges the pulley 170 downwardly and to the right in FIG. 6.

The numeral 176 denotes a platform which extends forwardly from the front plate 50. That platform has shallow upstanding flanges 178 at the sides thereof, and those flanges are spaced apart by a distance which is just slightly larger than the distance between the elongated edges of currency of the United States of America. A projection 180 extends downwardly from the bottom face of the platform 176, as shown by FIG. 1; and that projection is set forwardly a short distance from the rear of the platform 176. Consequently, when the rear face of the projection 180 is set in abutting relation with the front face of front plate 50, the rear portion of the platform 176 extends through the bottom of the T-shaped opening 52. Fasteners 182, such as rivets, bolts or the like, secure the projection 180 to the front plate 50 and thereby fixedly secure the platform 176 to that front plate. A wide but shallow recess 184 is provided in the top face of the rear portion of the platform 176.

Figure 5:
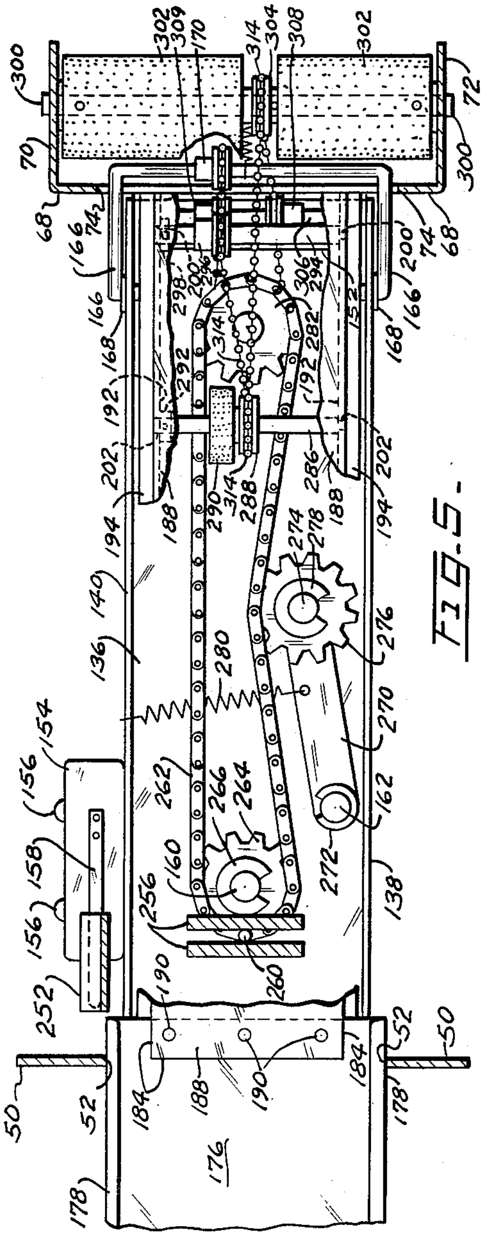
FIGURE 5 is a sectional view through the currency detector of FIGURE 1, and it is taken along the broken plane indicated by the line 5—5 in FIGURE 1.

A bed plate 188 is provided for the currency detector of FIGS. 1–10, and the front end of that bed plate rests in the wide but shallow recess 184 of the platform 176. The thickness of the bed plate 188 is such that when its front end rests in the recess 184, the top of that bed plate and the top of the platform 176 are in the same plane. Fasteners 190, such as rivets or the like, permanently secure the bed plate 188 to the platform 176, as shown by FIG. 5. The bed plate 188 has downwardly extending sides 192; and those sides have laterally extending flanges 194 at the lower edges thereof. The bed plate 188 is made of sturdy metal, and it is made heavy enough that it will not warp or distort.

An opening 196 is provided in the bed plate 188 adjacent the front thereof, and an opening 198 is provided in that bed plate adjacent the rear thereof, all as shown by FIG. 6. An opening 200 is provided in each of the downwardly extending sides 192 of bed plate 188, and those openings have their axes alined, as shown by FIG. 5; but one of the openings 200 is larger than the other. Openings 202 are also provided in the downwardly extending sides 192 of bed plate 188; and one of those openings is larger than the other, as shown by FIG. 5. A shallow, downwardly extending flange 204 is provided at the rear edge of bed plate 188, and that flange has a vertical slot intermediate its side edges. Fasteners, not shown, permanently secure the flange 204 to the rear plate 68, to hold that bed plate fixed relative to that rear plate.

The front plate 50, the rear plate 68, the top plate 98, the bottom plate 136, and the bed plate 188 coact to provide a strong, rigid and unyielding frame work for the currency detector shown by FIGS. 1–10. That framework is stiff enough to make it possible to mount the currency detector shown by FIGS. 1–10 in the housing of a vending machine by securing the top plate, the bottom plate, the front plate, or the rear plate thereof to one of the structural members of that vending machine. The front plate 50 will be disposed adjacent an opening in the housing of the vending machine so that the platform 176 will project outwardly from one face of that housing to give the patron access to the finger-receiving recess of front plate 50.

The numeral 208 denotes a confining plate that is disposed a short distance above the bed plate 188. That confining plate has a front flange 210 which is inclined forwardly and upwardly to abut the portion 58 of the rear wall of the finger-receiving recess. Fasteners 212, such as rivets, bolts or the like, extend through alined openings in the wall portion 58 and in the flange 210 to permanently secure the confining plate 208 to the front plate 50. A flange 214 projects upwardly and rearwardly from the rear of the confining plate 208, and it is secured to the rear plate 68 by fasteners 216, such as rivets, bolts or the like. An opening 218 is provided in the confining plate 208 adjacent the front thereof, as shown by FIGS. 4 and 6, and that opening accommodates the lower end of plunger 118. That opening permits the bottom of that plunger to rest upon the bed plate 188, whenever solenoid 116 is de-energized, and thereby limit the extent to which a bill can be introduced into the currency detector. If desired, an opening or recess could be provided in the bed plate 188, in register with the opening 218, to enable the lower end of the plunger 118 to extend below the level of the upper face of bed plate 188; but such an opening or recess has not been found to be necessary.

An opening 220 is provided in the confining plate 208; and that opening is located a short distance rearwardly of the opening 218, as shown by FIGS. 4 and 6. The opening 220 is generally rectangular in plan, but it has a narrow extension that is closely adjacent the opening 218 as shown by FIG. 4. An opening 222 is provided in the confining plate 208 adjacent the rear thereof, as shown by FIG. 6. The confining plate 208 is spaced far enough above the bed plate 188 to permit a bill to be inserted between those plates, but that confining plate will help confine such a bill and will help keep it from crumpling, bending, or rolling as it is moved relative to the bed plate 188.

Figure 7:
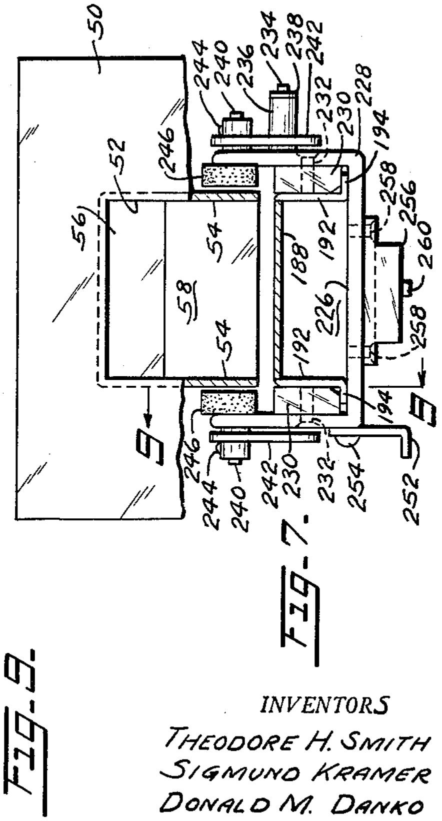
FIGURE 7 is another sectional view through the currency detector of FIGURE 1, and it is taken along the broken plane indicated by the line 7—7 in FIGURE 1.

The numeral 226 generally denotes a bill carrier that is supported by and is movable relative to the bed plate 188; and that carrier is shown by FIG. 7. That carrier includes a rigid and sturdy U-shaped frame 228. Bearing blocks 230 are secured to the inner faces of the upstanding arms of that frame by fasteners 232, such as screws, bolts or the like. The bottom faces of the bearing plates 230 are spaced above the closed end of the frame 228 distances which are slightly greater than the thicknesses of the outwardly extending flanges 194 on the downwardly depending sides 192 of bed plate 188. Those bearing plates coact with the closed end of the frame 228 to enable the bed plate 188 to guide any and all movement of the carrier 226.

The numeral 234 denotes an elongated pin which is secured to the right-hand arm of the frame 228, and that pin rotatably supports a roller sleeve 236. A C-washer 238 seats in a groove adjacent the outer end of the pin 234 and thereby prevents accidental separation of that roller sleeve from that pin.

Two short shafts 240 are rotatably mounted in openings, not shown, in the upper portions of the arms of the frame 228. The outer ends of those shafts support levers 242, and the hubs of those levers are fixedly secured to those shafts by pins 244. The pins 244 project radially outwardly beyond the outer peripheries of the hubs of levers 242 to hold the ends of helical extension springs 248. The inner ends of the short shafts 240 have discs 246 secured to them, and those discs have flat faces adjacent the bottoms thereof, as shown by FIG. 9. Those discs are located above the bearing plates 230, and they can be rotated until the flat faces thereof are parallel to those bearing plates. Those discs can also be rotated until the trailing edges of their flat faces either engage or are immediately adjacent the upper surfaces of the bearing plates 230, as shown by dotted lines in FIG. 9. The flat faces, and those portions of the peripheries of the discs 246 adjacent the trailing edges of those flat faces, are covered with a material, such as cork, rubber, elastomeric plastic or the like, which has a high coefficient of friction. Pins 250 extend outwardly from the arms of the frame 228 to support the other ends of the helical extension springs 248. Those springs bias the flat faces of the discs 246 toward the bearing plates 230, but those springs can yield to permit those discs to be rotated into the raised position shown by solid lines in FIG. 9. When the discs 246 are in that raised position they will permit ready insertion and ready removal of bills into and from the currency detector. However, when those discs are in the dotted line position shown by FIG. 9, they will engage the edges of a bill and force that bill into holding engagement with the bearing plates 230; the upper faces of those bearing plates constituting bill-receiving surfaces. The discs 246 are mounted eccentrically on the short shafts 240; and any effort to withdraw a bill, by moving it to the left, while it is held by those discs and by the bearing plates 230 will cause those discs to tend to rotate toward those bearing plates and thereby provide an even tighter gripping of that bill. That eccentric mounting of the discs 246 enables the application of forces, tending to move a bill to the right, to effect rotation of those discs away from the bearing plates 230 and thereby effect prompt releasing of that bill.

The numeral 252 denotes an L-shaped bracket that is secured to the left-hand arm of the U-shaped frame 228, as that frame is viewed in FIG. 7; and that bracket extends downwardly and outwardly from that frame. Fasteners 254, such as rivets, bolts or the like, permanently secure the bracket 252 to the frame 228. The bracket 252 is in register with the resilient actuator 158 of the switch 154; and whenever the carrier 226 is in its "at rest" position, adjacent the front plate 50, that bracket will engage the resilient actuator 158 and hold the contacts of switch 154 open. When that carrier moves out of its at-rest position, that bracket will free the actuator 158 and enable the contacts of switch 154 to close.

A slotted block 256 is secured to the bottom of the U-shaped frame 228 by fasteners 258, such as rivets, bolts or the like. The slot in that block extends transversely of the U-shaped frame 228. A pin 260 is dimensioned to fit within the slot in the slotted block 256; the diameter of that pin approximating the width of that slot, but enough clearance being provided to permit that pin to move freely relative to that slot. The pin 260 is part of a sprocket chain 262 that is mounted above the bottom plate 136. A sprocket gear 264 is rotatably mounted on the stud 160, and the teeth of that gear engage the sprocket chain 262. A C-washer 266 prevents accidental separation of the gear 264 from the stud 160.

An arm 270 (FIG. 5) has an opening in one end thereof that telescopes over the upper end of stud 162, and that opening enables that arm to rotate relative to that stud. A C-washer 272 is seated in a groove adjacent the upper end of the stud 162, and that C-washer prevents accidental separation of arm 270 from that stud. A stud 274 is carried by, and extends upwardly from, the free end of the arm 270; and that stud rotatably supports a sprocket gear 276. A C-washer 278 is seated in a groove adjacent the upper end of the stud 274 to prevent accidental separation of that sprocket gear from that stud. A helical extension spring 280 has one end thereof hooked through an opening in the arm 270 and has the other end thereof hooked through an opening in the flange 140 of bottom plate 136. The sprocket gear 276 meshes with the sprocket chain 262, and the spring 280 biases the arm 270 toward that chain to keep that chain taut.

A sprocket gear 282 is mounted on the upper end of the shaft of the motor 164; and the teeth of that gear mesh with the sprocket chain 262 so that rotation of the shaft of motor 164 drives the sprocket chain 262. This means that when the shaft of motor 164 rotates, it will cause the sprocket chain 262 to move and thereby move the pin 260. The pin 260 is confined by the slot in the slotted block 256 and will, therefore, force that block, and the carrier 226, to move with it. The shaft of the motor 164 rotates in the clockwise direction, as that shaft is viewed in FIG. 5; and it will cause the pin 260 to rotate ninety degrees from the position shown in FIG. 5, will then cause that pin to move all the way until it is adjacent the gear 282, will then rotate that pin one hundred and eighty degrees, will cause that pin to move past the sprocket gear 276 until it reaches gear 264, and will then cause that pin to experience a further rotation of ninety degrees until it returns to the position shown by FIG. 5. As the pin 260 approaches, passes around, and then leaves the sprocket gear 282 or the sprocket gear 264, it will gradually decelerate and then gradually accelerate the movement of the bill carrier 226; and, in doing so, will provide simple harmonic motion for that carrier adjacent those gears. As the pin 260 moves the carrier 226 rearwardly from its at-rest position adjacent the front plate 50, it will quickly raise the rate of movement of that carrier to a predetermined value. The motor 164 is a synchronous motor, and one it has attained the desired predetermined speed, it will continue to move the pin 260 at that predetermined speed.

The numeral 286 denotes a pivot which has a reduced diameter end seated in the smaller of the two openings 202 in the sides 192 of the bed plate 188. The other end of that pivot is seated in the other opening 202; and therefore that pivot will be held adjacent the opening 198 near the rear of the bed plate 188, as shown by FIG. 6. A collar 292 is locked to that pivot to prevent accidental separation of that pivot from the bed plate 188. As the pivot 286 is being assembled with the bed plate 188, it is telescoped through the larger opening 202, then through the collar 292, subsequently through a circular disc or roller 290 which has a face of cork, rubber, elastomeric plastic, or some other material having a high coefficient of friction, and finally through a gear 288 for bead chain. Thereafter, the reduced diameter end of the pivot 286 is set within the small diameter opening 202, and the collar 292 is then set adjacent the inner face of the adjacent side 192 and locked to the pivot 286. The upper face of the disc or roller 290 will be closely adjacent the upper face of the bed plate 188, as shown by FIG. 6. The disc or roller 290 and the gear 288 are suitably locked together so that rotation of the gear 288 will cause rotation of the disc or roller 290.

The numeral 294 denotes a pivot which has a small diameter end seated within one of the openings 200, and which has the other end thereof seated within the other opening 200. A pulley 296 for bead chain is rotatably mounted on the pivot 294 as that pivot is being assembled with the bed plate 188. A collar 298 is fixedly secured to the pivot 294 during the assembly of that pivot with the bed plate 188 to prevent accidental separation of that pivot from that bed plate.

The numeral 300 denotes a shaft which is rotatably mounted in the openings 80 in the flanges 70 and 72 of the rear plate 68. That shaft has two rolls 302 suitably secured to it by pins; and those rolls have faces of cork, rubber, elastomeric plastic, or some other material having a high coefficient of friction. That shaft also has secured to it, by a pin or the like, a gear 304 for bead chain, as shown by FIG. 5. As a result, rotation of the gear 304 will cause rotation of the rolls 302.

The numeral 306 denotes a pivot which is seated within the openings in the upstanding arms of the bearing bracket 152. The pivot rotatably supports two pulleys 308 and 309 for bead chain; and the pulley 309 is below and is partially obscured by the pulley 296 in FIG. 5. C-washers 310 seat in grooves adjacent the opposite ends of the pivot 306 to prevent accidental separation of that pivot from the bearing bracket 152.

The numeral 312 denotes a gear for bead chain; and that gear is suitably secured to the shaft of the motor 164 by a pin or a set screw. That gear will be telescoped down over the upper end of the shaft of the motor 164 before the sprocket gear 282 is telescoped down over that upper end. A continuous bead chain 314 passes around the gear 312, passes under the pulley 309, passes under and around the pulley 170, passes over the pulley 296, passes under and around the gear 288, passes over and around the gear 304, under the pulley 308, and then passes again to the gear 312. That chain will rotate the gear 288 and disc or roller 290 in the clockwise direction and will also rotate the gear 304 and the rolls 302 in the clockwise direction. The spring 172 urges the bracket 166 and pulley 170 into chain-tightening position, and thus prevents slippage of the bead chain 314 relative to the gears 312, 304 and 288. The bead chain moves close to the bottom face of the bed plate 188 as it passes over the gear 288 and passes to the gear 304. If desired, the bottom face of that bed plate could be grooved, or a slot could be provided in that bed plate, to provide additional clearance. However, such additional clearance has not been found to be necessary.

Figure 8:
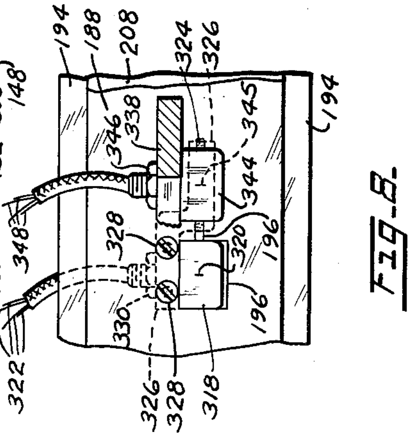
FIGURE 8 is a partially sectioned plan view showing the two magnetic heads of the currency detector of FIGURE 1.

The numeral 318 denotes a magnetic head which has an air gap 320, as shown by FIG. 8. While that air gap is clearly shown in FIG. 8 (and see FIGS. 27–28), that air gap is so small that it is almost invisible to the unaided human eye. Four leads 322 extend from that head, and those leads are connected to the two coils wound on the core of that head. Two of the four leads 322 will be soldered together so that the two coils on the core of the head 318 will be connected in series relation. The magnetic head 318 has a threaded sleeve which extends through an opening in a supporting bracket 326, and a nut 330 is threaded onto that sleeve to lock that head to that bracket. While different kinds of magnetic heads could be used, the BK1091 magnetic head made by the Brush Electronics Company has been found to be very useful.

The bracket 326 has a slot, not shown, therein; and that slot accommodates a brush 324. While a number of different brushes could be used, a mascara brush has been found to be very useful. Its bristles are of nylon and are strong enough to provide adequate pressure; and yet those bristles are resilient enough to withstand repeated flexing and bending. Fasteners 328, such as screws or the like, secure the bracket 326 to the under side of the bed plate 188, as shown by FIG. 8; and that bracket will hold the head 318 and the brush 324 in the opening 196 in that bed plate. The air gap 320 of the magnetic head 318 is adjacent the uppermost part of the convex upper face of that head, and that air gap is at or slightly above the level of the upper face of the bed plate 188. The bristles of the brush 324 will normally extend a short distance above the level of the upper face of the bed plate 188; and in actual practice those bristles extend approximately one-sixteenth of an inch above the level of the upper face of the bed plate.

The numeral 332 denotes a washer which telescopes over one end of a shaft 334 that is rotatably mounted in openings, not shown, in the side flanges 100 and 102 of the plate 98; and that washer abuts the flange 102. A groove is provided in the shaft 334 adjacent the washer 332, and that groove accommodates a C-washer 333. A washer 335 is telescoped over the other end of the shaft 334, and it abuts the side flange 100 of the top plate 98. A groove is provided in the shaft 334 adjacent the washer 335, and that groove accommodates a C-washer 337. The C-washers 333 and 337 prevent accidental separation of the shaft 334 from the top plate 98, and also limit axial movement of that shaft relative to that top plate. A slot 336 is formed in the under side of the shaft 334 at a point that is spaced outwardly of the C-washer 337.

As the shaft 334 is being assembled with the top plate 98, one of its ends is passed through an opening in a bracket 338; and when the shaft has been set in its proper position, the bracket 338 will be locked to that shaft by a pin or set screw. That bracket has a bend intermediate the ends thereof, as shown by FIG. 1, and it supports a magnetic head 344 adjacent the bend. The bracket 338 has a slot 340 in the under side thereof adjacent the free end thereof, and that slot accommodates a brush 342. That brush is substantially identical to the brush 324 except that its bristles are directed downwardly whereas the bristles of the brush 324 are directed upwardly. The air gap of the magnetic head 344 is denoted by the numeral 345, and that air gap is adjacent the lowermost part of the face of the head 344. A nut 346 is threaded onto the threaded sleeve of the magnetic head 344, and that nut fixedly secures that head to the bracket 338. Two of the four leads 348 of the magnetic head 344 will be suitably soldered together to place the two coils on the core of that magnetic head in series relation. The head 318 is disposed below but in register with the brush 342, and the head 344 is disposed above but in register with the brush 324 as shown by FIG. 6.

A pad 350 of resilient material, such as rubber, is mounted on the top of the bracket 338; and that pad is below and in register with the pin 122 carried by the top plate 98. That pad cushions the stopping of the bracket 338 when that bracket reaches the end of its clockwise rotation, as that bracket is viewed in FIGS. 1 and 6. A helical extension spring 352 has one end thereof hooked through an opening in the bracket 338 and has the other end hooked through an opening in the top plate 98, and that spring biases the bracket 338 for rotation in the clockwise direction.

The numeral 356 denotes an arm which has a hub 358 mounted on that end of the shaft 334 which projects from the flange 100 of the top plate 98. The hub 358 is disposed outwardly of the slot 336 in the bottom of the shaft 334, and it holds the arm 356 at right angles to the axis of that shaft. A pivot 360 is carried by the free end of the arm 356, and a guide ear 362 is mounted on that arm adjacent that pivot. The ear 362 projects laterally and then downwardly from the upper edge of the arm 356 to define a slot between itself and the arm 356. An elongated member 364 of L-shaped cross-section is rotatably secured to the free end of the arm 356 by the pivot 360; and the vertical directed portion of the member 364 fits into the slot defined by the arm 356 and its ear 362. A helical extension spring 366 has one end thereof hooked through an opening in the lefthand end of the arm 356 and has the other end thereof hooked through an opening in the lefthand end of the elongated member 364, as shown in FIG. 1. That spring biases the arm 356 and the elongated member 364 into the close proximity indicated by solid lines in FIG. 1; but it can yield to permit the elongated member to move to the dotted line positions shown by FIG. 1.

The horizontal portion of the elongated member 364 is in register with the roller 236 on the pin 234 of the carrier 226, and when that carrier moves toward the rear plate 68, it will cause that roller to engage and lift the member 364. Such lifting will rotate the arm 356, the shaft 334 and the bracket 338 in the counterclockwise direction, thereby moving the head 344 and the brush 342 from the normal elevated position of FIG. 1 to the bill-testing position of FIG. 6. At such time the convex faces of the heads 318 and 344 will bend and flex the bristles of the brushes 342 and 324, respectively, until the faces of those brushes assume concave configurations couplementary to the convex faces of those heads. The pressure exerted on each of the heads by its brush will be in the order of from four to six ounces.

The numeral 370 denotes a pivot which is mounted within openings in the side flanges 100 and 102 of the top plate 98 adjacent the downwardly extending protuberances of those side flanges. The opposite ends of that pivot have grooves therein, and those grooves accommodate C-washers 372 which prevent accidental separation of that pivot from the top plate 98. That pivot also has grooves intermediate the ends thereof which accommodate C-washers 376, as shown by FIG. 4; and those C-washers maintain the hub of an L-shaped lever 374 in assembled relation with the pivot 370 while permitting rotation of that lever relative to that pivot. In assembling the pivot 370 with the side flanges of the top plate 98, that pivot is telescoped through the opening in one of the side flanges of that top plate, through the hub of the lever 374, and then through the opening in the other side flange. Thereafter, the C-washers 372 and 376 are seated in the appropriate grooves in the shaft 370. A stud 378 is secured to the free end of the L-shaped lever 374, and that stud serves as a pivot for a disc or roller 380 which has a face of cork, rubber, elastomeric plastic, or some other material that has a high coefficient of friction. A C-washer 382 seats within a groove in the outer end of stud 378 to prevent accidental separation of the roller 380 from that stud. The C-washers 376 hold the roller 380 in register with the disc or roller 290.

A helical extension spring 384 has one end thereof hooked through an opening in the upper end of the L-shaped lever 374 and has the other end thereof hooked through an opening in the outer end of the plunger 128 of the solenoid 126. A helical extension spring 386 has one end thereof hooked through the same opening in the upper end of the L-shaped lever 374 and has the other end thereof hooked around the pin 132 mounted on the side flange 102 of the top plate 98. The spring 386 will, whenever the solenoid 126 is deenergized, rotate the lever 374 to the position shown by FIG. 6, and will thereby hold the roller 380 in the elevated position shown by solid lines in FIG. 6. However, whenever the solenoid 126 is energized, the plunger 128 will move to the right and overcome the force of the spring 386 to rotate the lever 374 in the clockwise direction. Such rotation will force the roller 380 down into intimate engagement with a bill atop the bed plate 188 and force that bill against the disc or roller 290. The force of the solenoid 126 will be transmitted through the spring 384, and that force will be great enough to prevent slippage between the two rollers 290 and 380 and an interposed bill.

The numeral 388 denotes a pivot which is mounted in the elongated opening 78 in the flange 72 and in a counterpart opening in the flange 70. That pivot will normally rest adjacent the bottom of those openings because of springs 396, which are wound around the pins 76 on the flanges 70 and 72 and which have their upper ends held by the fasteners 397. However, the springs 396 can yield to permit the pivot 388 to move upwardly toward the upper ends of those openings. Rollers 390 with faces of cork, rubber, elastomeric plastic, or other material having a high coefficient of friction, are mounted on and rotate relative to the pivot 388. Each of the rollers 390 has a length which is less than one-third of the length of any one of the rollers 302; and the rollers 390 are spaced apart, as shown by FIG. 4. Eccentric discs 392, with faces of cork, rubber, elastomeric plastic or some other material having a high coefficient of friction, are interposed between the rollers 390. Those discs are circular but they are mounted eccentrically, as shown by FIG. 6. Each of the eccentric discs 392 is provided with a counterweight 394; and the counterweight is shown as a machine screw. However, any other suitable counterweight could be used. The counterweights 394 bias the eccentric discs 392 for rotation in the clockwise direction, as those discs are viewed in FIG. 6; but they can permit limited rotation of those discs in the counterclockwise direction. The rollers 390, and the lower portions of the eccentric discs 392, normally engage the rollers 302; and the clockwise rotation of the rollers 302 will rotate the rollers 390 in the counter clockwise direction. The eccentrically mounted discs 392 will respond to the clockwise rotation of the rollers 302 to rotate a short distance in the counterclockwise direction, but that rotation will be limited because such rotation will decrease the pressure between the faces of rollers 302 and discs 392. Consequently, the discs 392 will move to a slightly elevated position and then let the rollers 302 keep on rotating relative to them.

The numeral 398 denotes a single-pole, double-throw switch which is mounted on the L-shaped bracket 84 secured to the rear plate 68, as shown by FIG. 4. That switch can be secured to that bracket by fasteners 399 such as screws. That switch is provided with a rotatable shaft; and an elongated switch arm 400 is secured to, and depends downwardly from, that shaft. The lower end of that switch arm is bent, as shown by FIG. 6; and the lower end of that arm is normally disposed immediately adjacent the rear of the bed plate 188. That lower end of the switch arm 400 will be struck by the leading edge of each bill that is accepted and which is being moved to the right by the rollers 290 and 380. That switch arm will be moved from the solid line position to the dotted line position of FIG. 6 by that leading edge of that bill, and it will remain in that dotted line position until after the bill has passed between the rollers 302 and 390. In moving from the solid line position to the dotted line position of FIG. 6, the switch arm 400 will shift the movable contact of the switch 398 from its left-hand fixed contact to its right-hand fixed contact, as those contacts are viewed in FIG. 10.

Figure 10:
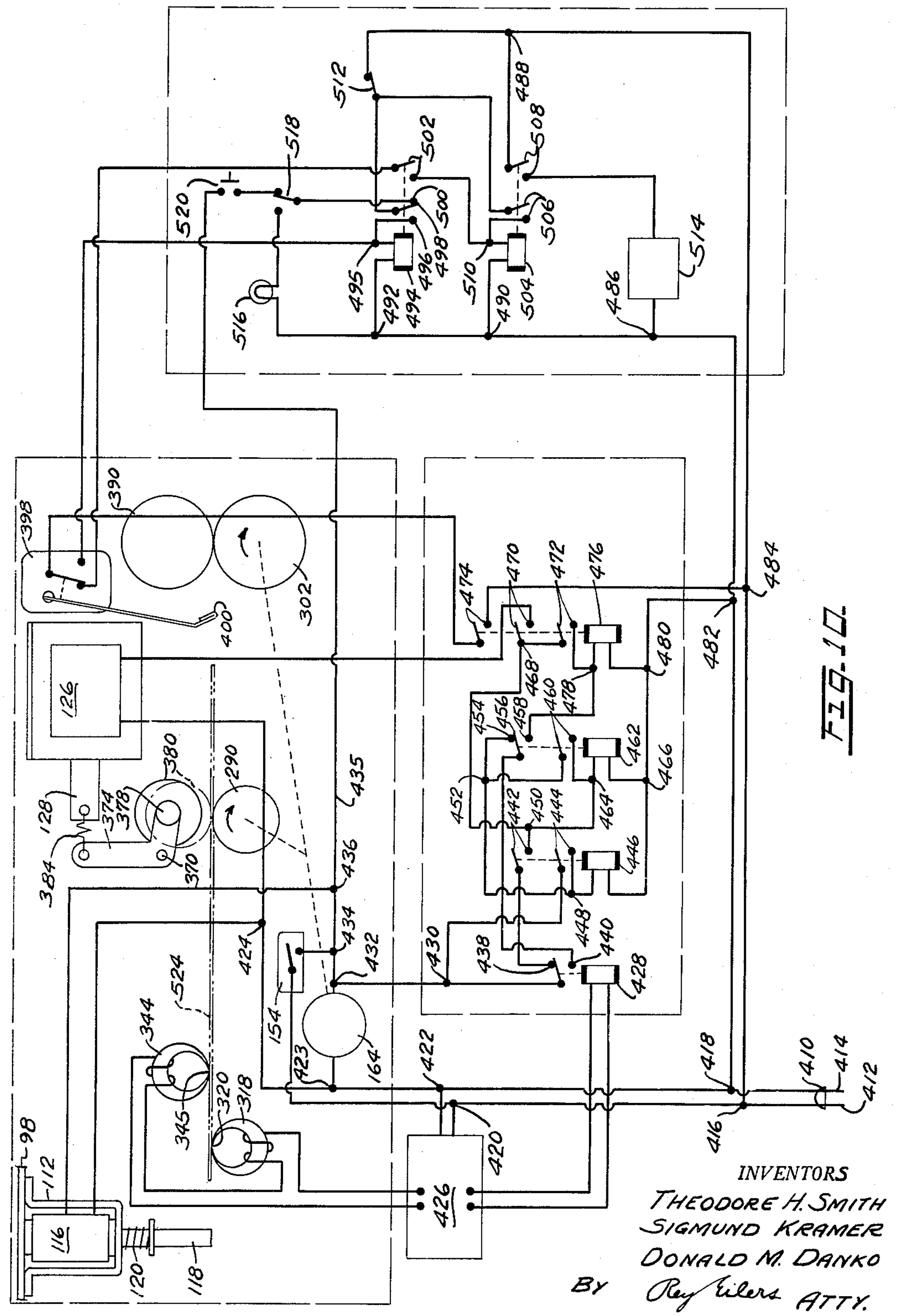
FIGURE 10 is the wiring diagram of the currency detector of FIGURE 1 and of a typical vending machine with which that currency detector can be used.

Referring particularly to FIG. 10, the numeral 410 denotes a male plug that can be inserted in the standard and usual female receptacle for one hundred and ten volts alternating current. That plug has prongs 412 and 414. The prong 412 is connected to the movable contact switch 154 through a conductor which has junctions 416 and 420 intermediate the ends thereof. The prong 414 is connected to one of the terminals of the solenoid 126 by a conductor which has the junctions 418, 422, 423 and 424 intermediate the ends thereof. The junction 423 is connected to one terminal of the motor 164, and the junction 424 is connected to one terminal of the solenoid 116. The junctions 420 and 422 are connected to the power input terminals of a unit 426 that includes a tuned amplifier and a control element. The tuned amplifier and control element shown by FIG. 30 will preferably be used in the unit 426, but the tuned amplifier and control element of FIGS. 31A and 31B could be used. One terminal of the serially connected coils of the magnetic head 318 is connected to one of the signal input terminals of the unit 426. The other terminal of the serially-connected coils of head 318 is connected to one of the terminals of the serially connected coils of the magnetic head 344; and the other terminal of the serially-connected coils of the head 344 is connected to the other signal input terminal of the unit 426. As a result, all four coils of the heads 318 and 344 are connected in series between the signal input terminals of the unit 426.

The output terminals of the unit 426 are connected to the coil of a relay 428 which has a fixed contact 438, a fixed contact 440, and a movable contact. The relay 428 is one of a chain of relays 446, 462 and 476. The relay 446 has two pairs of normally open contacts 442 and 444, the relay 462 has a pair of normally open contacts 460 plus a movable contact 456 that is selectively engageable with fixed contacts 454 and 458, and relay 476 has three pairs of normally open contacts 470, 472 and 474.

The components of the vending machine of FIG. 10 are enclosed by a dashed line, and they include an "empty lamp" 516, an "empty switch" 518, a push button 520, a "delivery switch" 512, a cycling mechanism 514, and two relays 494 and 504. The relay 494 has a pair of normally open contacts 502 plus a movable contact 498 that is selectively engageable with fixed contacts 496 and 500. The relay 504 has two pairs of normally open contacts 506 and 508. The empty lamp 516 and the push button 520 will be located at the exterior of the vending machine, and they will preferably be located on that wall of the vending machine through which the platform 176 projects. The push button 520 will be pressed by patrons, in accordance with instructions on the exterior of the vending machine, after those patrons have inserted bills into the finger-receiving recess 52 in the front plate 50.

Spark-suppressing networks are not shown in parallel with any of the relay or switch contacts of FIG. 10; but those networks will usually be necessary. Such networks are being used in the currency detectors that are made in accordance with the principles and teachings of the present invention. FIGS. 1 and 10 show the various components of the currency detector and of the vending machine in the positions they occupy when the vending machine is well supplied with the product it is to vend and when it is awaiting the insertion of a bill.

OPERATION OF CURRENCY DETECTOR OF FIGURES 1–10

As indicated by FIG. 2, authentic one dollar bills of the United States of America have a number of vertical and horizontal grid lines in the background 528 for the portrait 526 of George Washington. The vertical grid lines on the bill 524 in FIG. 2 are perfectly straight throughout their lengths, but in actual practice those grid lines may vary in straightness and spacing. The dashed line 532 in FIG. 2 indicates the portions of the bill 524 which will engage the magnetic head 344 in the event that bill is set on the platform 176 with the black-ink face up and the portrait 526 in upright position. That same portion will engage the magnetic head 318 in the event the bill 524 is set on the platform 176 with the green-ink face up and the portrait in upright position. The dashed line 530 in FIG. 2 indicates that portion of the bill 524 which will engage the magnetic head 344 in the event that bill is set on the platform 176 with the black-ink face up and the portrait in inverted position. That same portion of the bill 524 will engage the magnetic head 318 in the event that bill is set on the platform 176 with the green-ink face up and the portrait in inverted position. As a result, regardless of how a patron places the bill 524 on the platform 176, the magnetic head 318 or the magnetic head 344 will be in position to receive and sense one or the other of the portions indicated by the dashed lines 530 and 532.

In placing the bill 524 on the platform 176, the patron will push the bill forwardly until its leading edge engages, and is held against further inward movement by, the plunger 118 of the solenoid 116; the lower end of that plunger resting upon the bed plate 188 and serving as a stop. If the bill 524 is fresh and unbent, the patron can push on almost any part of that bill and succeed in getting that bill to move against the plunger 118. However, if the bill 524 is well worn, the patron may have to insert one or more fingers in the finger-receiving recess, behind the opening 52 in the front plate 50, to guide the leading edge of that bill toward the plunger 118.

The leading edge of the bill 524 will be able to move freely against the plunger 118 because the discs or jaws 246 will be held in the elevated position indicated by FIG. 9, and will thus not interfere with that movement. Not until the carrier 226 has moved far enough to the right in FIG. 1 to enable the levers 242 to rotate in the clockwise direction will the gripping jaws 246 engage the bill 524 and clamp it against the bearing plates 230.

The platform 176 will preferably be made long enough to underlie and support the greater part of the length of the bill 524 whenever the leading edge of that bill abuts the plunger 118. As a result, the patron can, as soon as he has guided the leading edge of the bill 524 into engagement with the plunger 118, let go of that bill without any risk of that bill falling off of the platform 176. The patron will then push the push button 520 of FIG. 10; and in doing so will complete two energizing circuits. One of those circuits starts at the prong 414 of plug 410 and extends past junction 418, past junction 422, past junction 423, through motor 164, past junction 432, past junction 434, past junction 436, through conductor 435 to the upper terminal of push button 520, through that push button, through the right-hand fixed contact and the movable contact of empty switch 518, through contacts 500 and 498 of relay 494, through delivery switch 512, past junction 488, past junction 484, and past junction 416 to the prong 412 of plug 410. The other of those energizing circuits starts at the prong 414 of plug 410 and extends past the junctions 418, 422, 423 and 424 to the solenoid 116, and through that solenoid, past junction 436, through conductor 435 to the upper terminal of push button 520, through that push button, through the right-hand fixed contact and the movable contact of empty switch 518, past contacts 500 and 498 of relay 494, through delivery switch 512, and past junctions 488, 484 and 416 to the prong 412.

The completion of these two energizing circuits provides immediate energization of the motor 164 and of the solenoid 116; and consequently the plunger 118 will be raised up out of the path of the bill 524 and the gears 282 and 312 on the shaft of the motor 164 will be rotated in the clockwise direction. The gear 312 will move the bead chain 314 and thereby rotate the rollers 290 and 302; but that rotation is not significant at this time because the bill is still adjacent the left-hand end of the bed plate 188. The gear 282 will move the sprocket chain 262, and thereby cause the pin 260 to move in the clockwise direction from the position it occupies in FIG. 5; and that movement will cause the carrier 226 to start moving toward the rear of the bed plate 188.

The initial movement of the carrier 226 will be relatively slow compared to the subsequent movement of that carrier, because the shaft of the motor requires a finite time to come up to speed and because the pin 260 starts moving in a direction at right angles to the path of reciprocation of the carrier 226 and must follow ninety degrees of the pitch circle of the gear 264 before it can start moving parallel to the path of reciprocation of the carrier 226. The resulting relatively slow initial movement of the carrier 226 is desirable because it enables that carrier to move far enough toward the rear of the bed plate 188 to let the levers 242 rotate and ease the eccentrically mounted jaws 246 down into gripping engagment with the bill 524 while that carrier is still moving relatively slowly. Those jaws will engage and grip the sides of the bill 524 at points adjacent the leading edge of that bill, and they will do so before the pin 260 starts moving parallel to the path of reciprocation of the carrier 226. This means that while the bill 524 remained stationary and the carrier 226 moved relative to it during the first few degrees of rotation of the pin 260 about the stud 160, the jaws 246 moved into engagement with that bill and caused that bill to move with the carrier 226 even before the pin 260 had completed its ninety degrees of rotation about the stud 160.

Once the jaws 246 have rotated down into clamping engagement with the bill 524, the patron will be unable to retract the bill. Any effort by the patron to retract that bill would tend to urge the jaws 246 to rotate even farther in the counterclockwise direction and thereby move into even tighter clamping engagement with that bill.

Almost immediately after the carrier 226 starts moving toward the rear of the bed plate 188, the L-shaped bracket 252 on that carrier will move out of engagement with the resilient actuator 158 of switch 154; and thereupon the movable contact of that switch will move into engagement with the fixed contact of that switch. The engagement of those contacts establishes a holding circuit for the solenoid 116 and establishes a running circuit for the motor 164. Both of those circuits start at the prong 412 of plug 410 and extend past the junctions 416 and 420 to the movable contact of switch 154, and then through that movable contact and the fixed contact of switch 154 to the junction 434; and thereafter the holding circuit for solenoid 116 passes junction 436 to that solenoid and thence past junctions 424, 423, 422 and 418 to prong 414, while the running circuit for the motor 164 passes through junction 432 to that motor and thence past junctions 423, 422 and 418 to prong 414. These two circuits will keep the solenoid 116 and the motor 164 energized after the patron releases the push button 520. The switch 154 will remain closed, and will thus keep solenoid 116 and motor 164 energized, until after the carrier 226 has moved all the way to the rear of the bed plate 188 and then has moved almost all of the way back to its normal position adjacent the front of that bed plate. As the pin 260 approaches the position it occupies in FIG. 5, the bracket 252 will re-engage the resilient actuator 158 of switch 154 and thereby reopen that switch to deenergize the solenoid 116 and the motor 164.

As the bill 524 is moved toward the rear of the bed plate 188 by the carrier 226, the plate 208 will confine that bill and keep it substantially flat. This is desirable because many persons fold their paper currency, and fresh currency that has been folded tends to assume its folded configuration. The action of the plate 208 is particularly useful in the event the bill is unacceptable and must be returned to the opening 52 during the return movement of the carrier 226.

The rate of movement of the bill 524 is very critical. If that rate of movement is below a predetermined value the amplitude of the voltage variations, that are generated in the magnetic head, will be so small that an impractical signal-to-noise ratio will result. On the other hand, if that rate of movement is too high, the relays that must be actuated during the movement of the bill 524 will not have enough time to be actuated. To obtain a practical signal-to-noise ratio, the rate of movement of the bill 524 should not be substantially less than two inches per second; and to make sure that the relays have enough time to be actuated, the rate of movement of the bill 524 should not be substantially greater than twenty-five inches per second. In one embodiment of currency detector that was made in accordance with the principles and teachings of the present invention, the rate of movement of the bill was nine and six-tenths inches per second; and in another embodiment of currency detector that was made in accordance with the principles and teachings of the present invention, the rate of movement of the bill was fourteen and one-half inches per second. These latter rates of movement fall within the preferred range of rates of movement, namely, between seven and sixteen inches per second.

The total movement of the carrier 226, as it moves toward the rear of the bed plate 188 and then returns to its position adjacent the front of that bed plate, is approximately thirteen inches. Where the rate of movement of that carrier is within the preferred range of from seven to sixteen inches per second, the total time required for the currency detector to accept or reject a bill and then ready itself for the testing of a further bill ranges from just over a second to less than a second.

As the carrier 226 starts to move toward the rear of the bed plate 188, the switch 154 will close promptly and the jaws 246 will promptly move into engagement with the bill 524. Thus, the L-shaped bracket 252 will move out of engagement with actuator 158 of switch 154 and permit that switch to close after the carrier 226 has moved approximately one-eighth of an inch; and the rotatable levers 242 on carrier 226 will start rotating toward gripping position, and permit the clamps 246 to grip the bill 524, after that carrier has moved a total of about three-sixteenths of an inch.

The carrier 226 will continue to move the bill 524 toward the rear of the bed plate 188; and after that carrier has moved a total of approximately two and three-eighths inches, the roller 236 on the pin 234 will engage the leading edge of the elongated member 364. Prior to the engagement of roller 236 with the elongated member 364, the carrier 226 will have moved the leading edge of the bill 524 past the air gaps of both of the magnetic heads 318 and 344. As a result, the ensuing rotation of magnetic head 344 and brush 342 into clamping engagement with the bill 524 cannot bend, crumple, or roll the leading edge of that bill.

From the time the carrier 226 starts moving until the time the roller 236 engages the leading edge of member 364, there is no drag on the motor 164 other than the frictional drag of the sprocket chain 262 and its sprockets, of the bead chain 314 and its gears and pulleys, and of the carrier 226. As a result, while the total elapsed time between the start of the movement of the carrier 226 and the engagement of roller 236 with the member 364 is only a small fraction of a second, the motor 164 is able to reach its synchronous speed before that engagement occurs. This is desirable because the torque of a synchronous motor is optimum when that motor is operating at its synchronous speed; and, consequently the motor 164 is able to continue to operate at its synchronous speed even after the roller 236 engages and moves the member 364. That speed is such that the bill 524 will be moved toward the rear of the bed plate 188 at a predetermined rate of speed, and that rate of speed will not be substantially less than two inches per second and will not be substantially greater than twenty-five inches per second.

The roller 236 will lift the member 364 and thereby force the arm 356 and the shaft 334 to rotate in the counterclockwise direction. That rotation will rotate the bracket 338 in the counterclockwise direction and will move the magnetic head 344 down against the bill 524 and will also move the brush 342 down against the bill 524. The bristles of the brush 342 will coact with the curved upper face of the magnetic head 318 to bow one portion of the bill 524 upwardly whereas the curved face of the magnetic head 344 will coact with the bristles of the brush 324 to bow another portion of that bill downwardly. The bowings of those portions of the bill 524 are important because they enable the grid lines of the background for the portrait to intimately engage the air gap of one or the other of the magnetic heads. Those bowings also are important because they tend to smooth out any wrinkles in the bill as those wrinkles pass by the air gaps of the magnetic heads. In addition, those bowings of those portions of the bill 524 are helpful because they provide a stiffening effect for the bill as it moves through the currency detector.

The roller 236 and the elongated member 364 coact to provide rapid rotation of the arm 356, and thus of the bracket 338, in the counterclockwise direction. The carrier 226 will not have to move more than about one-quarter of an inch, beyond the point where it moved the roller 236 into engagement with the member 364, to fully raise that member and to fully rotate the brush 342 and the magnetic head 344 into clamping engagement with the bill 524.

Continued movement of the carrier 226 will cause the portrait background 528 to move past the air gap 320 of the magnetic head 318 or the air gap 345 of the magnetic head 344; and it will do so at the said predetermined speed. As the portion of the background 528, intermediate the leading edge of the portrait frame and the leading edge of the portrait 526, engages one or the other of the air gaps 320 or 345, the vertical grid lines thereof will, if printed with magnetic ink, vary the magnetic reluctance of that air gap and thereby cause the series-connected coils of the magnetic head for that air gap to experience voltage variations. Those voltage variations will be applied to the signal input terminals of the unit 426; and, if the inserted bill is an authentic one dollar bill of the United States of America, those voltage variations will cause the unit 426 to energize the coil of relay 428. The portrait 526 will then pass by that air gap; but the spacing, width and magnetic properties of the ink lines in that portrait are not such as to enable the unit 426 to keep the coil of relay 428 energized. That coil will thus become deenergized as soon as the portrait 526 moves into register with the air gap 320 or 345. As the portion of the background 528, intermediate the trailing edge of the portrait 526 and the trailing edge of the portrait frame, passes that air gap, the vertical grid lines thereof will, if printed with magnetic ink, vary the magnetic reluctance of that air gap and cause the series-connected coils of the magnetic head containing that air gap to experience further voltage variations. Those further voltage variations will also be applied to the signal input terminals of the unit 426. If the inserted bill was an authentic one dollar bill of the United States of America those further voltage variations will cause the unit 426 to reenergize the coil of relay 428. That relay coil will again become de-energized as the trailing edge of the portrait frame passes beyond the air gap, because the spacing, width and magnetic properties of the ink lines located exteriorly of the portrait frame are not such as to enable the unit 426 to keep the coil of relay 428 energized. The exact manner in which the voltage variations applied to the signal input terminals of the unit 426 enable that unit to energize the coil of relay 428 is explained in full hereinafter.

The first energization of the coil of relay 428 moves the movable contact of that relay down into engagement with the fixed contact 440, thereby establishing an energizing circuit for the coil of relay 446; that circuit starting at prong 412 and extending past junctions 416 and 420, through switch 154, past junctions 434, 432 and 430, through the movable contact and the fixed contact 440 of relay 428, through the contacts 456 and 454 of relay 462, past junctions 452 and 448, through the coil of relay 446, and then past the junctions 466, 480, 482 and 418 to the prong 414. The resulting energization of the coil of relay 446 causes the contacts 442 and 444 to close; and the closing of contacts 444 establishes a holding circuit for the relay 446. That holding circuit starts at prong 412 and extends past the junctions 416 and 420, through the switch 154, past the junctions 434, 432 and 430, through the contacts 444, past the junction 448, through the coil of relay 446, and then past the junctions 466, 480, 482 and 418 to the prong 414. The closing of the contacts 442 presets an energizing circuit for the coil of relay 462; and that present circuit starts at prong 414 and extends past the junctions 418, 482, 480 and 466, through the coil of relay 462, past the junctions 464 and 450, and through the now-closed contacts 442 to the fixed contact 438 of relay 428.

This means that when the carrier 226 moved the bill 524 so the leading portion of the background 528 of that bill engaged the air gap of the appropriate magnetic head, the resulting voltage variations caused the unit 426 to send a validating signal to the relay 428 that energized that relay and relay 446 and that preset an energizing circuit for the relay 462. As the leading portion of the background 528 passed beyond the air gap of the magnetic head, and the portrait 526 moved into engagement with that air gap, the unit 426 became unable to keep the coil of relay 428 energized; and thereupon the movable contact of that relay moved back into engagement with the fixed contact 438. Such movement completed the preset circuit for the coil of the relay 462; that circuit continuing on through the fixed contact 438 and the movable contact of the relay 428, past the junctions 430, 432 and 434 to the switch 154, through that switch, and then past the junctions 420 and 416 to the prong 412. The contacts 460 close and the movable contact 456 engages the fixed contact 458 as soon as the coil of relay 462 is energized; and the closing of the contacts 460 establishes a holding circuit for the relay 462. That circuit starts at prong 412, extends past the junctions 416 and 420, through the switch 154, past the junctions 434, 432 and 430, through the closed contacts 444, past the junctions 448 and 452, through the now-closed contacts 460, past the junction 464, through the coil of relay 462, and then past the junctions 466, 480, 482 and 418 to the prong 414. The movement of contact 456 into engagement with fixed contact 458 presets an energizing circuit for the coil of relay 476; and that circuit starts at prong 414, extends past the junctions 418, 482 and 480, through the coil of relay 476, past the junction 478, and through the contacts 458 and 456 to the fixed contact 440 of relay 428.

Subsequently, when the trailing portion of the background 528 of the bill 524 engages the said air gap of the said magnetic head, the unit 426 will send a second validating signal and will again energize the coil of relay 428. The movable contact of that relay will thereupon move down into engagement with the contact 440 and complete the preset energizing circuit for relay 476; that circuit continuing past the junctions 430, 432 and 434, through the switch 154, and past the junctions 420 and 416 to the prong 412. The resulting energization of the coil of relay 476 closes the contacts 470, 472 and 474. The closing of the contacts 472 completes a holding circuit for the coil of relay 476; and that circuit starts at prong 412, extends past junctions 416 and 420, through the switch 154, past the junctions 434, 432 and 430, through the contacts 444, past the junctions 448 and 452, through the contacts 460, past the junctions 464, 450 and 468, through the now-closed contacts 472, past the junction 478, through the coil of relay 476, and then past the junctions 480, 482 and 418 to the prong 414. The closing of contacts 470 presets an energizing circuit for the solenoid 126; that circuit starting at the prong 414, extending past the junctions 418, 422, 423 and 424, through the solenoid 126, through the now-closed contacts 470, and past the junctions 468 and 450, and through the contacts 442 to the fixed contact 438 of relay 428. The closing of contacts 474 presets an energizing circuit that extends from the prong 412, past the junctions 416 and 484, through the now-closed contacts 474, through the movable and left-hand contacts of switch 398 to the movable contact 502 of the relay 494 in the vending machine.

As the carrier 226 moves the trailing portion of the background 528 beyond the air gap of the magnetic head, the unit 426 becomes again unable to hold the coil of relay 428 energized. Thereupon the movable contact of that relay again moves into engagement with the fixed contact 438. Such movement completes the pre-set circuit for the solenoid 126; that circuit continuing on past the junctions 430, 432 and 434, through the switch 154 and then past the junctions 420 and 416 to the prong 412. The resulting energization of the solenoid 126 causes the plunger 128 to move to the right; thereby rotating the L-shaped lever 374 in the clockwise direction to force the roller 380 to clamp the bill 524 between itself and the disc or roller 290. The disc or roller 290 has been rotating, and will continue to rotate, under the action of the bead chain 314; and the peripheral speed of that roller is equal to the linear speed of the carrier 226. As the roller 380 engages the bill 524, that roller will begin to rotate in the opposite angular direction to, but at the same speed as, the disc or roller 290. Consequently, the rollers 290 and 380 will neither speed up nor retard the rate of movement of the bill 524.

The carrier 226 and the bill 524 will continue to move toward the rear of the bed plate 188; and by the time that carrier has moved a total of approximately five and three-quarter inches toward the rear of the bed plate 188, the roller 236 will move out from under the trailing edge of the horizontal portion of the elongated member 364. Thereupon the spring 352 will rotate the bracket 338 and the arm 356 to the elevated position shown in FIG. 1. In doing so, that spring will relieve the bill 524 of the frictional drag which was applied to that bill by the magnetic heads 318 and 344 and by the brushes 342 and 324.

Continued movement of the carrier 226 toward the rear of bed plate 188 will move the upper ends of the levers 242 into engagement with the rounded surfaces 90 on the bars 88 and 92. That engagement will rotate the levers 242 in the counterclockwise direction and thereby rotate the clamps 246 to the elevated position shown by solid lines in FIG. 9. Such rotation frees the bill 524 from the carrier 226 and enables the rollers 290 and 380 to continue to move at undiminished speed toward the rear of the bed plate 188, even though the carrier 226 will begin to decelerate and will then halt its further rearward movement. That deceleration of the carrier 226 will start when the pin 260 reaches the sprocket gear 282.

As the bill 524 moves rearwardly under the action of the rollers 290 and 380, the leading edge of that bill will engage the lower end of switch arm 400 and move that arm from the solid line position to the dotted line position of FIG. 6. In doing so, that bill will cause the switch to shift its movable contact into engagement with its righthand fixed contact; and thereupon a circuit will be closed that starts at prong 412 and extends past junctions 416 and 484, through contacts 474, through the movable contact and righthand fixed contact of switch 398, past junction 495, through the coil of relay 494, and then past the junctions 492, 490, 486, 482 and 418 to the prong 414. That circuit causes the relay 494 to close its contacts 502 and to shift its contact 498 into engagement with the fixed contact 496; and that shifting of contact 498 establishes a holding circuit for the coil of relay 494. That holding circuit starts at prong 414 and extends past the junctions 418, 482, 486, 490 and 492, through the coil of relay 494, past junction 495, through contacts 496 and 498, through delivery switch 512, and then past junctions 488, 484 and 416 to prong 412; and that circuit will keep the relay 494 energized until after the vending machine vends the desired product.

The bill 524 will continue to move, under the action of the rollers 290 and 380; and the leading edge of that bill will pass between the rollers 302 and 390. Those rollers are rotating at the same angular speed as the rollers 290 and 380, but they are larger in diameter and thus have higher peripheral speeds. The rollers 302 and 390 will, therefore, quickly move the bill 524 beyond the carrier 226 and direct it to a cash box, not shown, adjacent the rear of the flanges 70 and 72 of rear plate 68. As the trailing edge of the bill 524 passes out of engagement with the lower end of the switch arm 400, that switch arm will return to the solid line position shown by FIG. 6 and enable the movable contact of switch 398 to reengage the left-hand fixed contact of that switch. Thereupon, a circuit will be completed that starts at prong 412 and extends past the junctions 416 and 484, through the contacts 474, through the movable contact and the lefthand fixed contact of switch 398, through the contacts 502 of relay 494, past junction 510, through the coil of relay 504, and then past the junctions 490, 486, 482 and 418 to the prong 414. The resulting energization of the coil of relay 504 closes the contacts 506 and 508; thereby establishing a holding circuit for relay 504 and establishing a running circuit for the cycling device 514 of the vending machine. The holding circuit for the coil of relay 504 starts at prong 414 and extends past the junctions 418, 482, 486 and 490, through the coil of relay 504, past junction 510, through contacts 506, through delivery switch 512, and then past the junctions 488, 484 and 416 to prong 412. The running circuit for cycling device 514 starts at prong 414 and extends past the junctions 418, 482 and 486, through the cycling device 514, through the contacts 508, and then past the junctions 488, 484 and 416 to the prong 412. The relays 494 and 504, and the cycling device 514, will cause the vending machine to pass through one complete cycle and to vend the required product before the delivery switch 512 opens to deenergize those relays and that cycling device.

While the bill 524 was being advanced by the rollers 290 and 380, the pin 260 approached and then rotated one hundred and eighty degrees about the gear 282 on the shaft of the motor 164; and as it did so it caused the carrier 226 to decelerate, to halt its forward movement, and to start moving back toward the front plate 50. Continued rotation of the shaft of motor 164 will cause the carrier 226 to move to the left in FIG. 1; and, before the carrier has moved a total of half an inch to the left, the upper ends of the levers 242 will move out of engagement with the rounded surfaces 90 on the bars 88 and 92. Thereupon the springs 248 will again rotate the jaws 246 into clamping engagement with the bearing plates 230. If the trailing edge of the bill 524 has been moved beyond the trailing edges of the jaws 246, those jaws will come to rest on the upper faces of the bearing plates 230. If the trailing edge of the bill 524 has not been moved beyond the trailing edges of the jaws 246, those jaws will rest upon that bill; but the eccentric mounting of those jaws will enable those jaws to rotate in the counterclockwise direction to let the bill continue to move to the right under the action of the rollers 302 and 390.

By the time the carrier 226 has moved approximately three quarters of an inch along its return path, the roller 236, on the pin 234 mounted on the carrier 226, will have reached a position where it is in vertical registry with the trailing edge of the horizontal portion of the elongated member 364. However, that roller will not engage that horizontal portion at that moment because that horizontal portion will be in the lower position indicated by solid lines in FIG. 1. Not until the carrier 226 has moved a total of approximately two and one-quarter inches along its return path, will the roller 236 engage the horizontal portion of the member 364. Continued movement of the carrier 226 along its return path will cause the roller 236 to rotate the member 364 downwardly from the solid line position to the lowermost dotted line position of FIG. 1. The intermediate dotted line position of member 364 in FIG. 1 represents the extent to which the roller 236 has rotated that member downwardly at the time that roller has been moved back to its second righthand-most dotted line position in FIG. 1. That roller will continue to move with the carrier 226, and it will move out of engagement with the lefthand end of the horizontal portion of the member 364 after the carrier 226 has moved more than four and one-eighth inches from the extreme righthand position shown by dotted lines in FIG. 1. During the time the roller 236 engaged and moved the horizontal portion of the member 364 downwardly, the spring 366 yielded to permit such movement; but as soon as the roller 236 moved beyond the lefthand end of the horizontal portion of the member 364, the spring 366 pulled that member back up to the solid line position of FIG. 1. The spring 366 thus holds the member 364 in position to enable it to act as a cam follower for the roller 236 during the righthand movement of the carrier 226, and yet enables that member to move down and let the roller 236 pass by during the return movement of the carrier 226.

As the carrier 226 moves within about three sixteenths of an inch of its normal, at-rest position, the stops 60 and 62 will engage the levers 242 and rotate those levers in the counter clockwise direction, thereby rotating the clamps 246 to the position shown by solid lines in FIG. 9. As the carrier 226 moves within about one eighth of an inch of its normal, at-rest position, the L-shaped bracket 252 will reengage the springy actuator 158 of the switch 154 and open the contacts of that switch. The motor 164 will not coast very much, but it will coast enough to move the pin 260 to the position by FIG. 5. This completes the cycle of the currency detector and readies it for the testing of the next bill introduced into it. As the switch 154 was reopened, it deenergized the solenoid 116 and it also interrupted the holding circuits for the relays 446, 462 and 476. Thereupon the solenoid 116 will permit the spring 120 to press the bottom of the plunger 118 down against the bed plate 188. The interruption of the holding circuits for the relays 446, 462 and 476 will restore the various contacts of those relays to the positions shown by FIG. 10; and the reopening of contacts 470 will deenergize the solenoid 126 to permit the spring 386 to raise the roller 380, and the reopening of contacts 474 will interrupt the circuit that extends through the switch 398 to the coil of the relay 504. However, the interruption of the latter circuit will not interfere with the completion of the cycle of the vending machine because the holding circuit of the relay 504 will keep that relay energized and will enable the cycling device 514 to complete its cycle.

The total time that elapses between the pressing of the push button 520 by the patron and the return of the carrier 226 to the solid line position of FIG. 1 will, depending upon the rate of movement of the carrier 226, range from just over a second to less than a second; and during that time the currency detector tests the bill 524, causes the unit 426 to pass two validating signals to the relay 428, causes the contacts 474 to set up an "accept" signal for the vending machine, causes the switch 398 to pass that accept signal to the vending machine, causes the bill 524 to be delivered to the cash box, causes the carrier 226 to return to its normal, at-rest position, restores the relays 446, 462 and 476 to their normal positions, and deenergizes the motor 164 and the solenoids 116 and 126. If the vending machine has such a short cycle that it completes that cycle before the carrier 226 returns to its normal, at-rest position, the completion of that cycle will not give an undesired result because the opening of the delivery switch 512 at the completion of the cycle of the vending machine will deenergize the relay 494 and cause the contacts 502 to open and isolate the relay 504 from the contacts 474 and from the switch 398. As a result, if an authentic one dollar bill of the United States of America is introduced into the currency detector of FIGS. 1–10, it will be accepted and will cause the vending machine to pass through one cycle.

As the bill 524 passes between the rollers 302 and 390, it also passes beneath the eccentrically mounted discs 392. Those discs permit free movement of that bill in the righthand direction in FIG. 1; but they will respond to efforts to move that bill in the lefthand direction to rotate into clamping position with that bill and defeat such effects while that bill is between the rollers 302 and 390. This is desirable because it will deter persons from attaching threads, wires, tapes or other "tails" to bills and withdrawing those bills from the currency detector after the switch 398 has passed an accept signal to the vending machine. It will be noted, from FIG. 6, that the lower end of the switch arm 400 moves beyond the point of tangency of the rollers 302 and 390; and the movable contact of the switch 398 will be set so it will not engage the righthand fixed contact of that switch until the lower end of the switch arm 400 is adjacent the dotted line position shown in FIG. 6. This means that if a person is able, by means of a thread, a wire, a tape or some other "tail," to overcome the pressure applied to the bill by the rollers 290 and 380 after the jaws 246 have released that bill but before the rollers 302 and 390 have picked up the leading edge of that bill, and to pull the bill back out through the opening 52 in the front plate 50, that person would get his bill back but he would not get the product from the vending machine. Not until the switch arm 400 has been moved closely adjacent the dotted line position shown by FIG. 6, will the accept signal be transmitted to the vending machine relay 494; and by that time the rollers 302 and 390 will have gripped the leading edge of that bill. Once the rollers 302 and 390 grip the leading edge of a bill, they will quickly move that bill beneath the eccentrically mounted discs 392 and thereafter those discs will prevent withdrawal of that bill.

If the inserted bill is a spurious bill, its passage adjacent the air gap 320 or 345 should either provide no voltage variations in the coils of the magnetic heads 318 and 344, or should provide voltage variations of the wrong frequency or of the wrong intensity, or should fail to generate two sets of voltage variations. In any of those events, the unit 426 would not provide two successive energizations and deenergizations of the coil of the relay 428; and the overall result would be that the solenoid 126 would not be energized as the carrier 226 approached the rear of the bed plate 188. This means that when the clamps 246 released the bill, as the levers 242 engaged the rounded edges 90 of the bars 88 and 92, that bill would come to rest and not be advanced toward the switch arm 400. That bill would remain at rest until the carrier 226 started its return movement; and thereafter, as the levers 242 moved away from the bars 88 and 92, they would permit the jaws 246 to reclamp the bill and start moving it back to the opening 52 in the front plate 50. The confining plate 208 is particularly helpful at this time because it keeps the trailing portions of the bill from raising upwardly, crumpling, bending or rolling and thus causing a jam. The roller 380 offers no hindrance to the return movement of the bill because that roller was not moved down by the solenoid 126, the brush 322 and the magnetic head 344 offer no hindrance to the return movement of the bill because they remain in elevated position as the roller 236 rotates the elongated member 364 downwardly, and the plunger 118 of the solenoid 116 offers no hindrance to the return movement of the bill because that solenoid remains energized until the carrier is immediately adjacent its normal, at-rest position. Consequently, if the inserted bill is spurious, that bill will be returned to the patron.

The product to be vended by the wending machine can have a sales price of one dollar or can have a lesser sales price. Where the sales price is less than one dollar, an electrically operated change dispenser can be connected in parallel with the cycling device 514, or a mechanically operated change dispenser can be driven by the cycling device 514. Also, if desired, the currency detector could be used to directly operate an electrically operated change dispenser. However, such change dispensers are not, per se, a part of the present invention.

*Components of embodiment of currency detector shown by FIGURES 11–14*

Referring to FIGURES 11–14, an embodiment of currency detector is shown that is similar to the embodiment of currency detector shown by FIGURES 1–10. Those components of the currency detector of FIGURES 11–14 which are identical to corresponding components of the currency detector of FIGURES 1–10 are denoted by the same numerals. The principal differences between the currency detectors of FIGURES 11–14 and FIGURES 1–10 reside in the addition of a switch 562 adjacent the front of the currency detector, in the use of a shorter and differently perforated bed plate 544 and a shorter and differently perforated confining plate 545, in the use of a shorter top plate 547 and a shorter bottom plate 549, in the addition of a switch 568 adjacent the rear of the currency detector, in the addition of a relay 580 in the vending machine, and in the addition of a fourth pair of normally open contacts 578 for the relay 476 of the relay chain. The plates 544, 545, 547 and 549 were shortened by removing short lengths from the fronts thereof.

The bed plate 544 has downwardly depending sides 546 with outwardly projecting flanges 548. Viewed from either end, the bed plate 544 is identical to the bed plate 188; but the bed plate 544 is short enough to have the trailing edge of an inserted bill adjacent the front thereof when the leading edge of that bill is adjacent the rear thereof. The confining plate 545, the top plate 547 and the bottom plate 549 are also correspondingly short.

Figure 13:
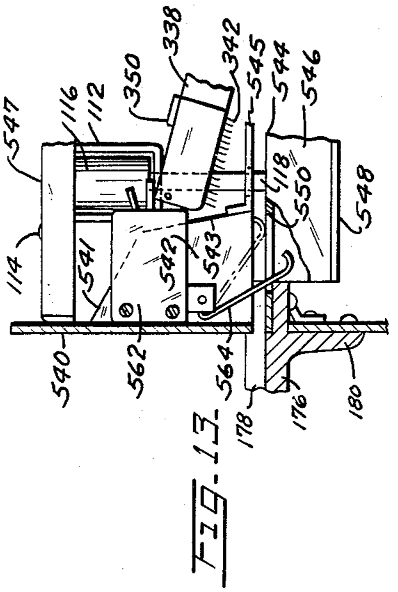
FIGURE 13 is a partially broken sectional view through the portion of the currency detector shown in FIGURE 12, and it is taken along the plane indicated by the line 13—13 in FIGURE 12.

The bed plate 544 has an opening 550 adjacent the front thereof, as shown by FIGURE 13, and that opening accommodates a re-entrant bend in the actuating arm 564 of switch 562. A returning spring, not shown, within that switch urges that bend down into the opening 550, but that spring can yield to permit that bend to rise upwardly out of that opening. That returning spring is capable of yielding readily when a bill has its leading edge pressed against the actuating arm 564. This means that as a patron inserts a bill, the leading edge of that bill will engage the actuating arm 564 and rotate that arm in the counterclockwise direction; and such rotation will shift the movable contact of switch 562, shown in FIGURE 14, out of engagement with its righthand fixed contact and into engagement with its lefthand fixed contact.

The switch 562 is secured to one of the walls 542 which define the sides of a finger-receiving recess that extends rearwardly from the rear face of the front plate 540. The actuating arm 564 is mounted for movement in a vertical plane which is intermediate one of the gripping jaws 246 and the finger-receiving recess; and hence the finger-receiving recess of the currency detector of FIGURES 11–14 must be narrower than the finger-receiving recess of the currency detector of FIGURES 1–10. The finger receiving recess of FIGURES 11–14 extends rearwardly from an inverted, T-shaped opening in the front plate 540; and that opening is similar to, but has a narrower vertical portion than does, the opening 52 in the front plate 50. The finger-receiving recess has a rear wall with a sharply inclined portion 541 and with a less sharply inclined portion 543. The bottom of the recess is open to enable a patron to use his fingers to advance the leading edge of an inserted bill into engagement with the lower end of the plunger 118. The actuating arm 564 of switch 562 will, of course, cause a slight increase in resistance to the introduction of the bill; but that increase in resistance has not been found to interfere with the ready insertion of bills.

The confining plate 545 has an opening 556 adjacent the leading edge thereof, and the bed plate 544 has a similar opening. These openings accommodate the bracket 338 which carries the brush 342 and the magnetic head 344. The leading edge of the confining plate 545 is secured to the portion 543, as shown by FIGURE 13.

Figure 14:
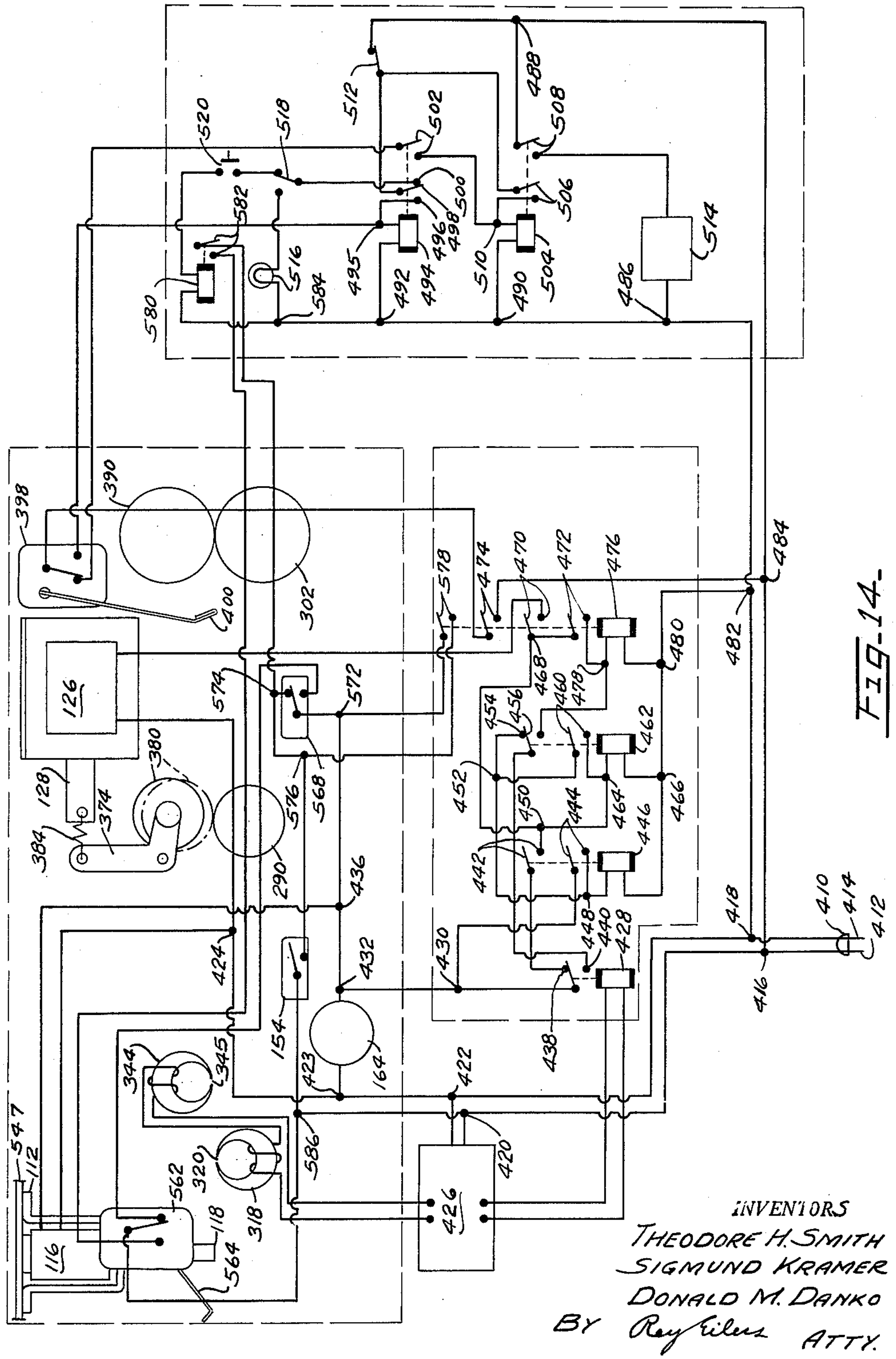
FIGURE 14 is the wiring diagram of the currency detector of FIGURE 11 and of a typical vending machine with which that currency detector can be used.

The switch 568 is secured to the flange 140 of the bottom plate 549 of the currency detector by fasteners 569, such as screws. That switch is a single-pole double-throw switch, and it has a resilient actuator 570. When that actuator is in the raised position of FIGURE 11, the movable contact of that switch will be adjacent its upper contact, as shown by FIGURE 14. However, that actuator is in register with the L-shaped bracket 252 on the carrier 226; and when that bracket is in the dotted line position of FIGURE 11, it will hold the actuator 570 in its lower position and will, therefore, force the movable contact of switch 568 to engage its lower contact. Hence, the L-shaped bracket 252 will hold the switch 154 open whenever the carrier 226 is in its normal, at-rest position, and that bracket will hold the movable contact of switch 568 adjacent its lower contact whenever that carrier is at the rear of the bed plate 544.

Referring particularly to FIGURE 14, the switch 562 has its movable contact connected to the prong 412 of plug 410 by junctions 586, 420 and 416. The lefthand fixed contact of that switch is connected directly to the fixed contact 582 of relay 580; and the righthand fixed contact of that switch is connected directly to the lower fixed contact of switch 568. The movable contact of switch 568 is connected to the motor 164 by junctions 572, 436 and 432, and it is connected to the movable contact 578 of relay 476 by the junction 572. The movable contact of switch 568 is also connected to movable contact 444 of relay 446 and to the movable contact of relay 428 by junctions 572, 436, 432 and 430. The upper fixed contact of switch 568 is connected to the movable contact 582 of relay 580 by junction 574; and it is connected to the fixed contact of switch 154 by the junctions 574 and 576, and is connected to the fixed contact 578 of relay 476 by junctions 574 and 576.

*Operation of currency detector of FIGURES 11–14*

To operate the currency detector of FIGURES 11–14, a patron will place a bill on the platform 176 and will then advance the leading edge of that bill toward the plunger 118 of solenoid 116. As that bill moves toward that plunger, the leading edge of that bill will engage that portion of the actuating arm 564 which is intermediate the leading edge and the re-entrant portion of that arm, and will thereby raise that arm. In doing so, that leading edge will cause the movable contact of switch 562 to shift out of engagement with its righthand fixed contact and into engagement with its lefthand fixed contact. Thereafter, the parton will press the push button 520; and, in doing so, will complete a circuit which starts at prong 412 and extends past junctions 416, 484 and 488, through delivery switch 512, past contacts 498 and 500, through the empty switch 518, through the push button 520, through the coil of relay 580, and past the junctions 584, 492, 490, 486, 482 and 418 to the prong 414. That circuit causes the relay 580 to close its contacts 582; and thereupon two circuits are completed. One of those circuits starts at prong 412 and extends past the junctions 416, 420 and 586 to the movable contact of switch 562, through that movable contact and through the lefthand fixed contact of switch 562 to the fixed contact 582 of relay 580, through the movable and fixed contacts of that relay, past the junction 574, through the upper fixed contact and the movable contact of switch 568, past the junctions 572, 463 and 432 to the motor 164, and then past the junctions 423, 422 and 418 to the prong 414; and the other of those circuits extends from prong 412 past the junctions 416, 420 and 586, through the movable contact and lefthand fixed contact of switch 562, through the contacts 582 of relay 580, past the junction 574, through the upper fixed contact and movable contact of switch 568, past the junctions 572 and 436 to the solenoid 116, and then past the junctions 424, 423, 422 and 418 to the prong 414. These two circuits energize the motor 164 and the solenoid 116; and thereupon the plunger 118 will be pulled up out of the path of the inserted bill, and the motor will start moving the carrier 226 toward the rear of the bed plate 544.

As soon as that carrier starts moving, the L-shaped bracket 252 will free the actuator 158 of switch 154; and thereupon the contacts of that switch will close and establish a holding circuit for the solenoid 116 and a running circuit for the motor 164. That holding circuit starts at prong 412 and extends past junctions 416, 420 and 586, through the switch 154, past junctions 576 and 574, through the upper fixed contact and the movable contact of switch 568, past junctions 572 and 436 to the solenoid 116, and thence past junctions 424, 423, 422 and 418 to the prong 414. That running circuit starts at prong 412 and extends past junctions 416, 420 and 586, through the switch 154, past junctions 576 and 574, through the upper fixed contact and the movable contact of switch 568, past junctions 572, 436 and 432, through the motor 164, and then past the junctions 423, 422 and 418 to the prong 414. The carrier 226 will enable the switch 154 to close its contact within a small fraction of a second after the push button 520 has been pressed; and the switch 154 will continue to maintain the holding circuit for solenoid 116 and to maintain the running circuit for motor 164, as long as the switch 568 remains in its normal, at-rest position.

As the carrier 226 moves toward the rear of the bed plate 544 it will cause the gripping jaws 246 to move downwardly into gripping engagement with the inserted bill, and those jaws will then move that bill toward the rear of the bed plate. Those jaws will move into clamping engagement with the bill almost immediately after the carrier has freed the actuator 158 of switch 154. As the carrier 226 continues to move the inserted bill rearwardly toward the rear of the bed plate 544, the roller on that carrier will cause the bracket 338 to rotate in the clockwise direction in FIGURE 11 and move the brush 342 down into engagement with the lower magnetic head while moving the magnetic head 344 down into engagement with the lower brush. That rotation will occur after the leading edge of the bill has been moved rearwardly of the air gap of magnetic head 344.

If the bill is an authentic one dollar bill of the United States of America, the series-connected coils on the core of magnetic head 318, or the series-connected coils on the core of magnetic head 344, will generate voltage variations and apply them to the signal input terminals of the unit 426; and those voltage variations will enable that unit to supply two validating signals to the coil of relay 428. Those validating signals will cause the relay chain to operate in the manner described in connection with the operation of the currency detector of FIGURES 1–10; and they will cause the coil of relay 476 to become energized and to close its contacts 470, 472, 474 and 578. The closing of the contacts 472 will establish a holding circuit for the relay 476; and that circuit starts at prong 412 and extends past junctions 416, 420 and 586, through switch 154, past junctions 576 and 574, through the upper fixed contact and the movable contact of switch 468, past junctions 572, 436, 432 and 430, through relay contacts 444, past junctions 448 and 452, through relay contacts 460, past junctions 464, 450 and 468, through relay contacts 472, through the coil of relay 476, and then past junctions 480, 482 and 418 to the prong 414.

Figure 11:
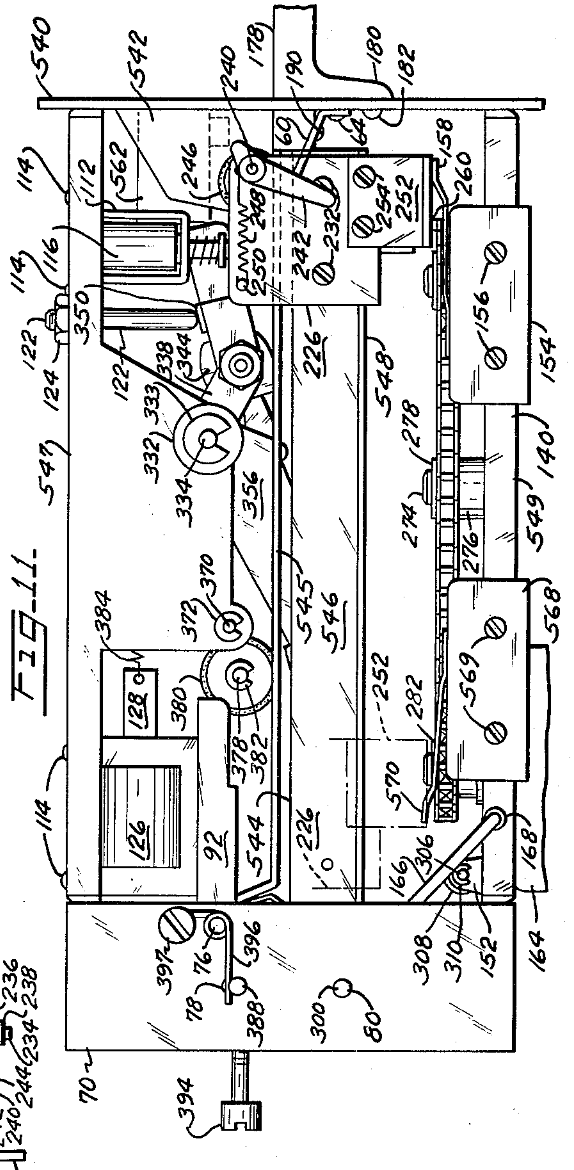
FIGURE 11 is a side elevational view of another embodiment of currency detector that is made in accordance with the principles and teachings of the present invention, but that currency detector has been rotated one hundred and eighty degrees around a vertical axis from the position occupied by the currency detector in FIGURE 1.
Figure 12:
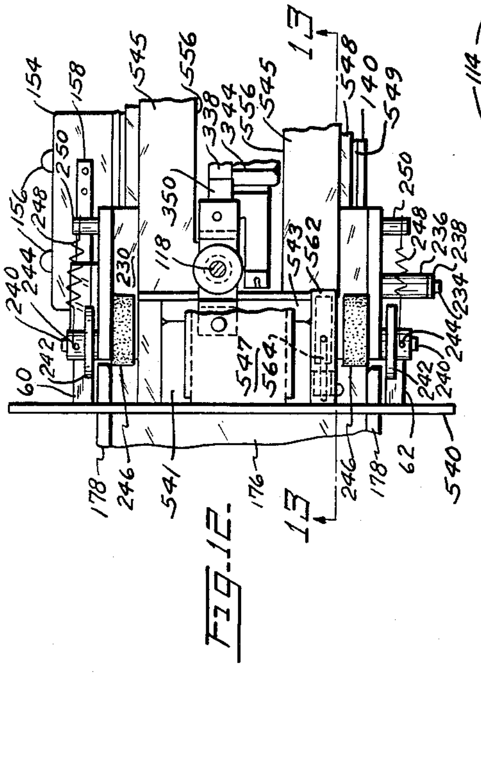
FIGURE 12 is a partially broken plan view of a portion of the right-hand end of the currency detector of FIGURE 11, but it shows that end as it has been rotated one hundred and eighty degrees about a vertical axis from the position occupied by it in FIGURE 11.

The closing of relay contacts 578 will provide a shunting of the movable contact and the upper fixed contact of the switch 568; and consequently, when the carrier 226 moves to the dotted line position of FIGURE 11 and causes the actuator 570 of switch 568 to move the movable contact of that switch down into engagement with the fixed contact of that switch, therewill be no interruption of the holding circuit for the solenoid 116 or of the running circuit for the motor 164. As a result, the motor 164 will continue to rotate and will move the pin 260 around the gear 282 and cause the carrier 226 to start moving back toward the front of the bed plate 544.

The closing of the relay contacts 470 will energize the solenoid 126 by completing a circuit that starts at prong 412 and extends past junctions 416, 420 and 586, through the switch 154, past junctions 576 and 574, through the upper fixed contact and the movable contacts of switch 568, past the junctions 572, 436, 432 and 430, through the movable contact and contact 438 of relay 428, through the relay contacts 442, past the junctions 450 and 468, through the relay contacts 470, through solenoid 126, and then past the junctions 424, 423, 422 and 418 to the prong 414. The solenoid 126 will then move the roller 380 down into engagement with the bill and enable that roller to coact with the disc or roller 290 to advance the bill toward the arm 400 of switch 398. That bill will then shift the movable contact of switch 398 out of engagement with its lefthand fixed contact and into engagement with its righthand fixed contact. The rollers 302 and 390 will then grip the leading edge of the bill and move that bill to the cash box; and thereupon the switch arm 400 will be enabled to return to its normal, at-rest position. The resultant movement of the movable contact of switch 398 out of its righthand position into its lefthand position will initiate a vending cycle of the vending machine; all as described in connection with the operation of the currency detector of FIGURES 1–10.

As the carrier 226 passes dead center and moves forwardly from its rearmost position, it will move the L-shaped bracket 252 out of engagement with the actuator 570 of switch 568; and thereupon the movable contact of that switch will move back up into engagement with the upper fixed contact of that switch. The carrier 226 will continue to move toward its normal, at-rest position until the L-shaped bracket 252 thereon re-engages the resilient arm 158 of switch 154 and thereby opens that switch. At such time, the holding circuit of the solenoid 116, the running circuit of the motor 164, and the holding circuit of the relays 446, 462, and 476 will be broken. The carrier 226 will come to rest, the solenoid plunger 118 will come to rest on the upper face of the bed plate 544, and the contacts of the relays 446, 462 and 476 will return to the positions shown by FIGURE 14.

The switch 568 does not, where the inserted bill is authentic and of the proper denomination, make the operation of the currency detector of FIGURES 11–14 appreciably different from the operation of the currency detector of FIGURES 1–10. However, where the inserted bill is an unacceptable bill, the switch 568 makes the operation of the currency detector of FIGURES 11–14 materially different from the operation of the currency detector of FIGURES 1–10. Specifically, if the inserted bill is unacceptable, it will not cause the unit 426 to supply two validating signals to the coil of relay 428; and, therefore, the relay chain will not become actuated. This means that when the carrier 226 reaches the rear of the bed plate 544 and causes the L-shaped bracket 252 to move the movable contact of switch 568 downwardly out of engagement with the upper fixed contact of that switch, the holding circuit for the solenoid 116 and the running circuit for the motor 164 will be broken. Those circuits were not broken when an authentic bill was inserted because the closing of the relay contacts 578 provided a shunting path around the upper fixed contact and the movable contact of switch 568. However, the relay contacts 578 will not close when an unacceptable bill is inserted, and therefore the motor 164 will come to rest and the solenoid 116 will become deenergized.

At this time, the levers 242 will be in engagement with the rounded faces 90 of the bars 88 and 92 adjacent the rear of the currency detector, and those levers will hold the jaws 246 up out of engagement with the bill. Also, at this time, the spring 352 will be holding the bracket 338 in the elevated position shown by FIGURE 11; and the trailing edge of the inserted bill will be within the finger-receiving recess at the rear face of front plate 540. Consequently, the patron will be able to grasp the trailing edge of that bill and withdraw that bill from the currency detector. The lower end of the plunger 118 will be resting on that bill and the arm 564 of switch 562 will also be resting on that bill; but that solenoid and that arm will not prevent the withdrawal of the inserted bill from the currency detector.

As the patron withdraws the unacceptable bill, the leading edge of that bill will pass out from under the arm 564 and permit that arm to return to the position shown by FIGURE 13. As that arm returns to that position, it will permit the movable contact of the switch 562 to shift out of engagement with the lefthand fixed contact and into engagement with the righthand fixed contact of that switch; thereby completing two circuits. One of those circuits starts at the prong 412 and extends past the junctions 416, 420 and 586, through the movable contact and righthand fixed contact of switch 562, through the lower contact and movable contact of switch 568, past the junctions 572, 436 and 432, through the motor 164, and thence past junctions 423, 422 and 418 to the prong 414; while the other of those circuits extends from the prong 412 past the junctions 416, 420 and 586, through the movable contact and righthand fixed contact of switch 562, through the lower fixed contact and movable contact of switch 568, past the junctions 572 and 436, through the solenoid 116, and thence past the junctions 424, 423, 422 and 418 to the prong 414.

Those two circuits energize the motor 164 and the solenoid 116; and the energization of motor 164 causes the carrier 226 to start moving back toward the front of the bed plate 544, while the energization of solenoid 116 again lifts the plunger 118. As soon as the L-shaped bracket 252 on the carrier 226 moves out of engagement with the actuator 570 of switch 568, the movable contact of that switch will return to the raised position shown by FIGURE 14; and that movable contact will then re-establish the running circuit for the motor 164 and the holding circuit for the solenoid 116. That running circuit starts at the prong 412 and extends past junctions 416, 420 and 586, through switch 154, past junctions 576 and 574, through the upper fixed contact and movable contact of switch 568, past the junctions 572, 436 and 432, through the motor 164, and then past the junctions 423, 422 and 418 to the prong 414; and that holding circuit starts at the prong 412 and extends past junctions 416, 420 and 586, through switch 154, past junctions 576 and 574, through the upper fixed contact and movable contact of switch 568, past junctions 572 and 436, through solenoid 116, and then past junctions 424, 423, 422 and 418 to the prong 414. That holding circuit is not particularly useful at this time because the inserted bill has already been withdrawn, but the running circuit is important because it enables the motor 164 to move the carrier 226 back to its normal, at-rest position. As that carrier moves into that position, the L-shaped bracket 252 will re-engage the actuator 158 of the switch 154 and open that switch.

In causing the carrier 226 to remain adjacent the rear of the bed plate 544 when an unacceptable bill is inserted, the currency detector of FIGURES 11–14 avoids all possibility of the bill being crumpled, bent or rolled as it is recovered by the patron. The patron will apply a pull to the trailing portion of that bill and thus maintain that bill under tension as it is withdrawn from the currency detector. The return of unacceptable bills by the currency detector of FIGURES 1–10 is, in the vast majority of instances, accomplished without any crumpling, bending or rolling of those bills. However, an unusually worn and limp bill can sometimes become bent, crumpled or rolled as it is being returned to the patron by the currency detector of FIGURES 1–10; and any such bending, crumpling or rolling is completely avoided by the manual withdrawal provided by the currency detector of FIGURES 11–14.

*Components of currency detector of FIGURES 15–23 and 29*

In FIGURES 15–23 the numeral 600 denotes the housing for another embodiment of currency detector that is provided by the present invention. That housing is generally prismatic, but it has a vertically offset portion 601 at the front thereof; and it has an inclined portion extending upwardly and rearwardly from that offset portion. The housing 600 will be associated with the housing of a vending machine in such a way that the vertically offset portion 601 will be exposed.

Figures 15, 16, 17:
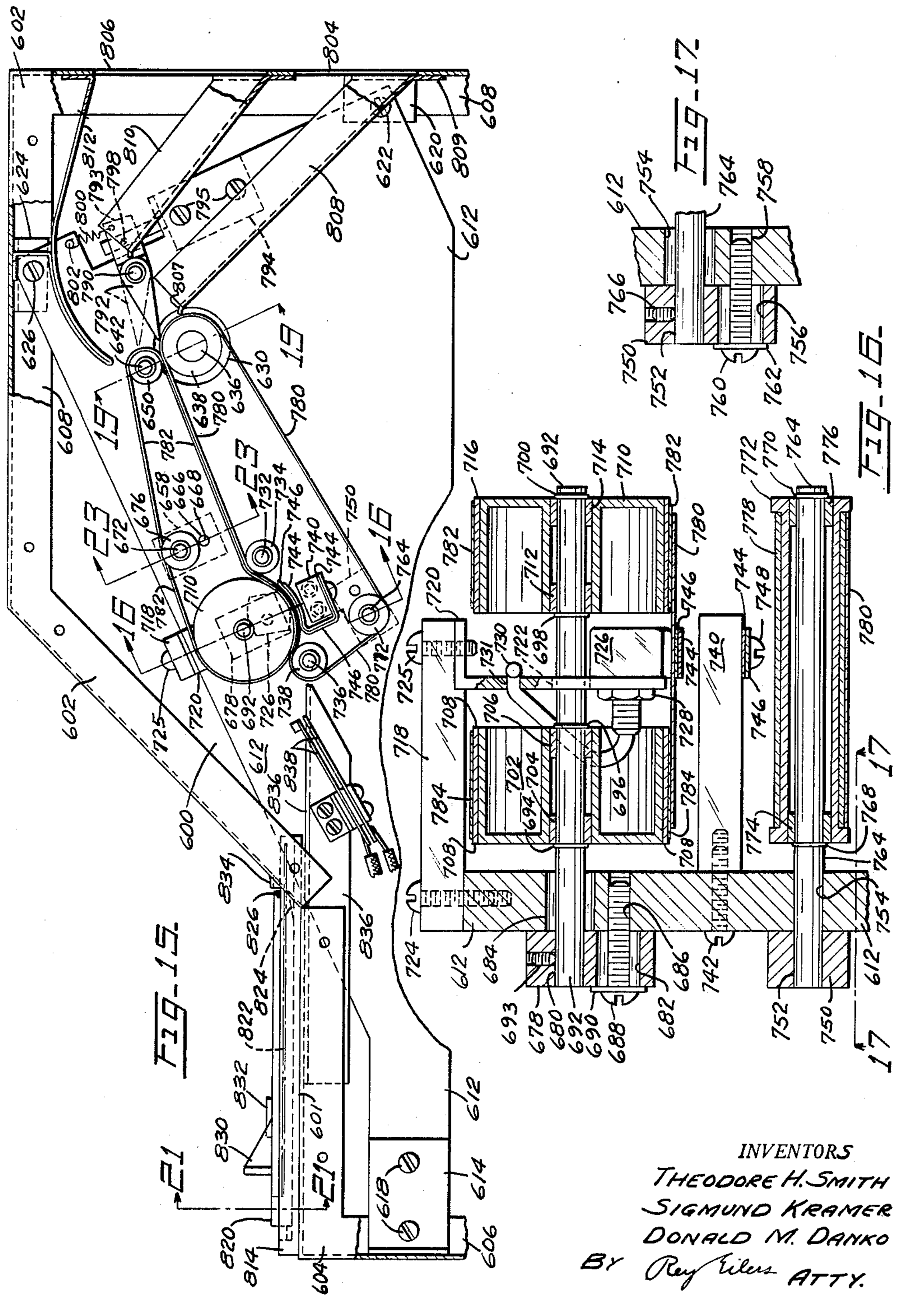
FIGURE 15 is a partially sectioned, partially broken side view of another embodiment of currency detector that is made in accordance with the principles and teachings of the present invention.
FIGURE 16 is a sectional view on an enlarged scale, through the currency detector of FIGURE 15, and it is taken along the broken plane indicated by the line 16—16 in FIGURE 15.
FIGURE 17 is a sectional view on said enlarged scale, through the portion of the currency detector shown in FIGURE 16, and it is taken along the plane indicated by the line 17—17 in FIGURE 16.

The housing 600 has a front wall extending downwardly from the vertically offset portion 601, and has a rear wall, a top, a bottom, and a lefthand side wall. A cover 610 normally closes the righthand side of the housing 600, but that cover can be removed to provide ready access to the currency detector. The housing 600 is provided with a stiffening flange 602 adjacent the righthand side of that housing; and that flange extends upwardly along the rear wall of that housing, extends forwardly along the top of that housing, and then extends downwardly along the inclined position to the vertically offset portion 601, all as shown by FIGURE 15. A stiffening flange 604 extends along the vertically offset portion 601 and then extends downwardly along the front wall of that housing. A stiffening flange 606, comparable to the stiffening flange 604, is provided adjacent the left hand side of the housing 600; and a stiffening flange 608, comparable to the stiffening flange 602, is also provided adjacent the lefthand side.

Figure 18:
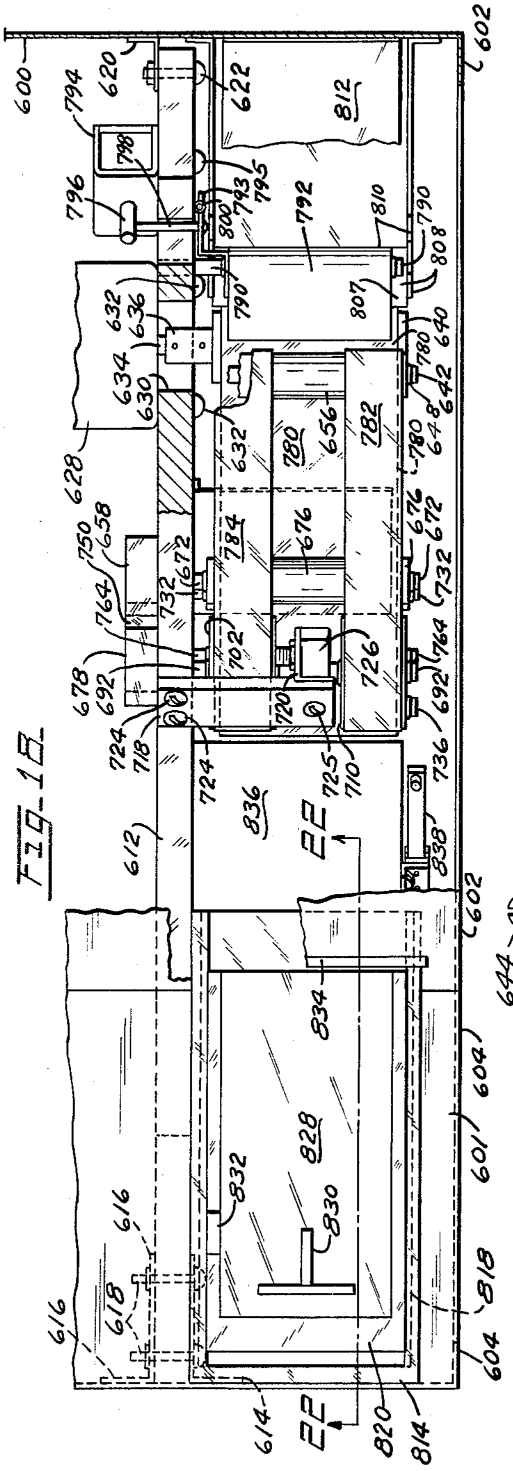
FIGURE 18 is a partially sectioned, partially broken plan view of the currency detector of FIGURE 15.

A generally triangular supporting wall 612 is disposed within the housing 600, and that supporting wall coacts with the stiffening flanges 602, 604, 606 and 608 to stiffen the housing 600 and to make it rigid. An L-shaped bracket 614 and an L-shaped bracket 616 are secured to the inner face of the front wall of the housing 600, as by welding; and those brackets are secured to the supporting wall 612 by fasteners 618, as shown by FIGURES 15 and 18. An L-shaped bracket 620 is suitably secured to the rear wall of the housing 600, as by welding; and that bracket is secured to the rear portion of the supporting wall 612 by a fastener 622. An L-shaped bracket 624 is secured to the under face of the top of the housing 600, as by welding; and that bracket is secured to the upper portion of the supporting wall 612 by a fastener 626. Those brackets and those fasteners rigidly hold the supporting wall 612 in position within the housing 600.

The numeral 628 denotes a motor (FIGURES 18, 19) which is mounted adjacent an opening 630 in the supporting wall 612; and that motor will preferably be a synchronous motor or some other motor that operates at a predetermined speed. Fasteners 632 extend through openings in the wall 612 and seat in the housing of the motor 628 to hold that motor in assembled relation with that wall. The shaft 634 of the motor 628 extends through the opening 630, and a closed end sleeve 636 is fixed on the shaft by two pins. A sleeve-like roller 638 of resilient material, such as rubber, elastomeric plastic or the like, is fixed on the sleeve 636. A facing 640, of cork, rubber, elastomeric plastic, or some other material which has a high coefficient of friction, is provided for the roller 638.

Figure 19:
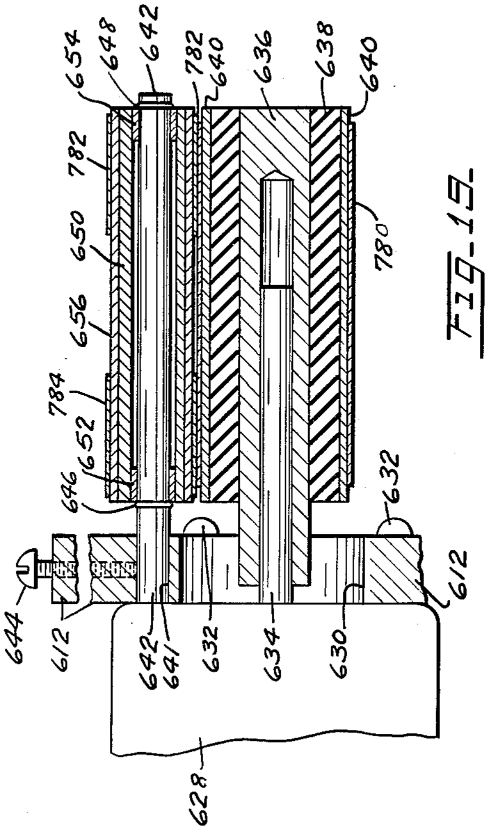
FIGURE 19 is a sectional view on the enlarged scale of FIGURE 16, through the currency detector of FIGURE 15, and it is taken along the plane indicated by the line 19—19 of FIGURE 15.

The numeral 641 denotes an opening, through the wall 612, which is parallel to the opening 630, as shown by FIGURE 19. That opening accommodates one end of a pivot 642; and a set screw 644 is seated in a threaded opening in the wall 612 to bear against the pivot 642 and hold it in position. Rings 646 and 648 are set in grooves in the pivot 642; and those rings position a roller 650 on that pivot, as by abutting bushings 652 and 654 which are pressed within the ends of the roller 650. Those bushings serve as bearings for the roller 650 and permit ready rotation of that roller relative to the pivot 642. A facing 656, of cork, rubber, elastomeric plastic, or other material having a high coefficient of friction, is provided for the roller 650.

Figures 21, 22, 23, 24, 25, 26, 27, 28:
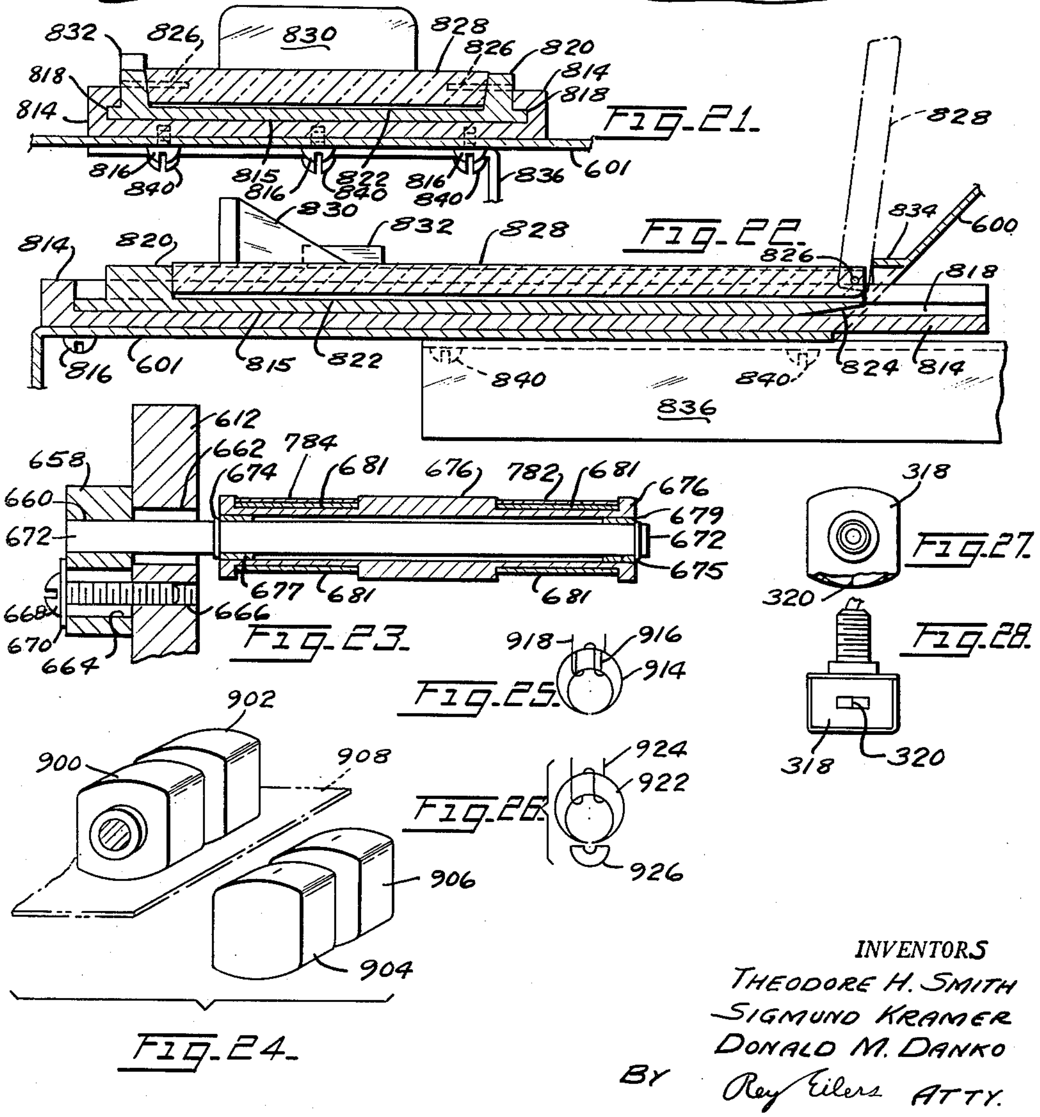
FIGURE 21 is a sectional view on a still larger scale, through the currency detector of FIGURE 15, and it is taken along the plane indicated by the line 21—21 in FIGURE 15.
FIGURE 22 is a sectional view on the scale of FIGURE 21, through the bill carrier of FIGURE 15, and it is taken along the plane indicated by the line 22—22 in FIGURE 18.
FIGURE 23 is a sectional view on the scale of FIGURE 16, through the currency detector of FIGURE 15, and it is taken along the plane indicated by the line 23—23 in FIGURE 15.
FIGURE 24 is a perspective view on an enlarged scale, showing the position which four magnetic heads will occupy if four, rather than just two, magnetic heads are used in the currency detectors of FIGURES 1 and 11.
FIGURE 25 is a schematic view of a magnetic head which has a permanent magnet formed as a part of the flux path thereof.
FIGURE 26 is a schematic view of a magnetic head which has a permanent magnet adjacent the air gap thereof.
FIGURE 27 is a rear elevational view of one form of magnetic head that is usable with the currency detectors of the present invention.
FIGURE 28 is a bottom view showing the air gap of the magnetic head of FIGURE 27.

The numeral 658 in FIGURE 23 denotes a bracket which has an opening 660 and a larger opening 664 through it. The opening 660 is adjacent a larger opening 622 in the supporting wall 612, and the opening 664 is adjacent a smaller, threaded opening 666 in that wall. A set screw 668 is telescoped through a washer 670, and is then passed through the opening 664 in the bracket 658 to seat in the opening 666. That set screw coacts with the oversized openings 664 and 662 to permit adjustment of the position of the bracket 658 relative to the wall 612.

A pivot 672 has its lefthand end fixedly held by the bracket 658, as that pivot is viewed in FIGURE 23; and the righthand end of that pivot has grooves, not shown, which receive rings 674 and 675. Those rings maintain a roller 676 in assembled relation with the pivot 672, as by abutting bushings 677 and 679 which are pressed into the opposite ends of that roller. The roller 676 has two wide portions of reduced diameter; and those portions define radially extending flanges at the ends of that roller and also define a wide separator of large diameter adjacent the midpoint of that roller. Facings 681, of cork, rubber, elastomeric plastic, or other material having a high coefficient of friction, are seated on the wide reduced diameter portions of the roller 676. The flanges at the ends of the roller 676 project outwardly beyond the facings 681, as shown by FIGURE 23.

FIGURE 16 shows a bracket 678 which has an opening 680 and a larger opening 682 through it. The opening 680 is adjacent a larger opening 684 in the wall 612, and the opening 682 is adjacent a smaller threaded opening 686 in that wall. A set screw 688 extends through a washer 690 and then extends through the opening 682 to seat in the threaded opening 686. That set screw coacts with the oversized openings 682 and 684 to permit adjustment of the position of the bracket 678 relative to the wall 612. The numeral 692 denotes a pivot that is held in the opening 680 by a set screw 693; and that pivot has grooves, not shown, which accommodate rings 694, 696, 698 and 700. The rings 694 and 696 maintain a wide faced pulley 702 in position on the pivot 692, as by engaging bushings 704 and 706 which are pressed into the opposite ends of the sleeve-like hub of that pulley. A facing 708, of cork, rubber, elastomeric plastic or other material having a high coefficiency of friction, is provided for the pulley 702. The rings 698 and 700 maintain a wide faced pulley 710 in position on the pivot 692, as by engaging the bushings 712 and 714 which are pressed into the opposite ends of the sleeve-like hub of that pulley. A facing 716 of cork, rubber, elastomeric plastic, or other material having a high coefficient of friction, is provided for the pulley 710.

The numeral 718 denotes a bar which is mounted adjacent the wide faced pulley 702, and that bar is secured to the wall 612 by two fasteners 724, shown as screws. The underside of the free end of the bar 718 is cut away to form a recess; and that recess accommodates the foot of an inverted L-shaped bracket 720. A fastener 725 extends through the bar 718 and seats in a threaded opening in the foot of that bracket to maintain that bracket in assembled relation with that bar. The bracket 720 has an opening 722 through it; and that opening is larger than, and accommodates, the pivot 692. A magnetic head 726, which is comparable to either of the magnetic heads 318 and 344, is secured to the lower end of the bracket 720 by a nut 728; that nut being threaded onto the threaded sleeve of that magnetic head. The leads 730 of the magnetic head 726 extend upwardly through an opening 731 in the L-shaped bracket 720 and then extend to the signal input terminals of the unit 426 in FIGURE 29.

A pivot 732 is fixedly secured to the wall 612, below and to the right of the pivot 692 in FIGURE 15; and that pivot rotatably supports a roller 734. A pivot 736 is fixedly secured to the wall 612, below and to the left of the pivot 692 in FIGURE 15; and that pivot rotatably supports a roller 738. The rollers 734 and 738 are held immediately adjacent the wide faced pulley 710 by the pivots 732 and 736, as shown by FIGURE 15. Those rollers are also held immediately adjacent the wide faced pulley 702. Facings of cork, rubber, elastomeric plastic, or other material having a high coefficient of friction, are provided for the rollers 734 and 738.

The numeral 740 denotes a support which is secured to the wall 612 at a point below, and to the right of, the bar 718 in FIGURE 15. Fasteners 742, shown as machine screws, extend through openings in the wall 612 and seat in threaded openings in the support 740 to maintain that support in assembled relation with that wall. A generally U-shaped spring 744 has a concave upper face, and that spring is mounted on, and supported by, the support 740. That spring has its concave upper face closely adjacent the convex lower face of the magnetic head 726. A facing 746, of a wear-resistant, smooth material such as nylon, is provided for the spring 744; and that facing will overlie the concave upper face, as well as the rest of the outer area, of the spring 744. A fastener 748 extends through openings in facing 746 and spring 744 and seats in the support 740 to maintain that spring and its facing in assembled relation with that support.

Numeral 750 denotes a bracket shown in FIGURE 17; and that bracket has an opening 752 therein which is adjacent a larger opening 754 in the wall 612. An opening 756 is provided in the bracket 750 adjacent a smaller, threaded opening 758 in the wall 612. A set screw 760 extends through a washer 762 and then extends through the opening 756 to seat in the opening 758. The set screw 760 coacts with the oversized openings 756 and 754 to permit adjustment of the position of the bracket 750 relative to the wall 612. A pivot 764 is seated in the opening 752 of bracket 750 and is secured in that opening by the set screw 766. That pivot has grooves, not shown, which accommodate rings 768 and 770 shown by FIGURE 16. Those rings hold a roller 772 in position on that pivot by engaging bushings 774 and 776 that are pressed into the opposite ends of that roller. The central portion of the roller 772 is of reduced diameter to provide radially extending flanges at the opposite ends of that roller. A facing 778 of cork, rubber, elastomeric plastic, or other material having a high coefficient of friction, is provided for the reduced diameter portion of roller 772.

Figure 29:
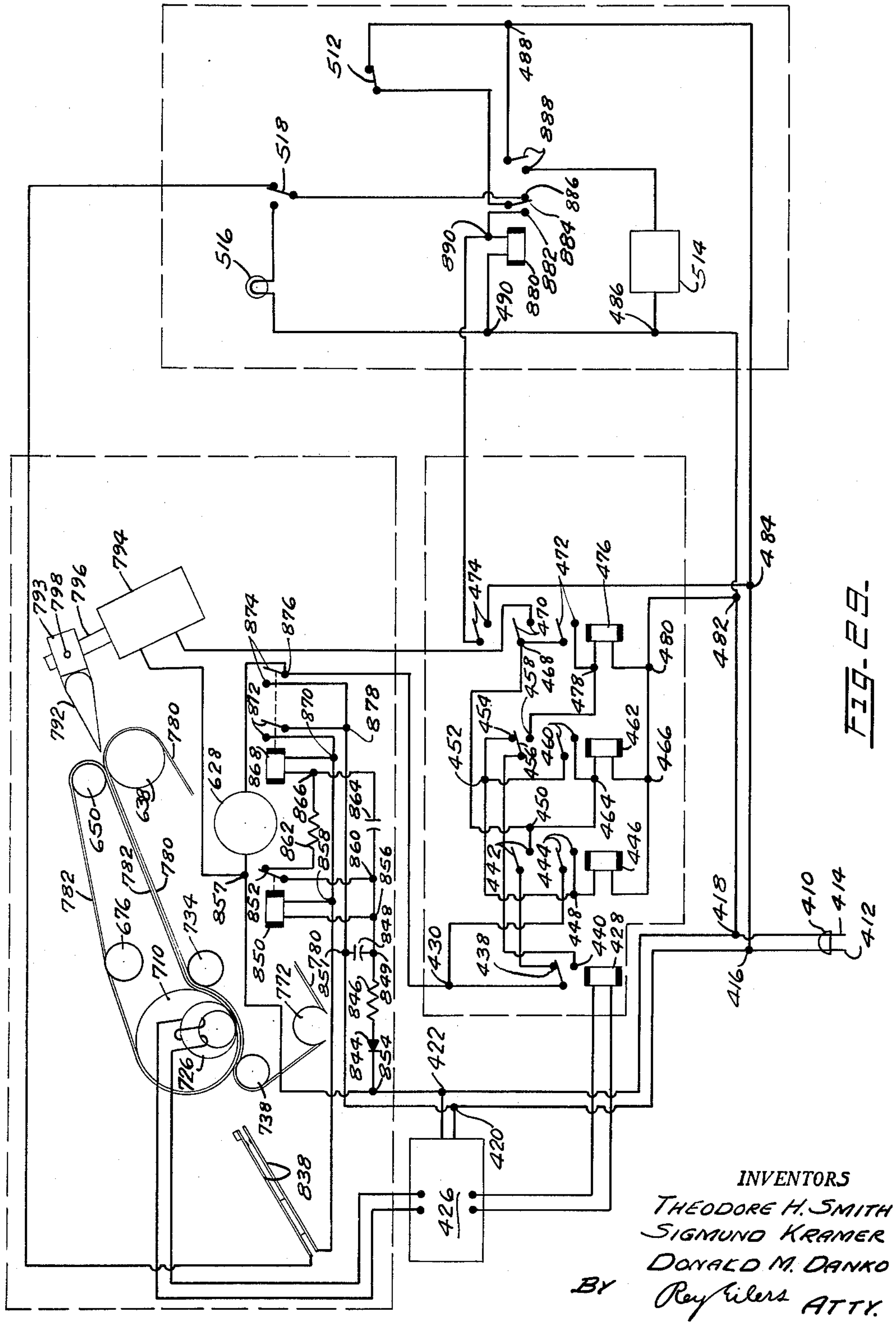
FIGURE 29 is the wiring diagram of the currency detector of FIGURE 15 and of a typical vending machine with which that currency detector can be used.

A narrow belt 782, of mylar or some other material that is strongly resistant to stretching, is passed around the wide faced pulley 710, is passed over the roller 676, and is passed around the roller 650. A similar belt 784 is passed around the wide faced pulley 702, and is passed around the rollers 676 and 650. Those belts will engage the facings 681 on the reduced diameter portions of roller 676, will engage the facing, not shown, on roller 650, and will also engage the facings 716 and 708 on the pulleys 710 and 702. The full diameter portion at the midpoint of roller 676 will hold the belts 782 and 784 spaced apart, as shown by FIGURE 23. A wide belt 780 of substantially inelastic material such as mylar, is passed around the roller 638 driven by the motor 628, is passed around the rollers 734 and 738, and is passed around the roller 772. In FIGURE 29, part of the belt 780 is broken away to facilitate a full showing of the wiring diagram of the currency detector of FIGURE 15. That belt will be bowed up into engagement with the narrow belts 782 and 784, adjacent the wide faced pulleys 702 and 710, by the rollers 734 and 738, as shown by FIGURE 15. That belt will also be pressed against the lower face of the magnetic head 726 by the facing 746 on the spring 744. Once the belts 780, 782 and 784 have been mounted, the brackets 658, 678 and 750 can be shifted relative to the wall 612 to insure spring-supported engagement of belt 780 with the magnetic head 726 while assuring full tensioning of the belts 780, 782 and 784.

The belt 780 will be driven by the roller 638; and that belt and that roller will drive roller 650 and the belts 782 and 784. The belts 782 and 784 are spaced far enough apart to keep them from engaging the magnetic head 726 or its supporting bracket 720.

The numeral 790 denotes a pivot which is mounted to the right of the pivot 642 in FIGURE 15. That pivot is suitably secured to the wall 612, and it rotatably supports a deflector 792 of generally triangular cross section. The leading edge of that deflector is the apex of that deflector, and that leading edge is closely adjacent the line of tangency between the roller 650 and the roller 638. The deflector 792 is provided with a crank arm 793 that extends to the right of the pivot 790 in FIGURE 15. A solenoid 794 is mounted on the wall 612 by fasteners 795; and that solenoid is below and to the right of the pivot 790 in FIGURE 15. The plunger 796 of that solenoid carries a horizontally directed pin 798; and that pin extends into an opening in the crank arm 793 of deflector 792. A spring 800 has its lower end hooked through an opening in the crank arm 793 of deflector 792 and has its upper end hooked around a pin 802 mounted on the wall 612. The spring 800 is a helical extension spring, and it will normally hold the deflector 792 in the solid line position shown by FIGURE 15. However, that spring will yield, whenever the solenoid 794 is energized, to permit the plunger of that solenoid to rotate the deflector 792 in the clockwise direction to the dotted line position of FIGURE 15.

The numeral 804 denotes an opening in the rear wall of the housing 600, and the numeral 806 denotes a second opening in that rear wall. The opening 806 is adjacent the top of the housing 600, and the opening 804 is disposed below the level of the opening 806. A chute 808, which has upstanding walls adjacent the sides thereof, has a downwardly directed flange 809 secured to the inner face of the rear wall of the housing 600. That chute also has laterally extending flanges adjacent the lower end thereof that are secured to the inner face of the rear wall of that housing. The upper end of the chute 808 is immediately adjacent the belt 780, and it has a lip 807 which almost touches that belt. The numeral 810 denotes a chute with upstanding side walls, and that chute has flanges adjacent the lower end thereof which are secured to the rear wall of the housing 600. The chute 808 has its lower end adjacent the lower edge of the opening 804, and the chute 810 has its lower end adjacent the lower edge of the opening 806. The upper end of the chute 810 has a lip which is immediately adjacent the righthand edge of the deflector 792. An arcuate guide 812 is secured to the top and to the rear wall of the housing 600, and that arcuate guide overlies the deflector 792 and the chute 810. That deflector coacts with the chute 810 to guide unaccepted bills to and through the opening 806. A suitable connection will be provided to the exterior of the vending machine so a patron can recover any unaccepted bill he may insert. The chute 808 and the bottom of the chute 810 will coact to guide accepted bills to and through the opening 804; and such bills will then pass to a cash box, not shown.

Referring particularly to FIGURES 21 and 22, the numeral 814 denotes a guide block which has a broad, shallow, central recess 815. The front of that guide block is secured to the vertically offset portion 601 of the housing 600 by fasteners 816 that extend upwardly through that vertically offset portion and seat in the bottom of that guide block. Elongated grooves 818 are provided in the guide block 814 at the opposite sides of the recess 815 in that block.

The broad, shallow, central recess 815 in the guide block 814 accommodates a movable platform 820; and that platform has outwardly projecting, longitudinally extending flanges which fit within, and are guided and held by, the grooves 818. A broad, shallow recess 822 is provided in the platform 820, and the sides of that recess are defined by outwardly and upwardly inclined walls. The platform 820 has a tapered righthand end 824, as shown particularly by FIGURE 22; and it has pivots 826 disposed above and closely adjacent that righthand end. A door 828, which is dimensioned to substantially fill and to close the recess 822, is rotatably secured to the platform 820 by the pivots 826. That door has downwardly and inwardly inclined sides, as indicated particularly by FIGURE 21; and those sides are complementary to the sides of the recess 822. A handle 830 is provided on the door, and that handle facilitates opening and closing of that door.

A stop 832 is mounted on the platform 820; and that stop is in register with a horizontally directed edge 834 which is formed on the housing 600 and which acts as a stop. The stop 832 will coact with the edge 834 to limit inward movement of the carrier 820, and the upstanding wall at the outer end of the recess 815 in guide block 814 will limit outward movement of that carrier. The edge 834 will also limit rotation of the door 828 to open position, as indicated by FIGURE 22.

Figure 20:
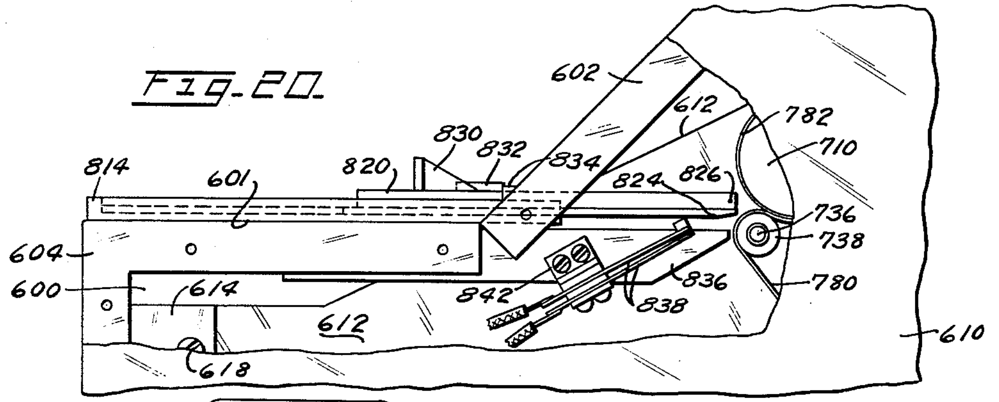
FIGURE 20 is a broken away side view on a slightly enlarged scale of part of the currency detector of FIGURE 15, and it shows the carrier for the bills in moved position.

The numeral 836 denotes a plate which has a downwardly depending flange adjacent the righthand side thereof, as that plate is viewed in FIGURE 21; and that plate underlies the vertically offset portion 601 of the housing 600. That plate also extends rearwardly beyond the vertically offset portion 601 of the housing 600 to closely approach the roller 738, as indicated by FIGURES 15 and 20. The downwardly depending flange of the plate 836 supports a switch with a pair of normally open leaf contacts 838; and that switch is secured to the flange of the plate 836 by fasteners 842. The plate 836 is secured to the vertically offset portion 601 of the housing 600 by fasteners 840, and those fasteners extend up into the guide block 814 to help secure that guide block to that vertically offset portion. Referring particularly to FIGURE 29, the numeral 426 denotes a unit which has the signal input terminals thereof connected to the series connected coils on the core of the magnetic head 726. The output terminals of the unit 426 are connected to the coil of a relay 428, and that relay is part of a chain of relays that is identical to the chain of relays shown in FIGURE 10. The numeral 844 denotes a metallic rectifier; and the numeral 846 denotes a typical current limiting resistor used to protect metallic rectifiers. The numeral 848 denotes a capacitor, and the numeral 850 denotes a relay which has a pair of normally closed contacts 852. The numeral 862 denotes a resistor, and the numeral 864 denotes a capacitor. A relay 868 has a pair of normally open contacts 872 and a pair of normally open contacts 874.

A vending machine, with which the currency detector of FIGURES 15–23 can be used, has an empty lamp 516 and an empty switch 518. That vending machine also has a delivery switch 512 and a cycling device 514. Furthermore, that vending machine has a relay 880 which has a pair of normally open contacts 888 and a movable contact 884 that is normally in engagement with a fixed contact 886 but can respond to the energization of the coil of that relay to move into engagement with a fixed contact 882.

*Operation of currency detector of FIGURES 15–23 and 29*

To operate the currency detector of FIGURES 15–23 and 29, the patron grasps the handle 830 and rotates the door 828 to the raised position indicated by dotted lines in FIGURE 22. Thereafter, the patron places a bill in the recess 822 of carrier 820, and that bill must be set in that recess with its black-ink face up. Suitable instructions to that effect will be displayed at the exterior of the vending machine. The outwardly and upwardly inclined sides of the recess 822 facilitates the centering of the bill within the recess; and that recess will be just slightly wider than the width of an authentic one dollar bill of the United States of America. The recess 822 in the carrier 820 is shorter than the length of an authentic one dollar bill of the United States of America, and the leading edge of such a bill will project almost three-quarters of an inch beyond the tapered righthand end of the platform 820. Once the bill has been inserted, the patron will rotate the door to its closed position and will push the platform inwardly until the stop 832 thereon engages, and is held by, the stop-like edge 834 on the housing 600. In rotating the door 828 to its closed position, the patron assures full flattening of the bill; and this is true whether the bill is fresh and crisp or is worn and limp.

As the platform 820 is moved inwardly, the projecting leading edge of the bill will approach the line of tangency between the roller 738 and the wide-face pulleys 702 and 710, and the tapered righthand end of that platform will approach an insulating button on the upper contact 838. Just before the leading edge of the bill engages the belt 780 or the belts 782 and 784, the righthand end of the platform will bend the upper contact 838 into engagement with the lower contact 838. The closing of the contacts 838 completes two circuits, as shown by FIGURE 29; and one of those circuits starts at the prong 414 and extends past the junctions 418, 422 and 854, through the rectifier 844, through resistor 846, past junctions 849 and 856, through the coil of relay 850, past the junction 858, through the contacts 838, through the empty switch 518, through the contacts 886 and 884, through the delivery switch 512, and then past the junctions 488, 484 and 416 to the prong 412. The other of those circuits extends from the prong 414 past the junctions 418, 422 and 854, through the rectifier 844, through the resistor 846, past the junctions 849, 856 and 860, through the capacitor 864, past the junction 866, through the coil of relay 868, past the junctions 870 and 858, through the contacts 838, through the empty switch 518, through the contacts 886 and 884, through the delivery switch 512, and then past the junctions 488, 484 and 416 to the prong 412. The said one circuit energizes the coil of relay 850 to open the contacts 852, and the other of those circuits energizes the coil of the relay 868 to close the contacts 872 and 874. The coil of relay 850 will remain energized as long as the contacts 838 remain closed, but the coil of relay 868 will remain energized only as long as current flows through the capacitor 864 during the charging of that capacitor. The value of that capacitor will preferably be such that the coil of relay 868 will remain energized for slightly over two seconds. As long as the relay 868 remains energized it will keep the contacts 872 and 874 closed.

The contacts 872 are part of a holding circuit for the coil of relay 868 and for the coil of relay 850. That circuit starts at the prong 412 and extends past the junctions 416, 420, 851 and 878 and through the relay contacts 872 to the junction 870; and then a branch of that circuit extends through the coil of relay 868 and through the capacitor 864 to the junction 856 while the other branch of that circuit extends past junction 858 and through the coil of relay 850 to the junction 856; and then the circuit continues through the resistor 846, through the rectifier 844, and past the junctions 854, 422 and 418 to the prong 414. That holding circuit will keep the relays 850 and 868 energized during the time the capacitor 864 is charging, even if the platform 820 is moved back to its normal, at-rest position and permits the contacts 838 to reopen.

The closing of the contacts 874, by the energization of relay 868, completes a circuit which starts at the prong 414 and extends past the junctions 418, 422, 854 and 857, through the motor 628, past the junction 876, through the contacts 874, and then past the junctions 878, 851, 420 and 416 to the prong 412. That circuit energizes the motor 628 and enables it to rotate the roller 638; and that circuit will keep that motor energized for slightly over two seconds. The roller 638 will rotate in the clockwise direction in FIGURE 15, and it will rotate the roller 650 in the counter clockwise direction. Such rotation of the rollers 638 and 650 causes the wide belt 780 and the narrow belts 782 and 784 to move in such a direction that they will grasp the leading edge of a bill carried by the platform 820 and withdraw that bill from that platform, and those belts will then move that bill between the roller 738 and the wide-faced pulleys 702 and 710. Those belts will guide that bill into engagement with the magnetic head 726; the spring 744 forcing the wide belt 780 to hold that bill in intimate engagement with the air gap of that magnetic head. The platform can be left in its inwardly-moved position or it can be returned to the normal, at-rest position shown by FIGURE 15. If that platform is returned to its at-rest position before the trailing edge of the bill has passed between the roller 738 and the pulleys 702 and 710, the plate 836 will underlie and give full support to that trailing edge.

The ink of the vertical grid lines in the portrait background of an authentic one dollar bill of the United States of America will provide two groups of voltage variations for the unit 425. Those voltage variations will enable that unit to supply two validating signals for the coil of relay 428, and that relay will then actuate the other relays of the relay chain. The relays 446, 462 and 476 will become energized in the same manner in which the correspondingly numbered relays of FIGURE 10 became energized; and those relays will be kept energized by a holding circuit which starts at prong 412 and extends past the junctions 416, 420, 851 and 878, through the contacts 874, past the junctions 876 and 430, through the contacts 444, 460 and 472 and through the coils of relays 446, 462 and 476 to the junction 482, and then past junction 418 to the prong 414. That holding circuit will be interrupted, and the contacts of the relays 446, 462 and 476 will return to the positions shown, when the capacitor 864 becomes charged and the relay 868 becomes unable to hold its contacts 872 and 874 closed.

When the relay 476 of the relay chain becomes energized and closes its contacts 470 and 474, two circuits are completed; one of those circuits extending from the prong 414 past the junctions 418, 422, 854, and 857 to the solenoid 794, through the now-closed contacts 470, past the junctions 468 and 450, through the contacts 442, through the contact 438 and the movable contact of relay 428, past the junctions 430 and 876, through the contacts 874 and then past the junctions 878, 851, 420 and 416 to the prong 412, and the other of those circuits extending from the prong 414 past the junctions 418, 482, 486 and 490, through the coil of relay 880, past the junction 890, through the contact 474, and then past the junctions 484 and 416 to the prong 412. The said one circuit energizes the solenoid 794 and causes it to shift the deflector 792 from its normal position to the elevated position shown by dotted lines in FIGURE 15, and the said other circuit energizes the coil of relay 880 to shift the movable contact 884 into engagement with the movable contact 882 and to close the contacts 888. The upward movement of the deflector 792 enables that deflector to guide the leading edge of the moving bill downwardly into the space defined by the chutes 808 and 810, thereby causing that bill to pass through the accepted opening 804. The closing of the contacts 888 completes the circuit of the cycling device 514, and the shifting of the contact 884 into engagement with the contact 882 establishes a holding circuit for the relay 880; the former circuit starting at prong 412 and extending past the junctions 416, 484 and 488, through the contacts 888, through the cycling device 514, and then past the junctions 486, 482 and 418 to prong 414, and the latter circuit starting at prong 412 and extending past the junctions 416, 484 and 488, through the delivery switch 512, through the contact 884 and 882, past the junction 890, through the coil of relay 880, and then past the junctions 490, 486, 482 and 418 to the prong 414. These circuits will cause the vending machine to pass through one complete cycle of operation and to vend the desired product. At the end of that cycle, the delivery switch 512 will open and break the circuit of the cycling device 514 as well as the holding circuit of the relay 880.

After a little more than two seconds have elapsed subsequent to the closing of the contacts 838 by the right-hand end of the platform 820, the capacitor 864 will be charged to the point where insufficient current will flow through the coil of relay 868 to keep that coil energized. Thereupon, the contacts 872 and 874 will reopen; thereby deenergizing the relay 850, deenergizing the motor 628, and deenergizing the relays 446, 462 and 476. The deenergization of relay 850 permits the contacts 852 to reclose and fully discharge the capacitor 864 through the resistor 862; and the de-energization of the relay 476 permits the contacts 470 to reopen and de-energize the solenoid 794 and permits the contacts 474 to reopen and interrupt the energizing circuit to the coil of relay 880. By the time the motor 628 is deenergized, the bill will have been moved past the deflector 792 and directed toward the accepted bill opening 804.

The breaking of the circuit to the solenoid 794 permits the spring 800 to return the deflector 792 to the solid line position shown by FIGURE 15; but the breaking of the energizing circuit to the coil of relay 880 will not interfere with the completion of the cycle of the vending machine, because the contacts 882 and 884 of that relay provide a holding circuit for that relay. As a result, the vending machine will complete its cycle even if that cycle is longer than the cycle of the currency detector. The full discharging of the capacitor 864 makes sure that the said capacitor will be ready for the next cycle of operation of the currency detector. The capacitor 848 coacts with the rectifier 844 to provide a partially filtered direct current for the operation of the relays 850 and 868.

Where the inserted bill is authentic and of the proper denomination, the currency detector of FIGURES 15–23 and 29 will move that bill below the rotated deflector 792 and guide that bill to the accepted-bill opening 804.

However, where an unacceptable bill is inserted, the unit 426 will not apply two validing signals to the coil of relay 428; and, therefore, the deflector 792 will not be rotated from the solid line position of FIGURE 15. The belts 780, 782 and 784 will, therefore, pass the leading edge of that unacceptable bill up over the deflector 792; and that bill will then be guided by the deflector 792 and by the arcuate guide plate 812 toward the chute 810 and the unacceptable bill opening 806.

The use of a door and platform to receive the bill is helpful because it assures full flattening of the bill; and it is also helpful because it minimizes the likelihood of a patron successfully withdrawing an accepted bill by use of a thread, wire, tape or other "tail." However, the use of a platform and door has the disadvantage of slowing the rate at which bills can be introduced into the currency detector.

*Empty switch of vending machine*

In the above descriptions of the operation of the various embodiments of currency detectors shown by the drawing, it has been assumed that the vending machine had sufficient product stored within it to dispense the product called for by the insertion of a bill. However, if the vending machine runs out of the product to be vended, the empty switch 518 will shift its movable contact into engagement with the lefthand fixed contact. Such shifting will energize the empty lamp 516 and will also break the circuit that is relied upon to initiate the operation of the currency detector.

Specifically, with the vending machine shown in FIGURES 10 and 14, the shifting of the movable contact of the empty switch will cause current to flow from the prong 412 past the junctions 416, 484 and 488, through the delivery switch 512, through the contacts 498 and 500, through the movable contact and the lefthand fixed contact of empty switch 518, through the empty lamp 516, and then past the junctions 492, 490, 486, 482 and 418 to the prong 414. Also, that shifting of that movable contact disconnects the push button 520 from the prong 412; thereby preventing the initiation of a cycle of the currency detector until the vending machine is refilled. Hence if the vending machine exhausts its supply of vendable product, the empty lamp 516 will become illuminated to advise the patrons of the exhaustion of that supply of product, and the starting circuit of the currency detector will be broken.

The circuit of the push button 520 is also broken when the relay 494 becomes energized. This is desirable because it keeps the patron from inserting a bill in the currency detector and initiating a cycle of that currency detector at a time when that patron could not be sure of receiving the desired product from the vending machine. Hence, whether the vending machine of FIGURE 10 is empty or is in the act of vending, the patron is protected.

In the vending machine of FIGURE 29, the shifting of the movable contact of the empty switch 518 into engagement with its lefthand fixed contact will complete a circuit for the empty lamp 516 which extends from the prong 414 past the junctions 418, 482, 486 and 490, through the lamp 516, through the left hand and movable contacts of the empty switch 518, through the contacts 886 and 894 of relay 880, through the delivery switch 512, and then past the junctions 488, 484 and 416 to the prong 412. Moreover, the shifting of the movable contact of empty switch 518 will break the circuit that is normally completed by the engagement of the contacts 838 to effect the starting of the motor 628 of the currency detector.

*Scanning additional areas of bill*

The scanning of one longitudinally-directed area at each face of each inserted bill is eminently practical and useful. If, however, it should become desirable to scan two or more longitudinally-directed areas at each face of each inserted bill, additional magnetic heads can be provided to effect the scanning of such additional areas. For example, as indicated by FIGURE 24, two magnetic heads 900 and 902 can be set adjacent one face of an inserted bill, and two magnetic heads 904 and 906 can be set adjacent the opposite face of that bill. The series-connected coils on the magnetic heads 900 and 904 can be connected in series and can be connected to the input signal terminals of a unit 426, while the series-connected coils on the magnetic heads 902 and 906 can be connected in series and can be connected to the input signal terminals of another unit 426. The validating signals from those two units can then be suitably fed into a modified relay chain to supply the required accept signal for the currency detector. If desired, a magnetic head that has more than one air gap could be used in lieu of the magnetic heads 900 and 902, and a magnetic head that has more than one air gap could be used in lieu of the magnetic heads 904 and 906.

By spacing the heads 900 and 902 so that one of those heads scans a portion of the bill intermediate the top edge of the bill and the longitudinally extending center line of that bill, and by disposing the other of those heads between that longitudinally extending center line and the bottom edge of that bill, those heads would keep the currency detector from accepting one half of bill that was split along that longitudinally extending center line. The magnetic heads 904 and 906 would also be mounted so one would be intermediate the top edge and the longitudinally extending center line of that bill and so the other would be intermediate that longitudinally extending center line and the bottom edge of that bill. If desired, three or more magnetic heads could be mounted adjacent each face of the inserted bill. The gripping of the inserted bill adjacent its top and bottom edges, as provided in each of the embodiments of currency detector shown in the drawing, leaves the central area of that bill accessible to the magnetic heads.

If desired, transverse movement of one or more of the magnetic heads or transverse movement of the inserted bill could be used to effect scanning of the horizontal grid lines of that bill. Such scanning would be very helpful in distinguishing between bills of different denominations which had the same spacing and width for its vertical grid lines but had different spacing and width for its horizontal grid lines.

*Alternate forms of magnetic head*

The essential requirement of a sensing head for the currency detector of the present invention is that it provide a path which includes an air gap as a part thereof, that it establish magnetic flux lines in that path, that the magnetic reluctance of that path be varied as lines engraved with magnetic ink pass by that air gap, and that the width of the air gap be less than the center-to-center spacing of adjacent grid lines. The sensing heads 318, 344 and 726 satisfy these requirements, but other sensing heads could also do so; and two such heads are shown by FIGURES 25 and 26.

FIGURE 25 discloses a magnetic head which has a permanent magnet 916 of high retentivity intermediate the ends thereof. That permanent magnet is united with the coil 914, and a pickup coil 918 is wound on that core. That permanent magnet will obviate the need of the direct current bias which is provided for the magnetic heads 318, 344 and 726 by the unit 426; the magnetic head of FIGURE 25 having a permanent bias rather than a bias provided by the flow of direct current through its coils.

If desired, a permanent magnet 926 can be mounted immediately adjacent the air gap of a core 922, as indicated by FIGURE 26. The poles of that permanent magnet will be adjacent those portions of the core 922 which define the air gap; and a pickup coil 924 will be wound on that core. The permanent magnet 926 will establish flux lines in the air gap of the core and in those portions of that core which define that air gap. An inserted bill engraved with ink having magnetic properties will vary the magnetic reluctance of that air gap and thereby enable the pickup coil 924 to sense the passage of that bill.

If desired, alternating current could be used to provide the bias for the sensing heads 318, 344 or 726; but that alternating current would have to have a frequency materially higher than the repetition rate of the grid lines of the inserted bill. Also, if desired, one of the coils of each of the sensing heads 318, 344 and 726 could be used to provide the bias for that head, while the other coil of that head could be used as the pickup coil. However, the series-connection of the two coils on each head, plus the use of the direct current bias as a carrier for the voltage variations, is believed to be the simplest and least expensive way of sensing the phase repetitive voltage variations generated by the grid lines of inserted bills.

Figure 30:
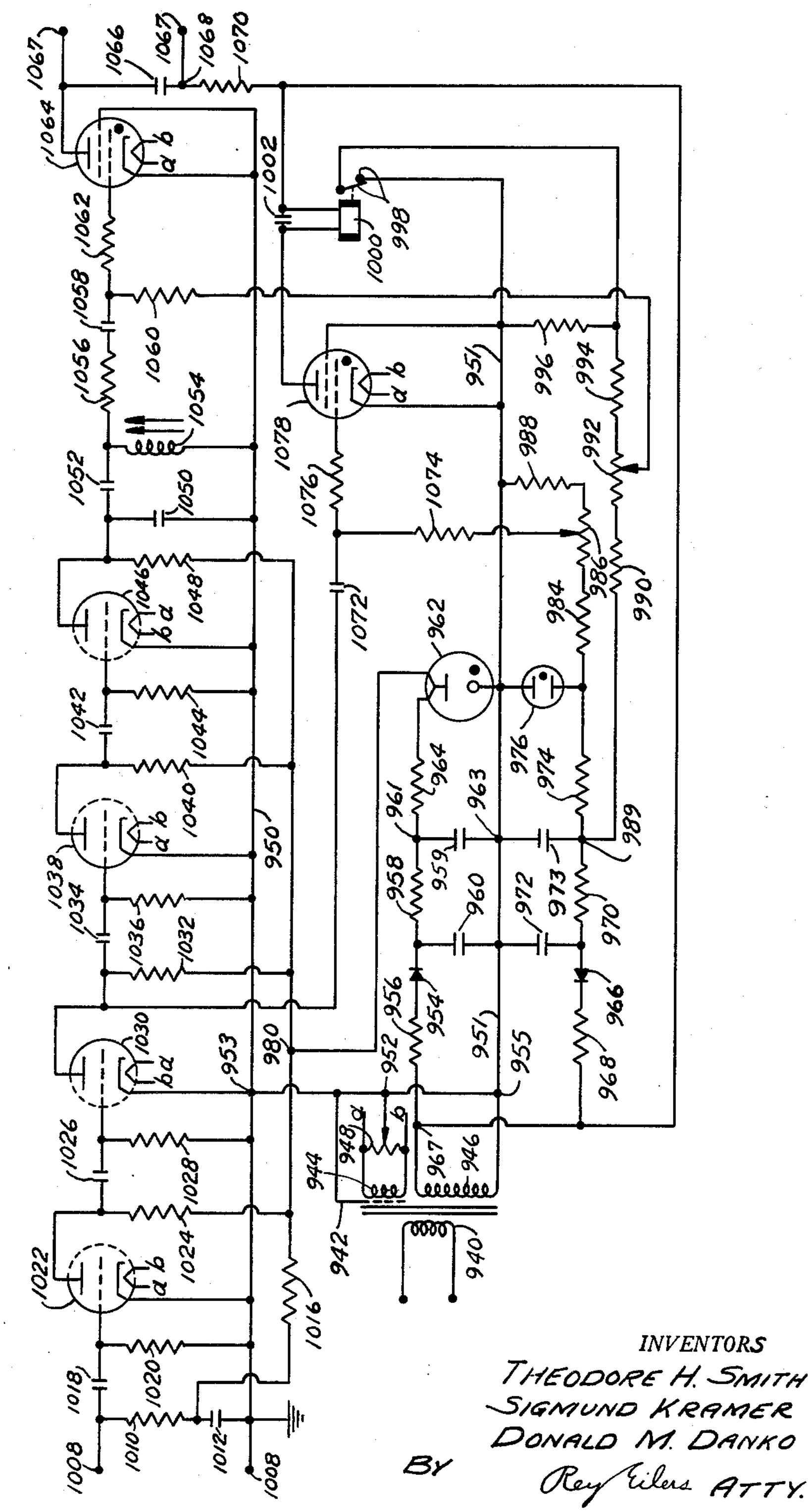
FIGURE 30 is the wiring diagram of a preferred form of tuned amplifier and control element usable with any of the currency detectors of FIGURES 1–29.

*Tuned amplifier and control element of FIGURE 30*

Referring to FIGURE 30, the numeral 940 denotes the primary winding of a transformer, and that winding can be connected to the junctions 420 and 422 of FIGURES 10, 14 or 29. That transformer has a secondary winding 944 that provides a low voltage and has a secondary winding 946 that provides a high voltage. An electrostatic shield 942 is provided for the transformer 940; and that shield tends to isolate the secondary winding 944 from noise, stray signals and unwanted modulations at the plug 410.

The winding 944 supplies the filament voltage for vacuum tubes 1022, 1030, 1038 and 1046 and for the control elements 1064 and 1078. The tubes 1022 and 1030 are shown as being the halves of a duotriode, and the tubes 1038 and 1046 are shown as being the halves of another duotriode. The terminal *a* of the winding 944 will be connected to the terminals *a* of the various tubes 1022, 1030, 1038 and 1046 and of the control elements 1064 and 1078; and the terminal *b* of that winding will be connected to the terminals *b* of those tubes and of those control elements.

The winding 944 is shunted by a tapped voltage divider 948. The movable contact of that voltage divider is connected to a conductor 951 by junctions 952 and 955, and that movable contact is connected to a conductor 950 by junctions 952 and 953. One end of the conductor 950 is connected to the lower terminal of a pair of input terminals 1008, and that lower terminal is grounded.

The D.C. operating voltages required for the tubes 1022, 1030, 1038 and 1046 and for the control elements 1064 and 1078 are derived from the winding 946. Thus a rectifier 954 is connected across winding 946 in series with a resistor 956 and a condenser 960. Series-connected resistors 958 and 964 and a condenser 959, connected as shown, are utilized to complete a suitable filter circuit. A voltage regulator tube 962 is connected in series with resistor 964 across terminals 961 and 963. A D.C. voltage derived from this filter circuit is supplied to the anode of each of tubes 1022, 1030, 1038 and 1046 through the junction designated by the reference numeral 980. The other side of this filter circuit is connected to ground.

Bias for the control element 1064 is derived from winding 946 through a rectifier circuit which includes a rectifier 966 connected across winding 946 in series with resistor 968 and a condenser 972 which also forms a part of a second filter circuit. This second filter circuit includes a second capacitor 973 and series-connected resistors 970 and 974, all connected as illustrated in the drawing. A voltage regulator tube 976 is connected in series with resistor 974 across the condenser 973 as illustrated. Bias for the control element 1064 is supplied from a junction 989 through a resistor 990, the adjustable tap of a resistor 992, and a resistor 1060. The righthand end of resistor 992 is connected to ground through a resistor 994 and a resistor 996. The normally closed contacts 998 of a relay having an operating coil designated by the reference numeral 1000 are connected across the resistor 996.

A suitable D.C. bias is provided for control element 1078 through an adjustable tap on a resistor 986. That resistor is connected in series with a resistor 984 and a resistor 988 across the voltage regulator tube 976. The voltage derived from the tap on resistor 986 is applied to the grid of control element 1078 through a resistor 1074 and the resistor 1076.

A.C. voltage is applied to the anode of control element 1064 by resistor 1078, junction 1068, and parallel-connected capacitor 1066 and relay coil 428; that relay coil being shown in FIGURES 10, 14 and 29. A.C. voltage is applied to the anode of control element 1078 by parallel-connected condenser 1002 and relay coil 1000.

The series-connected coils of the serially connected magnetic heads 318 and 344 of FIGURES 10 and 14 or the series-connected coils of the magnetic head 726 of FIGURE 29 will be connected to the signal input terminals 1008. For brevity and simplicity of explanation, it will be assumed that the terminals 1008 are connected to the series-connected coils on the magnetic heads 318 and 344. Further, it will be assumed that the black-ink face of the inserted authentic one dollar bill of the United States of America will engage the air gap 320 of the magnetic head 318.

A D.C. biasing current for the magnetic heads connected to the signal input terminals 1008 is derived from the winding 946. That biasing curent is supplied through a resistor 1010 and a resistor 1016 which are interposed between the upper input terminal 1008 and the junction 980. The resistor 1016 and a condenser 1012 provide a filtering and isolating action for the bias on the magnetic heads.

The tubes 1022 and 1030 are included in a preamplifier for amplifying the voltage variations which are generated within the coils of magnetic head 318 and which are supplied to the input terminals 1008. Bias voltage is supplied and preserved for tube 1022 through the action of a coupling condenser 1018, connected between the upper terminal 1008 and the grid of the tube, and a grid-leak resistor 1020, connected between the grid and cathode of the tube. The voltage variations generated within the magnetic coils of the magnetic head 318 will be coupled to the grid of tube 1022 by the condenser 1018.

The signal output from tube 1022 is derived across a load resistor 1024 and is applied to the grid of tube 1030 through a coupling condenser 1026. A load resistor 1032 is provided for tube 1030 and the cathodes of tubes 1022 and 1030 are grounded. A grid leak resistor 1028 is provided for tube 1030.

The signal output of tube 1030 is translated by a limiter which comprises an over-driven amplifier: a tube 1038 and a tube 1046. The cathodes of these tubes are grounded and the signal output from tube 1030 is applied to the grid of tube 1038 through a coupling condenser 1034. A grid-leak resistor 1036 is provided for tube 1038. A load resistor 1040 is provided for tube 1038 and the signal output from this tube is applied to the grid of tube 1046 through a coupling condenser 1042. A grid-leak resistor 1044 and an anode resistor 1048 are provided for tube 1046.

A tuned circuit that includes an inductor 1054 and capacitors 1050 and 1052 is provided for translating the signal output derived from tube 1046. Thus the common junction of condensers 1050 and 1052 is connected to the anode of tube 1046, while the junction common to capacitor 1050 and inductor 1054 is grounded.

A threshold-type control element which is adapted to be triggered by the output derived from tuned circuit 1050, 1052 and 1054 is provided. In the embodiment illustrated in FIGURE 30, this threshold device is a thyratron tube 1064 having a grounded cathode; but mechanical as well as other electronic threshold-type control elements can be used. The signal output from the tuned circuit 1050, 1052 and 1054 is applied to the grid of tube 1064 through a resistor 1056, a condenser 1058 and a resistor 1062. An output voltage is derived from the circuit of FIGURE 30 through the terminals 1067 connected across condenser 1066. This voltage output is utilized to operate the relay chains of FIGURES 10, 14 or 29 and thus cause the acceptance of the inserted bill.

As the inserted bill 524 is moved past the air gap 320 of the magnetic head 318, the portion of the portrait background intermediate the leading edge of the background frame and the leading edge of the portrait will generate one set of voltage variations, and the portion of the portrait background intermediate the trailing edge of the portrait and the trailing edge of the background frame will generate a second set of voltage variations. Those voltage variations will be supplied to the input terminals 1008 and will be coupled to the grid of tube 1022 by the condenser 1018. Th tube 1022 and the tube 1030 amplify those voltage variations, and the limiter which includes the tubes 1038 and 1046 limits the amplitude of those voltage variations. The tubes 1038 and 1046 are biased to operate with anode-current saturation for signal inputs of a predetermined amplitude level, thereby to provide an amplitude-limited output signal in a manner which, per se, is well understood by those skilled in the art.

The voltage variations obtained during the magnetic sensing of authentic currency of the United States of America can vary in amplitude over a range as great as one hundred to one; and if the amplitude of those voltage variations was not limited, the larger-amplitude voltage variations could cause the voltage across the resonant circuit 1050, 1052, 1054 to rise almost immediately to a value that would cause triggering of the control element 1064. Any such rise would be objectionable because positive and definite identification of authentic paper currency is best attained by the checking of six or more grid lines in each of the oppositely disposed portions of the portrait background. By limiting the amplitude of the voltage variations received from the preamplifier, the limiter prevents a rapid rise in the voltage across the resonant circuit; and, instead, helps provide the important controlled cumulative voltage growth in that resonant circuit.

The condenser 1050 performs a dual function in the operation of the tuned amplifier of FIGURE 30. Specifically, that condenser constitutes part of of the capacitance of the resonant circuit 1050, 1052, 1054 and it also serves as a coupling device which injects the amplitude-limited voltage variations from the tube 1046 into that resonant circuit. The condenser 1050 is a desirable coupling device because its value may be so chosen that resistor 1048 and the tube 1046 will not appreciably load the resonant circuit. The inductor 1054 should have a high Q; and while different inductors could be used, an inductor of the type disclosed in Gordon Patent No. 2,762,020 which was granted September 4, 1956, for Variable Inductor is very useful.

The resonant circuit 1050, 1052, 1054 will have a characteristic frequency that is substantially equal to the repetition rate of the grid lines on the inserted bill; and by repetition rate is meant the number of grid lines that could pass the air gap in one second if there were an unlimited number of grid lines in the oppositely disposed portions of the portrait background. That characteristc frequency will preferably be in the range of from one thousand to two thousand cycles per second. When the repetition rate, the phase and the duration of the voltage variations supplied to the input terminals 1008 are those of voltage variations of an authentic one dollar bill of the United States of America, the preamplifier and the limiter will supply to the condenser 1050 a succession of quantums of energy that have a repetition rate and phase that substantially coincide with those of the resonant circuit. Furthermore, the maximum quantitative value of each of those quantums of energy will be fixed; and the value of the energy in each of those quantums of energy will exceed the losses of the resonant circuit at a predetermined current value of that resonant circuit. The condenser 1050 will inject those quantums of energy into the resonant circuit, and the voltage across the inductor 1054 will experience a controlled cumulative growth. After an average of nine of the quantums of energy have been injected into the resonant circuit, the voltage across that inductor will rise to the point where the control element 1064 will trip.

That control element will be so biased by adjustment of the tap on resistor 992 that it can coact with the characteristic wave form of the resonant circuit 1050, 1052 and 1054 to determine the repetition rates of the voltage variations that can effect tripping of the control element 1064. For example, in FIGURE 33 the resonance curve of tuned circuit 1050, 1052, 1054 is shown. The ordinate in FIGURE 33 represents volts, and the abscissa represents frequency in kilocycles per second. The tuned circuit, in the case illustrated, is resonant at a frequency of eleven hundred and fifty cycles. It will be seen from the curve of FIGURE 33 that if the control element 1064 is so biased that a voltage somewhat greater than nine and one half volts is required from the tuned circuit to trip that control element, only signals within a very narrow frequency range can trip that control element. As a matter of fact, only signals within a range of about twenty cycles per second are effective to trip the thyratron 1064 under these conditions. A voltage of slightly more than six volts will provide an effective bandwidth of about fifty cycles per second and a voltage of about five volts will provide a bandwidth of about a hundred cycles per second.

This means that if the thyratron 1064 is set to fire when the voltage across inductor 1054 reaches five volts, voltage variations due to noise or an unacceptable bill have repetition rates about twelve hundred cycles per second and below eleven hundred cycles per second can never increase the voltage across the inductor 1054 sufficiently to trip that thyratron. As a result, the tuned amplifier and control element of FIGURE 30 can provide an infinite rejection of all voltage variations that do not have repetition rates falling within a hundred-cycle band. If the bias of thyratron 1064 is increased so the voltage across inductor 1054 must be slightly more than six volts, voltage variations due to noise or an unacceptable bill that have repetition rates above eleven hundred and seventy-five cycles per second and below eleven hundred and twenty-five cycles per second can never increase the voltage across the inductor 1054 sufficiently to trip that thyratron. As a result, the tuned amplifier and control element of FIGURE 30 can provide an infinite rejection of all voltage variations that do not fall within a fifty-cycle band. If the bias of thyratron 1064 is increased so slightly more than nine and one-half volts must appear across inductor 1054 voltage variations due to noise or an unacceptable bill that have repetition rates above eleven hundred and sixty cycles per second and below eleven hundred and forty cycles per second can never increase the voltage across the inductor 1054 sufficiently to trip the thyratron. As a result, the tuned amplifier and control element of FIGURE 30 can provide an infinite rejection of all voltage variations that do not fall within a twenty-cycle band. In actual practice, the rejection of all voltage variations having repetition rates outside a twenty-cycle, or even a fifty-cycle, band of frequencies is not essential; and it is quite adequate to set the bias of the thyratron 1064 so voltage variations having repetition rates outside a hundred-cycle band of frequencies will be incapable of increasing the voltage across the inductor 1054 sufficiently to trip that thyratron.

To produce the desired controlled cummulative growth of voltage across the inductor 1054, the voltage variations injected into the resonant circuit 1050, 1052, 1054 must have the required phase, repetition rate, durations and quantitative values. Furthermore, a predetermined minimum number of those voltage variations must be injected into that resonant circuit within a predetermined period of time. The number of voltage variations that must be injected into that resonant circuit within a predetermined period of time to trip the control element is a function of the maximum quantitative value of each limited voltage variation and of the bias on that control element. Specifically, if it was desired to use fewer voltage variations to effect the tripping of the thyratron 1064, the limiter could be set to provide each voltage variation with a greater maximum quantitative value, or the thyratron could be given a smaller bias. Conversely, if it was desired to require more voltage variations to effect the tripping of the thyratron 1064, the limiter could be set to provide each voltage variation with a lesser maximum quantitative value, or the thyratron could be given a greater bias. The number of voltage variations required to trip the thyratron 1046 should not be less than six; and it is desirable, where the repetition rate of the voltage variations exactly coincides with the resonant frequency of the resonant circuit, that nine voltage variations be required to trip the thyratron 1064. The nine voltage variations and the resulting controlled cumulative growth of voltage give full assurance that the voltage variations which trip the thyratron were generated by the grid lines in the leading or trailing half of the portrait background of an authentic dollar bill.

If the voltage variations introduced into the resonant circuit have too short a duration or have too small an amplitude, they will not add enough energy to that resonant circuit to effect the controlled cumulative growth in voltage that is needed to trip the thyratron. As a result, the tuned amplifier and control element of the present invention can reject a spurious bill that generates voltage variations which have the required repetition rate but do not have the required duration and amplitude.

If the voltage variations introduced into the resonant circuit maintain substantially the same repetition rate but drift out of phase with the characteristic waveform of the resonant circuit, those voltage variations will, in part at least, buck rather than aid the growth of voltage across the inductor 1054 and thereby keep that voltage from growing sufficiently to trigger the thyratron 1064. Consequently, the tuned amplifier and control element provided by the present invention can reject a bill that generates voltage variations which have the required repetition rate but which do not have the required phase.

The controlled cumulative growth of voltage in the resonant circuit, which is so important in the operation of the tuned amplifier and control element of FIGURE 30, depends in large part upon the limiting action of the limiter. Without that limiting action, one or two voltage variations of large amplitude could cause the voltage across the inductor 1054 to rise sufficiently to trip the thyratron 1064. Such rapid growth would be very undesirable because noise or an unacceptable bill could easily produce such voltage variations. Consequently, the effective operation of the tuned amplifier and control element of FIGURE 30 is dependent upon the action of the limiter, the resonant circuit and the control element in providing the controlled cumulative growth of voltage needed to trip that control element.

When the voltage across the inductor 1054 reaches the required level, the resistor 1056 and condenser 1058 will coupled that voltage to the grid of thyratron 1064 and cause that thyratron to trip. The resistor 1056 is desirable because it prevents appreciable loading of the resonant circuit 1050, 1052, 1054. That resistor thus coacts with the condenser 1050 to withdraw energy from and to introduce energy into that resonant circuit without appreciably loading that resonant circuit. As a result, the resonant circuit can have a high Q.

When the thyratron 1064 is tripped, alternating current will flow from the upper end of winding 946, through resistor 1070, past the lower terminal 1067, through the coil 428 of the relay chain of FIGURES 10, 14 or 29, past the upper terminal 1067, through the thyratron 1064 to conductor 950, and then past junctions 953, 952 and 955 to the lower end of winding 946. That flow of alternating current will energize the relay coil 428 and initiate the operations described hereinbefore with regard to FIGURES 10, 14 and 29. If further voltage variations having the required phase, repetition rate, duration and quantitative values are introduced into the resonant circuit 1050, 1052, 1054, those voltage variations will cause a further growth in the voltage across the inductor 1054; but that further growth will not cause a change in the energization of the relay coil 428. Instead, that relay coil will remain energized until the voltage across the inductor 1054 falls, as it will when the grid lines of the leading half of the portrait background move beyond the air gap 320 of magnetic head 318. The falling of the voltage across the inductor 1054 will cause the thyratron to stop conducting because the anode of that thyratron is supplied with A.C. voltage; and hence that thyratron can only conduct when it has a predetermined voltage at its grid. When the thyratron stops conducting, the relay coil 428 of FIGURES 10, 14 or 29 will become deenergized. If the inserted bill is an authentic dollar bill of the United States of America a second set of phase repetitive voltage variations from the other half of the portrait background will cause the desired controlled cumulative growth of voltage to occur once again in the resonant circuit. Thereupon the thyratron 1064 will again trip and again release, thereby supplying the second validating signal to the relay chain. That second validating signal will lead to the acceptance of the inserted bill, all as described hereinbefore.

The condenser 1066 is in parallel with the relay coil 428 of FIGURES 10, 14 and 29; and that condenser will charge during the positive-going portions of the alternating current. During the negative-going portions of that alternating current, that condenser will partially discharge through the relay coil 428 and thereby keep that coil energized.

The control element 1078 is provided to enable the tuned amplifier and control element of FIGURE 30 to avoid giving validating signals to the relay chain of FIGURES 10, 14 or 29 when voltage variations which have too great an amplitude are applied to the input terminals 1008. That control element is a thyratron that will energize the relay coil 1000 whenever a suitable voltage is applied to its grid. That voltage will be derived from tube 1030, and it will be applied to the grid of thyratron 1078 through a coupling condenser 1072 and the resistor 1076.

The control element 1078 is so biased by adjustment of the tap on resistor 986 that signals of a predetermined amplitude at the output of tube 1030 will trigger that control element and energize the relay coil 1000. That energization will open the contacts 998. Normally, those contacts shunt the resistor 996 and thereby enable the resistors 990, 992, and 994 to provide a moderate negative bias for the control element 1064. When the contacts 998 open, the resistor 996 is placed in series with the resistors 990, 992 and 994 and it appreciably increases the negative bias for the control element 1064. That increase in negative bias is sufficient to prevent the tripping of thyratron 1064 regardless of the phase, repetition rate, duration or amplitude of voltage variations applied to the input terminals 1008.

The thryratron 1078 is supplied with A.C. voltage, and hence that thyratron will conduct current only as long as execessively large signals are present at the output of tube 1030. However, the capacity of condenser 1002, which is connected in parallel with the relay soil 1000, is large; and even after the thyratron 1078 stops conducting, that relay coil will be kept energized by the discharging of the condenser 1002 through it. As a result, once an excessive signal appears at the output of tube 1030, the negative bias on the control element 1046 will be increased to a higher level and will be maintained at that level until after the bill has passed by the magnetic heads. In this way, full protection is provided against the acceptance of a bill that is engraved, in whole or in part, with ink having excessively strong magnetic properties.

From the foregoing it will be apparent that the tuned amplifier and control element of FIGURE 30 keep the currency detector from accepting bills that produce voltage variations which do not have the required repetition rate, that do not have the required duration, that do not have the required phase, that are too weak, or that are too strong. In doing so, that tuned amplifier and control element provide maximum protection for the owners of vending machines.

Figure 31:
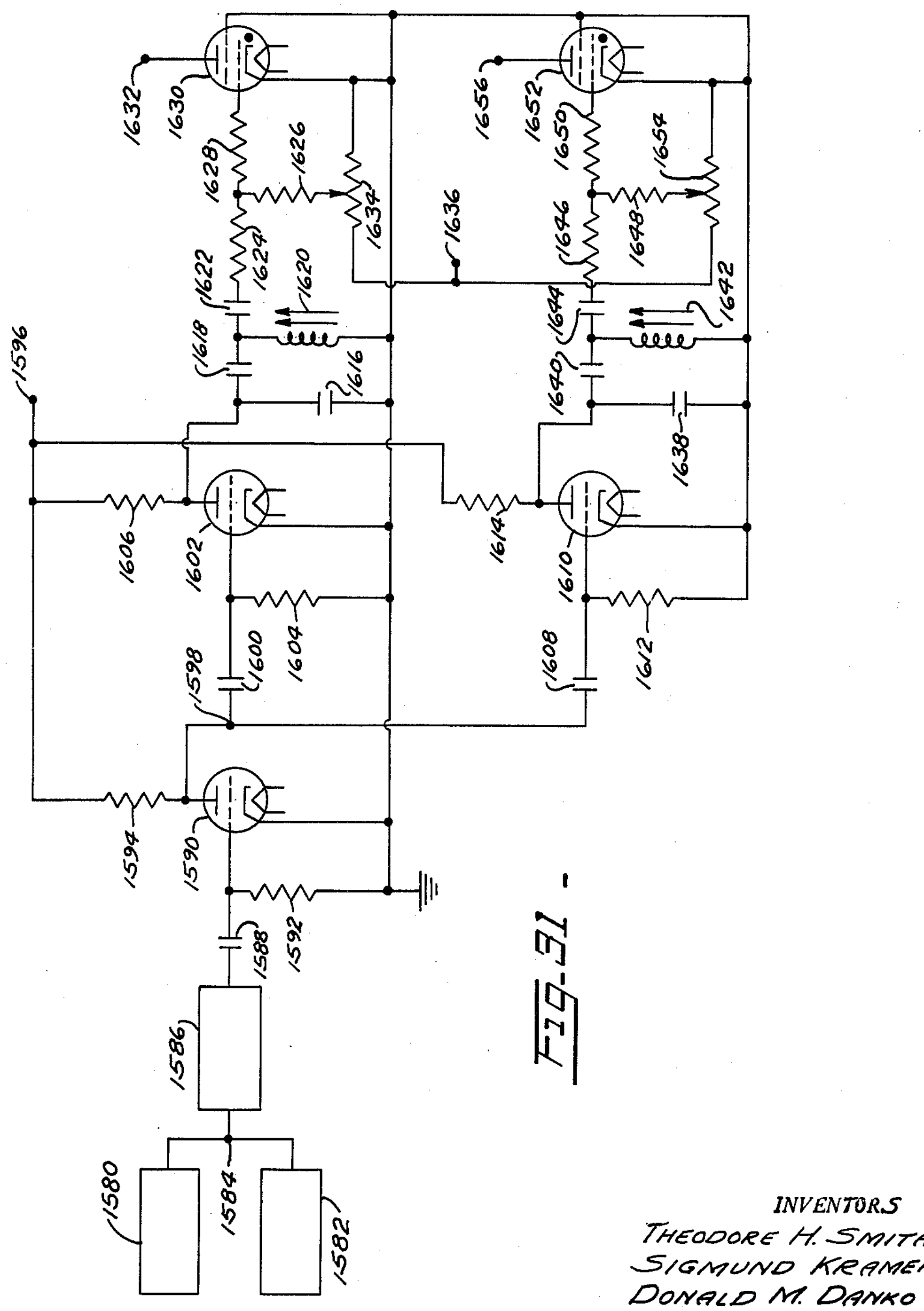
FIGURE 31 shows the circuit of a multi-channel tuned amplifier and of the control elements therefor.

*Amplifier circuit and control elements of FIGURE 31*

FIGURE 31 illustrates a circuit which is similar in some respects to the circuit of FIGURE 30. Specifically, the operation of the circuit of FIGURE 31 depends upon the limiting of an input signal, the translating of the limited signal in a resonant circuit, and the utilizing of the resultant output to operate a trigger device. In the circuit of FIGURE 31, however, two resonant circuits are provided; each circuit being responsive to a slightly different frequency. One of those resonant circuits could be set to experience a controlled cumulative growth in voltage when an authentic one dollar bill of the United States of America is inserted, while the other of those resonant circuits could be set to experience a controlled cumulative growth in voltage when an authentic five dollar bill of the United States of America is inserted. The circuit of FIGURE 31 is, therefore, suitable for identifying and accepting authentic one dollar and five dollar bills of the United States of America.

FIGURE 31 illustrates two signal sources 1580 and 1582 which are capable of generating signals having different frequencies. Thus, the signal sources 1580 and 1582 could be magnetic heads that would generate voltage variations having a predetermined repetition rate when an authentic one dollar bill was inserted and that would generate voltage variations having a different predetermined repetition rate when an authentic five dollar bill was inserted; or, if desired, the signal source 1580 could be an oscillator generating a signal of one frequency and the signal source 1582 could be a second oscillator generating a signal of another frequency. The signals from the signal sources 1580 and 1582 are amplified and translated by the unit 1586.

The signal output from unit 1586 is applied to an amplifier-limiter which includes a vacuum tube 1590; and that output signal is coupled to the grid of tube 1590 by a coupling condenser 1588. The cathode of the tube 1590 is grounded, and its grid is connected to ground through a resistor 1592. The anode of that tube is connected to a suitable source of D.C. operating potential at terminal 1596 through a load resistor 1594. The parameters of the amplifier-limiter are so chosen that tube 1590 operates with anode current saturation for signal input voltages of a predetermined ampiltude and thereby provides a limited output signal.

The limited signal output from the tube 1590 is fed to each of two separate signal translating channels. Each of these channels includes another limiter-amplifier similar to the one just described. Thus, the channel at the top of FIGURE 31 includes tube 1602 having its grid coupled to the anode of tube 1590 through a coupling condenser 1600 and having its grid connected to ground through a grid resistor 1604. A load resistor 1606 is provided for the tube 1602. The channel at the bottom of FIGURE 31 includes tube 1610, coupling condenser 1608, grid resistor 1612, and anode resistor 1614.

The signal output from tube 1602 is applied to a resonant circuit 1616, 1618, 1620, and the output from this resonant circuit is coupled to the grid of a control element 1630. That control element is shown as a thyratron, but mechanical and other electronic threshold-type control elements of the avalanche type could be used. The cathode of control element 1630 is grounded, and a suitable bias for that control element is provided from a suitable source of negative voltage at terminal 1636. This bias voltage is provided for control element 1630 through the tap of a resistor 1634, a resistor 1626 and a resistor 1628. Resistor 1628 is connected in series with a resistor 1624 and a condenser 1622 between the grid of control element 1630 and the resonant circuit. The signal output from the tube 1610 is applied to a resonant circuit 1638, 1640, 1642, and the output from this resonant circuit is coupled to the grid of a control element 1652. The cathode of control element 1652 is grounded, and a suitable bias for that control element is provided from the source of negative voltage at terminal 1636. That bias voltage is provided for control element 1652 through the tap of a resistor 1654, a resistor 1648 and a resistor 1650. Resistor 1650 is connected in series with a resistor 1646 and condenser 1644 between the grid of control element 1652 and the resonant circuit 1638, 1640, 1642.

A suitable source of operating voltage is provided for the control elements 1630 and 1652 at terminals 1632 and 1656, respectively. A series-connected resistor and condenser comparable to resistor 1070 and condenser 1066 of FIGURE 30 could be connected between an A.C. voltage source and the terminal 1632; and a similar series-connected resistor and condenser could be connected between that A.C. voltage source and the terminal 1656. Relay coils such as the relay coil 428 of FIGURES 10, 14 or 29 could be connected in parallel with those condensers; and, consequently, each of the control elements, upon firing, could be effective to operate a control relay or signal device of some type.

Both the signal from the signal source 1580 and the signal from the signal source 1582 are coupled into each of the resonant circuits; but those signals will not be introduced into that circuit at the same time. If the repetition rate and phase of the quantums of energy in one of those signals coincide with those of the characteristic waveform of one of those resonant circuits, and if the duration and magnitude of each of those quantums of energy in that signal are such that those quantums of energy slightly exceed the losses of that one resonant circuit at some predetermined current value of that one circuit, the voltage in that one circuit will experience a controlled cumulative growth. When the voltage across the inductor of that one circuit reaches a predetermined value, the control element coupled to that one circuit will fire and will provide a validating signal.

The other of the two resonant circuits may be caused to start oscillating by the said one signal, but the repetition rate and phase of the quantums of energy of that signal will not coincide with those of the characteristic waveform of that other circuit; and consequently the voltage in that other resonant circuit will not experience the growth that is needed to trip the control element coupled to that other resonant circuit. The required controlled cumulative growth of voltage will occur in that other circuit only when a signal, wherein the quantums of energy have a repetition rate and phase that substantially coincide with those of the characteristic waveform of that circuit, is coupled into that circuit. This means that although signals having two separate frequencies are introduced into each of the resonant circuits, one of those circuits will respond to signals having one frequency to actuate its control element but will not respond to signals having the other frequency to actuate that control element; whereas the other circuit will respond to the other frequency to actuate its control element but will not respond to the said one frequency to actuate that control element.

Where the signal sources 1580 and 1582 are sensing heads in a currency detector, the terminal 1632 can be connected to a relay chain or the like that will supply a suitable accept signal to the currency detector and that will also accredit the patron with the insertion of an authentic one dollar bill of the United States of America; and the terminal 1656 can be connected to a relay chain or the like that will supply a suitable accept signal to the currency detector and that will also accredit the patron with the insertion of an authentic five dollar bill of the United States of America. Further, the resonant circuit 1616, 1618, 1620 can be set to resonate at approximately nineteen hundred and thirty-three cycles per second, while the resonant circuit 1638, 1640, 1642 can be set to resonate at approximately thirteen hundred and forty-two cycles per second. Where this is done, the vertical grid lines of an authentic one dollar bill of the United States of American will cause the signal sources 1580 and 1582 to supply voltage variations to the amplifier 1586, and the resulting amplified nineteen hundred and thirty-three cycles per second signal will be applied to both resonant circuits; but only the resonant circuit 1616, 1618, 1620 will experience the controlled cumulative growth of voltage that is needed. Consequently, that resonant circuit will fire the control element 1630 whereas the resonant circuit 1638, 1640, 1642 will be unable to fire the control element 1652. However, the vertical grid lines of an authentic five dollar bill of the United States of America will cause the signal sources 1580 and 1582 to supply voltage variations to the amplifier 1586, and the resulting amplified thirteen hundred and forty-two cycles per second signal will cause the resonant circuit 1638, 1640, 1642 to experience the controlled cumulative growth needed to fire the control element 1652 but will be unable to cause the resonant circuit 1616, 1618, 1620 to fire the control element 1630. In this way, the circuit of FIGURE 31 enables the currency detector of the present invention to reject spurious paper currency and to provide one response when an authentic one dollar bill of the United States of America is inserted while providing a distinctively different response when an authentic five dollar bill of the United States of America is inserted.

The controlled cumulative growth of voltage that is experienced in the circuits of FIGURES 30 and 31 is very important, because it keeps those circuits from responding to noise pulses or transients which could simulate one, two, three, four or five of the voltage variations generated by authentic bills. Because of the low signal-to-noise ratio imposed by the limited magnetic properties in the ink used in engraving authentic paper currency of the United States of America, noise pulses and transients frequently are able to simulate the voltage variations generated by authentic bills; and if the circuits of FIGURE 30 or 31 merely counted a minimum number of voltage variations or merely responded to voltage variations having a predetermined repetition rate, noise pulses and transients could cause the acceptance of spurious bills. However, by relying upon controlled cumulative growth of voltage based upon six or more voltage variations, the circuits of FIGURES 30 and 31 keep noise pulses and transients from causing the acceptance of spurious bills.

*Alternate constructions*

The motor 164 of the embodiment of currency detector of FIGURES 1–10 drives the carrier 226 toward the rear of the bed plate 188 and then drives that carrier back toward the front of that bed plate; and it does so through the medium of the sprocket chain 262 and the pin 260. If desired, a constant force spring of the "Negator" type could be used to advance the carrier 226 toward the rear of the bed plate 188 or could be used to return that carrier to the front of that bed plate. Also, if desired, a reversible motor could be used instead of the monodirectional motor 164.

If desired, shaft 300 could be driven by a separate motor that has a more powerful torque than motor 164 has. Such a motor could not be stalled by an inserted bill to which a patron has attached a wire, thread, tape or other "tail." However, roller 290 and 380 coact with rollers 302 and 390 and eccentric discs 392 to prevent almost all withdrawing of inserted bills. The eccentric discs 392 are particularly useful because they do not depend upon electrical energization and are effective even if plug 410 is disconnected.

In the currency detector of FIGURES 15–23 and 29, the inserted bill is bent downwardly as it passes over roller 738; and that bending is desirable. A similar downward bending could, if desired, be provided for the currency detectors of FIGURES 1–14 by leaving the platforms 176 horizontal and by inclining the bed plates 188 and 544 downwardly. Such bending would not only help eliminate wrinkles in inserted bills but would also resist the insertion of stiff cards and the like into those currency detectors.

Magnetic heads 318, 344 and 726 are biased heads, and such heads are preferred. However, it is possible to sense inserted bills for the presence of magnetic ink by providing a different form of bias, as by storing energy in the ink of the grid lines prior to the sensing step. For example, radiation energy or mangnetic energy could be appropriately stored in the magnetic ink and then used to generate voltage variations during sensing.

The resonant circuit will preferably be connected as shown in FIG. 30. However, that circuit could be connected in many other ways. The primary requirement of the connection between the limiter and the resonant circuit is that it couples the signals into that circuit without loading that circuit.

In FIGURES 10, 14 and 29, relay chains have been shown and described which respond to the control elements. Such relay chains are preferred, but it is possible to use a stepping relay in place of any of those relay chains.

*Summation*

In each of the embodiments of currency detector shown by FIGURES 1–29, the inserted bill is gripped at the sides thereof adjacent the leading edge thereof. This is important because it leaves the main area of the bill accessible to the magnetic heads while holding the leading edge of that bill against bending, crumpling and rolling. The gripping jaws 246 and the belts 780, 782 and 784 grip and move the inserted bills without marring or injuring those bills, and they move those bills past the air gaps of the magnetic heads at predetermined speeds. Those predetermined speeds make it possible to use a tuned amplifier and a threshold-type control element to accept or reject the inserted bills.

As the inserted bills move past the air gaps, they are resiliently pressed into intimate engagement with, and are bowed to conform to the curvature of, the faces of those magnetic heads. Such intimate engagement and such bowing enable the magnetic ink in each of the grid lines of the portrait background to generate a voltage variation in the coils on the cores of those magnetic heads. Such intimate engagement also helps smooth out any wrinkles in the bills; and that smoothing-out action is important because the spacing of the vertical grid lines of the portrait background can be reduced in wrinkled bills.

The air gaps of the magnetic heads are set parallel to the vertical grid lines of the portrait backgrounds of the inserted bills, and those air gaps are longer than the widths of the horizontal grid lines of those portrait backgrounds. As a result, full assurance is given that unobscured portions of the vertical grid lines of the portrait background will engage, and be sensed by, the air gaps of the magnetic heads.

The voltage variations generated when the vertical grid lines are moved relative to the air gap are amplified; and the resulting signals are then analyzed to determine whether the bill will be accepted or rejected. If the magnetic properties of the ink in those certical grid lines are too weak, the bill will be rejected; if the magnetic properties of the ink in those vertical grid lines are too strong, the bill will be rejected; and if the spacing between, and the widths of, those grid lines are not correct, the bill will be rejected. The portion of the portrait background intermediate the leading edge of that background and the leading edge of the portrait provides the six or more voltage variations that lead to a first validating signal, and the portion of the portrait background intermediate the trailing edge of the portrait and the trailing edge of the portrait background provides the six more voltage variations that lead to the second validating signal; and this is desirable because it prevents the acceptance of a bill that is split along its vertically directed center line. After the bill hase been sensed, it will be directed to a cash box.

The said embodiments of currency detector are responsive to the patterns of variations of the magnetic properties of the portrait background 528. The vertical grid lines of that portrait background are representative of patterns on paper currency which have varying magnetic properties; but it is not intended to limit "pattern" to exclude random variations of other kinds that are sufficient to produce the signals required to operate a currency detector.

Whereas the drawing and accompanying description have shown and described several embodiments of the present invention, it should be apparent to those skilled in the art that various changes may be made in the form of the invention without affecting the scope thereof.

What is claimed is:

1. Apparatus for identifying authentic paper currency every true example of which has a first magnetic element consisting of an area on the face of the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element; means for supporting the currency on the base; at least one of the two magnetic elements being magnetized to produce a magnetic field in it and adjacent to it; means for producing relative movement of the currency supporting means and the magnetic head to cause said second magnetic element to move at a predetermined speed along a predetermined path across the said magnetic area of the currency, said motion-producing means including means to dispose the magnetic area of the first said magnetic element in initiate engagement with said piece of magnetic material of said second magnetic element during said movement to minimize the magnetic reluctance between them, so that the said magnetic field is caused to pass through the said two magnetic elements despite weakness in the magnetic material on the currency and so variations in the flux in the said piece of magnetic material of the said second magnetic element are produced that cause generation of voltages in the said conductor that have variations corresponding in pattern to the variations of magnetic properties along the said predetermined path across the currency; means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations.

2. Apparatus for identifying authentic paper currency every true example of which has a first magnetic element consisting of an area on the face of the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element; means for supporting the currency on the base; at least one of the two magnetic elements being magnetized to produce a magnetic field in it and adjacent to it; means for producing relative movement of the currency supporting means and the magnetic head to cause said second magnetic element to move at a predetermined speed along a predetermined path across the said magnetic area of the currency, said motion-producing means including means to dispose the magnetic area of the first said magnetic element in intimate engagement with said piece of magnetic material of said second magnetic element during said movement to minimize the magnetic reluctance between them, so that the said magnetic field is caused to pass through the said two magnetic elements despite weakness in the magnetic material on the currency, and so variation in the flux in the said piece of magnetic material of the said second magnetic element are produced that cause generation of voltages in the said conductor that have variations corresponding in pattern to the variations of magnetic properties along the said predetermined path across the currency; means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations; means providing a currency-receiving area upon which the currency may be introduced into the apparatus and may be subjected to identification by relative movement between it and the magnetic head; means to maintain the magnetic head and said area separate to permit the currency to be introduced; means to start the relative movement between the head and the currency and means to bring the head and the area together after the currency has been introduced, the relative movement has begun, and the leading edge of the currency is disposed in the currency-receiving area beyond the point where the head and the area come together.

3. Apparatus for identifying authentic paper currency every true example of which has a first magnetic element consisting of an area on the face of the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element; means for supporting the currency on the base; at least one of the two magnetic elements being magnetized to produce a magnetic field in it and adjacent to it; means for producting relative movement of the currency supporting means and the magnetic head to cause said second magnetic element to move at a predetermined speed along a predetermined path across the said magnetic area of the currency, said motion-producing means including means to dispose the magnetic area of the first said magnetic element in intimate engagement with said piece of magnetic material of said second magnetic element during said movement to minimize the magnetic reluctance between them, so that the said magnetic field is caused to pass through the said two magnetic elements despite weakness in the magnetic material on the currency, and so variations in flux in the said piece of magnetic material of the said second magnetic element are produced that cause generation of voltages in the said conductor that have variations corresponding in pattern to the variations of magnetic properties along the said predetermined path across the currency; means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations; the currency-accepting means including a band pass filter circuit tuned to the frequency produced by the aforesaid movement of the lines of magnetic material already on the particular denomination of currency produced by the governmental authorities issuing the currency, the currency accepting means including means to prevent its own operation in response to voltage variations of insufficient magnitude below a predetermined value, whereby to prevent acceptance of currency having magnetic properties below those of authentic currency.

4. Apparatus for identifying authentic paper currency every true example of which has a first magnetic element consisting of an area on the face of the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element; means for supporting the currency on the base; at least one of the two magnetic elements being magnetized to produce a magnetic field in it and adjacent to it; means for producing relative movement of the currency supporting means and the magnetic head to cause said second magnetic element to move at a predetermined speed along a predetermined path across the said magnetic area of the currency, said motion-producing means including means to dispose the magnetic area of the first said magnetic element in intimate engagement with said piece of magnetic material of said second magnetic element during said movement to minimize the magnetic reluctance between them, so that the said magnetic field is caused to pass through the said two magnetic elements despite weakness in the magnetic material on the currency, and so variations in the flux in the said piece of magnetic material of the said second magnetic element are produced that cause generation of voltages in the said conductor that have variations corresponding in pattern to the variations of magnetic properties along the said predetermined path across the currency; means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations; cyclic control mechanism having: means to start the relative movement producing means, means to maintain it in operation once it is started until the currency-accepting means has had an opportunity to operate; and means thereafter operable to stop the movement producing means.

5. Apparatus for identifying authentic paper currency every true example of which has a first magnetic element consisting of an area on the face of the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element, means for supporting the currency that permits said currency to engage said piece of magnetic material of said magnetic head during relative movement of said magnetic head and said currency, at least one of the two magnetic elements being magnetized to produce a magnetic field in it and adjacent to it; means for producing relative movement of the currency supporting means and the magnetic head to cause said second magnetic element to move at a predetermined speed along a predetermined path across the said magnetic area of the currency, said motion-producing means including means to dispose the magnetic area of the first said magnetic element in direct engagement with said piece of magnetic material of said second magnetic element during said movement to minimize the magnetic reluctance between them, so that the said magnetic field is caused to pass through the said two magnetic elements despite weakness in the magnetic material on the currency, and so variations in the flux in the said piece of magnetic material of the said second magnetic element are produced that cause generation of voltages in the said conductor that have variations corresponding in pattern to the variations of magnetic properties along the said predetermined path across the currency, means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations, said piece of magnetic material of said second magnetic element having an air gap therein, and resilient means to provide an intimate engagement between said magnetic area of said currency and said air gap of said piece of magnetic material of said second magnetic element during said relative movement of said magnetic head and said currency.

6. Apparatus for identifying authentic paper currency every true example of which has a first magnetic element consisting of an area on the face of the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element, means for supporting the currency that permits said currency to engage said piece of magnetic material of said magnetic head during relative movement of said magnetic head and said currency, at least one of the two magnetic elements being magnetized to produce a magnetic field in it and adjacent to it, means for producing relative movement of the currency supporting means and the magnetic head to cause said second magnetic element to move at a predetermined speed along a predetermined path across the said magnetic area of the currency, said motion-producing means including means to dispose the magnetic area of the first said magnetic element in direct engagement with said piece of magnetic material of said second magnetic element during said movement to minimize the magnetic reluctance between them, so that the said magnetic field is caused to pass through the said two magnetic elements despite weakness in the magnetic material on the currency, and so variations in the flux in the said piece of magnetic material of the said second magnetic element are produced that cause generation of voltages in the said conductor that have variations corresponding in pattern to the variations of magnetic properties along the said predetermined path across the currency, means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations, and a member adjacent said magnetic head which coacts with said magnetic head to apply pressure to said currency during said relative movement of said magnetic head and said currency and thereby assure intimate engagement between said currency and said magnetic head, said currency and said magnetic head initially being spaced apart sufficiently to enable said motion-producing means to raise the speed of relative movement between said magnetic head and said currency to said predetermined speed before said member and said magnetic head apply pressure to said currency.

7. Apparatus for identifying authentic paper currency every true example of which has a first magnetic element consisting of an area on the face of the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element, means for supporting the currency that permits said currency to engage said piece of magnetic material of said magnetic head during relative movement of said magnetic head and said currency, at least one of the two magnetic elements being magnetized to produce a magnetic field in it and adjacent to it; means for producing relative movement of the currency supporting means and the magnetic head to cause said second magnetic element to move at a predetermined speed along a predetermined path across the said magnetic area of the currency, said motion-producing means including means to dispose the magnetic area of the first said magnetic element in direct engagement with said piece of magnetic material of said second magnetic element during said movement to minimize the magnetic reluctance between them, so that the said magnetic field is caused to pass through the said two magnetic elements despite weakness in the magnetic material on the currency, and so variations in the flux in the said piece of magnetic material of the said second magnetic element are produced that cause generation of voltages in the said conductor that have variations corresponding in pattern to the variations of magnetic properties along the said predetermined path across the currency, means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations, said piece of magnetic material of said second magnetic element having an air gap therein, said air gap being narrower than the elements of said predetermined pattern along said certain path across said area on said face of said currency, whereby said second magnetic element can sense each and every element of said predetermined pattern.

8. Apparatus for identifying authentic paper currency every true example of which has a first magnetic element consisting of an area on the face of the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element, means for supporting the currency that permits said currency to engage said piece of magnetic material of said magnetic head during relative movement of said magnetic head and said currency, at least one of the two magnetic elements being magnetized to produce a magnetic field in it and adjacent to it, means for producing relative movement of the currency supporting means and the magnetic head to cause said second magnetic element to move at a predetermined speed along a predetermined path across the said magnetic area of the currency, said motion-producing means including means to dispose the magnetic area of the first said magnetic element in direct engagement with said piece of magnetic material of said second magnetic element during said movement to minimize the magnetic reluctance between them, so that the said magnetic field is caused to pass through the said two magnetic elements despite weakness in the magnetic material on the currency, and so variations in the flux in the said piece of magnetic material of the said second magnetic element are produced that cause generation of voltages in the said conductor that have variations corresponding in pattern to the variations of magnetic properties along the said predetermined path across the currency, means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations, said currency supporting means including surfaces that are initially spaced apart to facilitate the ready insertion of the leading edge of the currency into position to be gripped and supported by said currency supporting means, said surfaces of said currency supporting means subsequently moving into engagement with said currency to grip and support said currency, and a starting means for said apparatus, said surfaces of said currency-supporting means moving into engagement with said currency after said starting switch is actuated.

9. Apparatus for identifying authentic paper currency every true example of which has a first magnetic element consisting of an area on the face of the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element, means for supporting the currency that permits said currency to engage said piece of magnetic material of said magnetic head during relative movement of said magnetic head and said currency, at least one of the two magnetic elements being magnetized to produce a magnetic field in it and adjacent to it, means for producing relative movement of the currency supporting means and the magnetic head to cause said second magnetic element to move at a predetermined speed along a predetermined path across the said magnetic area of the currency, said motion-producing means including means to dispose the magnetic area of the first said magnetic element in direct engagement with said piece of magnetic material of said second magnetic element during said movement to minimize the magnetic reluctance between them, so that the said magnetic field is caused to pass through the said two magnetic elements despite weakness in the magnetic material on the currency, and so variations in the flux in the said piece of magnetic material of the said second magnetic element are produced that cause generation of voltages in the said conductor that have variations corresponding in pattern to the variations of magnetic properties along the said predetermined path across the currency, means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations, said currency supporting means including surfaces that are initially stationary and that are subsequently movable to grip and hold the currency so said currency will be gripped and held by said currency supporting means, and a starting means for said apparatus that causes said surfaces to move and thereby grip and hold the currency, said starting means automatically being actuated and thereby causing said initially stationary surfaces to start moving to grip and hold said currency as said currency is moved into said apparatus adjacent said initially stationary surfaces.

10. Apparatus for identifying authentic paper currency every true example of which has a first magnetic element consisting of an area on the face of the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element, means for supporting the currency that permits said currency to engage said piece of magnetic material of said magnetic head during relative movement of said magnetic head and said currency, at least one of the two magnetic elements being magnetized to produce a magnetic field in it and adjacent to it, means for producing relative movement of the currency supporting means and the magnetic head to cause said second magnetic element to move at a predetermined speed along a predetermined path across the said magnetic area of the currency, said motion-producing means including means to dispose the magnetic area of the first said magnetic element in direct engagement with said piece of magnetic material of said second magnetic element during said movement to minimize the magnetic reluctance between them, so that the said magnetic field is caused to pass through the said two magnetic elements despite weakness in the magnetic material on the currency, and so variations in the flux in the said piece of magnetic material of the said second magnetic element are produced that cause generation of voltages in the said conductor that have variations corresponding in pattern to the variations of magnetic properties along the said predetermined path across the currency, means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations, and an acceptance mechanism that responds to said indication of authentic currency to cause said currency to move toward an acceptance area, said acceptance mechanism remaining inactive in the event said last-named means is inoperable to produce said indication of authentic currency.

11. Apparatus for identifying authentic paper currency every true example of which has a first magnetic element consisting of an area on the face of the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consistng of a piece of magnetic material and an electrical conductor associated with the piece of magnetic material, in which voltage variations may be produced by changes in magnetic flux in and adjacent the second magnetic element, means for supporting the currency that permits said currency to engage said piece of magnetic material of said magnetic head during relative movement of said magnetic head and said currency, at least one of the two magnetic elements being magnetized to produce a magnetic field in it and adjacent to it, means for producing relative movement of the currency supporting means and the magnetic head to cause said second magnetic element to move at a predetermined speed along a predetermined path across the said magnetic area of the currency, said motion-producing means including means to dispose the magnetic area of the first said magnetic element in direct engagement with said piece of magnetic material of said second magnetic element during said movement to minimize the magnetic reluctance between them, so that the said magnetic field is caused to pass through the said two magnetic elements despite weakness in the magnetic material on the currency, and so variations in the flux in the said piece of magnetic material of the said second magnetic element are produced that cause generation of voltages in the said conductor that have variations corresponding in pattern to the variations of magnetic properties along the said predetermined path across the currency, means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations, a member that is disposed inwardly of said apparatus in the path of currency introduced into said apparatus, an electromagnetic element to move said member out of the path of currency introduced into said apparatus, and means to energize said electromagnetic element and thereby cause said electromagnetic element to move said member out of the path of currency introduced into said apparatus, said member initially positioning introduced currency adjacent said currency-supporting means, said energizing means subsequently energizing said electromagnetic element to cause said electromagnetic element to move said member out of the path of currency introduced into said apparatus and thereby permit said currency to move further inwardly of said apparatus.

12. Apparatus for identifying authentic paper currency every true example of which has a first magnetic element consisting of an area on the face of the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element, means for supporting the currency that permits said currency to engage said piece of magnetic material of said magnetic head during relative movement of said magnetic head and said currency, at least one of the two magnetic elements being magnetized to produce a magnetic field in it and adjacent to it, means for producing relative movement of the currency supporting means and the magnetic head to cause said second magnetic element to move at a predetermined speed along a predetermined path across the said magnetic area of the currency, said motion-producing means including means to dispose the magnetic area of the first said magnetic element in direct engagement with said piece of magnetic material of said second magnetic element during said movement to minimize the magnetic reluctance between them, so that the said magnetic field is caused to pass through the said two magnetic elements despite weakness in the magnetic material on the currency, and so variations in the flux in the said piece of magnetic material of the said second magnetic element are produced that cause generation of voltages in the said conductor that have variations corresponding in pattern to the variations of magnetic properties along the said predetermined path across the currency, means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations, a member that is in register with said magnetic head and that can coact with said magnetic head to apply pressure to said currency during said relative movement of said magnetic head and said currency and thereby assure intimate engagement between said currency and said magnetic head, said member and said magnetic head initially being spaced apart to permit free movement of currency between them, and means to provide relative movement of said member and said magnetic head toward each other, said last-named means automatically providing relative movement of said member and said magnetic head toward each other after the leading edge of said currency has moved between said member and said magnetic head.

13. Apparatus for identifying authentic paper currency every true example of which has a first magnetic element consisting of an area on the face of the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element, means for supporting the currency that permits said currency to engage said piece of magnetic material of said magnetic head during relative movement of said magnetic head and said currency, at least one of the two magnetic elements being magnetized to produce a magnetic field in it and adjacent to it, means for producing relative movement of the currency supporting means and the magnetic head to cause said second magnetic element to move at a predetermined speed along a predetermined path across the said magnetic area of the curency, said motion-producing means including means to dispose the magnetic area of the first said magnetic element in direct engagement with said piece of magnetic material of said second magnetic element during said movement to minimize the magnetic reluctance between them, so that the said magnetic field is caused to pass through the said two magnetic elements despite weakness in the magnetic material on the currency, and so variations in the flux in the said piece of magnetic material of the said second magnetic element are produced that cause generation of voltages in the said conductor that have variations corresponding in pattern to the variations of magnetic properties along the said predetermined path across the currency, means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations, said motion-producing means providing relative movement between said magnetic head and said currency in one direction during the sensing of said currency, said motion-producing means providing relative movement between said magnetic head and said currency in the opposite direction in the event said currency is not accepted, and a member that is in register with said magnetic head and that coacts with said magnetic head to apply pressure to said currency during relative movement between said magnetic head and said currency in said one direction.

14. Apparatus for identifying authentic paper currency every true example of which has an area on the face thereof with metallic ink arranged to provide variations of metallic properties in a particular predetermined pattern along a certain path across the said area, which metallic properties may be weak, the apparatus comprising: a base, a magnetic head on the base, said magnetic head having a magnetic element consisting of a piece of magnetic material and an electrical conductor associated with the piece of magnetic material, in which voltage variations may be produced by changes in magnetic flux in and adjacent said magnetic element, said magnetic element having an air gap therein, bill-gripping members for supporting said currency that are movable relative to said magnetic head to cause said currency to engage said piece of magnetic material of said magnetic head, said magnetic head being biased to produce a magnetic field in it and adjacent to it, a motor to move said bill-gripping members relative to said magnetic head to cause a predetermined path across said metallic area on said face of said currency to move past said air gap of said magnetic head at a predetermined speed, a member in register with said air gap in said magnetic element of said magnetic head, said member and said magnetic element of said magnetic head permitting said currency to pass therebetween but applying pressure to said currency while it passes between them to hold said metallic face of said currency immediately adjacent said air gap in said magnetic element of said magnetic head to minimize the magnetic reluctance of said air gap of said magnetic element of said magnetic head, so that the said magnetic field is caused to pass through said metallic material on the face of said currency, and so variations in the flux in the said piece of magnetic material of the said magnetic element are produced that cause generation of voltages in the said conductor that have variations corresponding in pattern to the variations of metallic properties along the said predetermined path across the currency, and a circuit connected with the electrical conductor of the magnetic head operable to produce an indication of authentic currency, said circuit being responsive to the particular pattern of voltage variations produced in the conductor by relative movement of authentic currency and the magnetic head, as aforesaid, said circuit being inoperable to produce said indication in response to substantially different patterns of voltage variations, said motor initiating movement of said bill-gripping members and of said currency while said currency is spaced away from said member and said magnetic head, whereby said motor can cause said bill-gripping members and said currency to be moving at said predetermined speed at the time said member and said magnetic head apply pressure to said currency, said predetermined speed being high enough that the application of said pressure to said currency by said member and said magnetic head does not materially reduce the speed of said currency.

15. Apparatus for identifying authentic paper currency every true example of which has an area on the face thereof with metallic ink arranged to provide variations of metallic properties in a particular predetermined pattern along a certain path across the said area, which metallic properties may be weak, the apparatus comprising: a base, a magnetic head on the base, said magnetic head having a magnetic element consisting of a piece of magnetic material and an electrical conductor associated with the piece of magnetic material, in which voltage variations may be produced by changes in magnetic flux in and adjacent said magnetic element, said magnetic element having an air gap therein, bill-gripping members for supporting said currency that are movable relative to said magnetic head to cause said currency to engage said piece of magnetic material of said magnetic head, said magnetic head being biased to produce a magnetic field in it and adjacent to it, a motor to move said bill-gripping members relative to said magnetic head to cause a predetermined path across said metallic area on said face of said currency to move past said air gap of said magnetic head at a predetermined speed, a member in register with said air gap in said magnetic element of said magnetic head, said member and said magnetic element of said magnetic head permitting said currency to pass therebetween but applying pressure to said currency while it passes between them to hold said metallic face of said currency immediately adjacent said air gap in said magnetic element of said magnetic head to minimize the magnetic reluctance of said air gap of said magnetic element of said magnetic head, so that the said magnetic field is caused to pass through said metallic material on the face of said currency, and so variations in the flux in the said piece of magnetic material of the said magnetic element are produced that cause generation of voltages in the said conductor that have variations corresponding in pattern to the variations of metallic properties along the said predetermined path across the currency, and a circuit connected with the electrical conductor of the magnetic head operable to produce an indication of authentic currency, said circuit being responsive to the particular pattern of voltage variations produced in the conductor by relative movement of authentic currency and the magnetic head, as aforesaid, said circuit being inoperable to produce said indication in response to substantially different patterns of voltage variations, said motor initiating movement of said bill-gripping members and of said currency while said currency is spaced away from said member and said magnetic head, said bill-gripping members being belts, said bill-gripping belts being displaced laterally of said predetermined path on said currency and holding said predetermined path on said currency in register with said magnetic head, said bill-gripping belts being supported and driven by pulleys and one of said pulleys being driven by said motor.

16. The method of separating spurious currency from authentic currency every true example of which has a first magnetic element consisting of an area on the face of the currency having magnetic material arranged to provide variations of magnetic properties in a particular predetermined pattern along a certain path across the said area, which magnetic properties may be weak; the method comprising: initially disposing a bill in spaced apart relation with a magnetic head which has a second magnetic element consisting of a piece of magnetic material and an electrical conductor associated with the piece of magnetic material, subsequently initiating rapid relative movement between said bill and said magnetic head while said bill and said magnetic head are spaced apart, increasing the speed of relative movement between said bill and said magnetic head to a predetermined value while said bill and said magnetic head are still spaced apart, magnetizing one of said two magnetic elements while the first said magnetic element of said bill and said second magnetic element of said magnetic head are in register with each other, causing the first said magnetic element of said bill and said second magnetic element of said magnetic head to directly engage each other along a predetermined path across the said magnetic area of said bill while said one of said two magnetic elements is magnetized and thereby change the magnetic flux in and adjacent to said second magnetic element of said magnetic head, said magnetic element of said bill and said second magnetic element of said magnetic head directly engaging each other while the speed of relative movement between said bill and said magnetic head is at said predetermined value to cause said changes in the magnetic flux in and adjacent to said second magnetic element of said magnetic head to generate voltage variations in said electrical conductor associated with said piece of magnetic material of said magnetic head, applying pressure to said bill and to said magnetic head in a direction transverse of the direction of said relative movement between said bill and said magnetic head to hold the first siad magnetic element of said bill and said second magnetic element of said magnetic head in direct and intimate engagement during said relative movement between said bill and said magnetic head and thereby minimize the magnetic reluctance between them, so that the said magnetic field is caused to pass through the said two magnetic elements despite weakness in the magnetic material on the currency, said voltage variations in said electrical conductor associated with said piece of magnetic material of said magnetic head corresponding in pattern to the variations of magnetic properties along the said predetermined path across the currency, sensing said voltage variations in said electrical conductor associated with said piece of magnetic material of said magnetic head and effecting acceptance of said bill if said voltage variations in said electrical conductor associated with said piece of magnetic material of said magnetic head are of a predetermined nature but effecting rejection of said bill if said voltage variations in said electrical conductor associated with said piece of magnetic material of said magnetic head are not of said predetermined nature.

17. The method of separating spurious currency from authentic currency every true example of which has a first magnetic element consisting of an area on the face of the currency having magnetic material arranged to provide variations of magnetic properties in a particular predetermined pattern along a certain path across the said area, which magnetic properties may be weak; the method comprising: initially disposing a bill in spaced apart relation with a magnetic head which has a second magnetic element consisting of a piece of magnetic material and an electrical conductor associated with the piece of magnetic material subsequently initiating rapid relative movement between said bill and said magnetic head while said bill and said magnetic head are spaced apart, increasing the speed of relative movement between said bill and said magnetic head to a predetermined value while said bill and said magnetic head are still spaced apart, magnetizing one of said two magnetic elements while the first said magnetic element of said bill and said second magnetic element of said magnetic head are in register with each other, causing the first said magnetic element of said bill and said second magnetic element of said magnetic head to directly engage each other along a predetermined path across the said magnetic area of said bill while said one of said two magnetic elements is magnetized and thereby change the magnetic flux in and adjacent to said second magnetic element of said magnetic head, said magnetic element of said bill and said second magnetic element of said magnetic head directly engaging each other while the speed of relative movement between said bill and said magnetic head is at said predetermined value to cause said changes in the magnetic flux in and adjacent to said second magnetic element of said magnetic head to generate voltage variations in said electrical conductor associated with said piece of magnetic material of said magnetic head, applying pressure to said bill and to said magnetic head in a direction transverse of the direction of said relative movement between said bill and said magnetic head to hold the first said magnetic element of said bill and said second magnetic element of said magnetic head in direct and intimate engagement during said relative movement between said bill and said magnetic head and thereby minimize the magnetic reluctance between them, so that the said magnetic field is caused to pass through the said two magnetic elements despite weakness in the magnetic material on the currency, said voltage variations in said electrical conductor associated with said piece of magnetic material of said magnetic head corresponding in pattern to the variations of magnetic properties along the said predetermined path across the currency, using said voltage variations to initiate a controlled cyclic growth of current, effecting acceptance of said bill if said controlled cyclic growth of current attains a predetermined minimum value, but rejecting said bill if said controlled cyclic growth of current does not attain said predetermined minimum value.

18. The method of separating spurious currency from authentic currency every true example of which has a first magnetic element consisting of an area on the face of the currency having magnetic material arranged to provide variations of magnetic properties in a particular predetermined pattern along a certain path across the said area, which magnetic properties may be weak; the method comprising: initially disposing a bill in spaced apart relation with a magnetic head which has a second magnetic element consisting of a piece of magnetic material and an electrical conductor associated with the piece of magnetic material subsequently initiating rapid relative movement between said bill and said magnetic head while said bill and said magnetic head are spaced apart, increasing the speed of relative movement between said bill and said magnetic head to a predetermined value while said bill and said magnetic head are still spaced apart, magnetizing one of said two magnetic elements while the first said magnetic element of said bill and said second magnetic element of said magnetic head are in register with each other, causing the first said magnetic element of said bill and said second magnetic element of said magnetic head to directly engage each other along a predetermined path across the said magnetic area of said bill while said one of said two magnetic elements is magnetized and thereby change the magnetic flux in and adjacent to said second magnetic element of said magnetic head, said magnetic element of said bill and said second magnetic element of said magnetic head directly engaging each other while the speed of relative movement between said bill and said magnetic head is at said predetermined value to cause said changes in the magnetic flux in adjacent to said second magnetic element of said magnetic head to generate voltage variations in said electrical conductor associated with said piece of magnetic material of said magnetic head, applying pressure to said bill and to said magnetic head in a direction transverse of the direction of said relative movement between said bill and said magnetic head to hold the first said magnetic element of said bill and said second magnetic element of said magnetic head in direct and intimate engagement during said relative movement between said bill and said magnetic head and thereby minimize the magnetic reluctance between them, so that the said magnetic field is caused to pass through the said two magnetic elements despite weakness in the magnetic material on the currency, said voltage variations in said electrical conductor associated with said piece of magnetic material of said magnetic head corresponding in pattern to the variations of magnetic properties along the said predetermined path across the currency, amplifying said voltage variations in said electrical conductor associated with said piece of magnetic material of said magnetic head, limiting the resulting amplified voltage variations, using the consequent amplified and limited voltage variations to initiate a controlled cyclic growth of current, effecting acceptance of said bill if said controlled cyclic growth of current attains a predetermined minimum value, but rejecting said bill if said controlled cyclic growth of current does not attain said predetermined minimum value, the amplitude of each amplified and limited voltage variation being too small by itself to cause said cyclic current to attain said predetermined value, whereby bills that do not produce voltage variations which will provide a cyclic growth of current that reaches said predetermined value will be rejected.

19. Apparatus for identifying authentic paper currency every true example of which has a first magnetic element consisting of an area on the face of the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element, means for supporting the currency that permits said currency to engage said piece of magnetic material of said magnetic head during relative movement of said magnetic head and said currency, at least one of the two magnetic elements being magnetized to produce a magnetic field in it and adjacent to it, means for producing relative movement of the currency supporting means and the magnetic head to cause said second magnetic element to move at a predetermined speed along a predetermined path across the said magnetic area of the currency, said motion-producing means including means to dispose the magnetic area of the first said magnetic element in direct engagement with said piece of magnetic material of said second magnetic element during said movement to minimize the magnetic reluctance between them, so that the said magnetic field is caused to pass through the said two magnetic elements despite weakness in the magnetic material on the currency, and so variations in the flux in the said piece of magnetic material of the said second magnetic element are produced that cause generation of voltages in the said conductor that have variations corresponding in pattern to the variations of magnetic properties along the said predetermined path across the currency, means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations, said last-named means including a limiter that limits the amplitude of said voltage variations and including a control element that can actuate an accept-reject device and including a frequency selective circuit that can respond to limited voltage variations having variations corresponding in pattern to the variations of magnetic properties along the said predetermined path across authentic currency to cause said control element to actuate said accept-reject device and thereby accept said currency.

20. Apparatus for identifying authentic paper currency every true example of which has a first magnetic element consisting of an area on the surace of the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element, means for supporting the currency that permits said currency to engage said piece of magnetic material of said magnetic head during relative movement of said magnetic head and said currency, at least one of the two magnetic elements being magnetized to produce a magnetic field in it and adjacent to it, means for producing relative movement of the currency supporting means and the magnetic head to cause said second magnetic element to move at a predetermined speed along a predetermined path across the said magnetic area of the currency, said motion-producing means including means to dispose the magnetic area of the first said magnetic element in direct engagement with said piece of magnetic material of said second magnetic element during said movement to minimize the magnetic reluctance between them, so that the said magnetic field is caused to pass through the said two magnetic elements despite weakness in the magnetic material on the currency, and so variations in the flux in the said piece of magnetic material of the said second magnetic element are produced that cause generation of voltages in the said conductor that have variations corresponding in pattern to the variations of magnetic properties along the said predetermined path across the currency, means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations, said last-named means including a control element that can actuate an accept-reject device and also including a resonant circuit, said resonant circuit responding to the particular pattern of voltage variations produced in the conductor by relative movement of authentic currency and the magnetic head to experience a cyclic growth in the current therein, said resonant circuit causing said control element to actuate said accept-reject device and thereby effect acceptance of said currency if the cyclic growth of the current therein causes said current to attain a predetermined value.

21. The method of separating spurious currency from authentic currency every true example of which has a first magnetic element consisting of an area on the face of the currency having magnetic material arranged to provide variations of magnetic properties in a particular predetermined pattern along a certain path across the said area, which magnetic properties may be weak; the method comprising: initially disposed a bill in spaced apart relation with a magnetic head which has a second magnetic element consisting of a piece of magnetic material and an electrical conductor associated with the piece of magnetic material subsequently initiating a rapid relative movement between said bill and said magnetic head while said bill and said magnetic head are spaced apart, increasing the speed of relative movement between said bill and said magnetic head to a predetermined value while said bill and said magnetic head are still spaced apart, magnetizing one of said two magnetic elements while the first said magnetic element of said bill and said second magnetic element of said magnetic head are in register with each other, causing the first said magnetic element of said bill and said second magnetic element of magnetic head to directly engage each other along a predetermined path across the said magnetic area of said bill while said one of said two magnetic elements is magnetized and thereby change the magnetic flux in and adjacent to said second magnetic element of said magnetic head, said magnetic element of said bill and said second magnetic element of said magnetic head directly engaging each other while the speed of relative movement between said bill and said magnetic head is at said predetermined value to cause said changes in the magnetic flux in and adjacent to said second magnetic element of said magnetic head to generate voltage variations in said electrical conductor associated with said piece of magnetic material of said magnetic head, applying pressure to said bill and to said magnetic head in a direction transverse of the direction of said relative movement between said bill and said magnetic head to hold the first said magnetic element of said bill and said second magnetic element of said magnetic head in direct and intimate engagement during said relative movement between said bill and said magnetic head and thereby minimize the magnetic reluctance between them, so that the said magnetic field is caused to pass through the said two magnetic elements despite weakness in the magnetic material on the currency, said voltage variations in said electrical conductor associated with said piece of magnetic material of said magnetic head corresponding in pattern to the variations of magnetic properties along the said predetermined path across the currency, said particular predetermined pattern along said predetermined path across said area on said face of said bill having a number of discrete and spaced-apart pattern elements, sensing said voltage variations in said electrical conductor associated with said piece of magnetic material of said magnetic head corresponding in pattern to the variations of magnetic properties provided along said predetermined path across said area on said face of said bill by said discrete and spaced-apart pattern elements, effecting acceptance of said bill if a predetermined minimum number of said voltage variations in said electrical conductor associated with said piece of magnetic material of said magnetic head corresponding to a predetermined number of discrete and spaced-apart pattern elements is sensed, but rejecting said bill if a predetermined minimum number of said voltage variations in said electrical conductor associated with said piece of magnetic material of said magnetic head corresponding to a predetermined number of discrete and spaced-apart pattern elements is not sensed.

22. Apparatus for identifying authentic paper currency every true example of which has a first magnetic element consisting of an area on the face the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element, means for supporting the currency that permits said currency to engage said piece of magnetic material of said magnetic head during relative movement of said magnetic head and said currency, at least one of the two magnetic elements being magnetized to produce a magnetic field in it and adjacent to it, means for producing relative movement of the currency supporting means and the mangetic head to cause said second magnetic element to move at a predetermined speed along a predetermined path across the said magnetic area of the currency, said motion-producing means including means to dispose the magnetic area of the first said magnetic element in direct engagement with said piece of magnetic material of said second magnetic element during said movement to minimize the magnetic reluctance between them, so that the said magnetic field is caused to pass through the said two magnetic elements despite weakness in the magnetic material on the currency, and so variations in the flux in the said piece of magnetic material of the said second magnetic element are produced that cause generation of voltages in the said conductor that have variations corresponding in pattern to the variations of magnetic properties along the said predetermined path across the currency, means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations, said last-named means including a control element that can be actuated to effect acceptance of said currency, said last-named means including a sub-circuit that is adapted to actuate said control element but that can not be caused, by said particular pattern of voltage variations produced in the conductor by relative movement of authentic currency and the magnetic head, to actuate said control element unless said voltage variations have a predetermined minimum amplitude, whereby said sub-circuit will reject currency that does not have a predetermined minimum intensity of magnetic properties in said area on said face thereof, said last-named means including a second sub-circuit that will keep the first said sub-circuit from actuating said control element in the event the voltage variations produced in the conductor by relative movement of currency and said magnetic head exceed a predetermined maximum amplitude, whereby said sub-circuit will reject currency that has an intensity of magnetic properties in said area on said face thereof which exceeds a predetermined maximum intensity.

23. Apparatus for identifying authentic paper currency every true example of which has a first magnetic element consisting of an area on the face of the currency having magnetic material arranged to provide variations of magnetic properties in a particular predetermined pattern along a certain path across the said area, which magnetic properties may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element, means for supporting the currency that permits said currency to engage said piece of magnetic material of said magnetic head during relative movement of said magnetic head and said currency, at least one of the two magnetic elements being magnetized to produce a magnetic field in it and adjacent to it, means for producing relative movement of the currency supporting means and the magnetic head to cause said second magnetic element to move at a predetermined speed along a predetermined path across the said magnetic area of the currency, said motion-producing means including means to dispose the magnetic area of the first said magnetic element in direct engagement with said piece of magnetic material of said second magnetic element during said movement to minimize the magnetic reluctance between them, so that the said magnetic field is caused to pass through the said two magnetic elements despite weakness in the magnetic material on the currency, and so variations in the flux in the said piece of magnetic material of the said second magnetic element are produced that cause generation of voltages in the said conductor that have variations corresponding in pattern to the variations of magnetic properties along the said predetermined path across the currency, means connected with the electrical conductor of the magnetic head operable to produce an indication of authentic currency, the last said means being responsive to the particular pattern of voltage variations produced in the conductor by relative movement of authentic currency and the magnetic head, as aforesaid, said last-named means being inoperable to produce said indication in response to substantially different patterns of voltage variations, said particular predetermined pattern along said certain path across the said area on said face of said currency consisting of the vertically-directed grid lines and opposite sides of the portrait on said currency, said last-named means responding to the vertically directed grid lines at the leading side of said portrait to provide a first signal, said last-named means responding to the vertically directed grid lines at the trailing side of said portrait to provide a second signal, and an accept-reject device that can effect acceptance of said currency only if said last-named means provides the first said and said second signal.

24. Apparatus for identifying authentic paper currency every true example of which has an area on the face thereof with metallic ink arranged to provide variations of metallic properties in a particular predetermined pattern along a certain path across the said area, which metallic properties may be weak, the apparatus comprising: a base, a magnetic head on the base, said magnetic head having a magnetic element consisting of a piece of magnetic material and an electrical conductor associated with the piece of magnetic material, in which voltage variations may be produced by changes in magnetic flux in and adjacent said magnetic element, said magnetic element having an air gap therein, bill-gripping members for supporting said currency that are movable relative to said magnetic head to cause said currency to engage said piece of magnetic material of said magnetic head, said magnetic head being biased to produce a magnetic field in it and adjacent to it, a motor to move said bill-gripping members relative to said magnetic head to cause a predetermined path across said metallic area on said face of said currency to move past said air gap of said magnetic head at a predetermined speed, a member in register with said air gap in said magnetic element of said magnetic head, said member and said magnetic element of said magnetic head permitting said currency to pass therebetween but applying pressure to said currency while it passes between them to hold said metallic face of said currency immediately adjacent said air gap in said magnetic element of said magnetic head to minimize the magnetic reluctance of said air gap of said magnetic element of said magnetic head, so that the said magnetic field is caused to pass through said metallic material on the face of said currency, and so variations in the flux in the said piece of magnetic material of the said magnetic element are produced that cause generation of voltages in the said conductor that have variations corresponding in pattern to the variations of metallic properties along the said predetermined path across the currency, and a circuit connected with the electrical conductor of the magnetic head operable to produce an indication of authentic currency, said circuit being responsive to the particular pattern of voltage variations produced in the conductor by relative movement of authentic currency and the magnetic head, as aforesaid, said circuit being inoperable to produce said indication in response to substantially different patterns of voltage variations, said bill-gripping members being movable in one direction along a fixed path to move said currency into engagement with said magnetic head and thereby cause said magnetic head and said circuit to sense the authenticity of said currency, said motor moving said bill-gripping members in said one direction, said bill-gripping members initially gripping said currency when said currency is introduced into said apparatus and thereafter gripping and holding said currency until said currency has engaged said magnetic head and has been sensed by said magnetic head and said circuit, said bill-gripping members subsequently freeing said currency adjacent an outlet of said apparatus if the variations in the flux in said piece of magnetic material cause voltage variations in said conductor that correspond in patterns to the variations of metallic properties along the said predetermined path across authentic currency, said bill-gripping members gripping said currency and moving said currency back in the opposite direction along said fixed path toward the inlet opening of said apparatus if the variations in the flux in said piece of magnetic material do not cause voltage variations in said conductor that correspond in pattern to the variations of metallic properties along the said predetermined path across authentic currency.

25. Apparatus for identifying authentic paper currency and for distinguishing between two individually different denominations of said authentic paper currency wherein every true example of authentic paper currency of one of said denominations has a first magnetic element consisting of an area on the face of said currency having magnetic material arranged to provide variations of magnetic properties in a particular predetermined pattern along a certain path across the said area and wherein every true example of authentic paper currency of another of said denominations has a first magnetic element consisting of an area on the face of said currency having magnetic material arranged to provide variations of magnetic properties in distinctively different pattern along a certain path across the said area, which magnetic properties on both of said denominations of paper currency may be weak, the apparatus comprising: a base, a magnetic head on the base, said magnetic head having a second magnetic element consisting of a piece of magnetic material and an electrical conductor associated with the piece of magnetic material, in which voltage variations may be produced by changes in magnetic flux in and adjacent the second magnetic element; means for supporting the currency of either denomination that permits said first magnetic element of said currency to engage said second magnetic element of said magnetic head during relative movement of said magnetic head and said currency, at least one of said engaging magnetic elements being magnetized to produce a magnetic field in it and adjacent to it, means for producing relative movement of the currency supporting means and the magnetic head to cause said second magnetic element to move at a predetermined speed along a predetermined path across the said magnetic area of the currency, said motion-producing means including means to dispose the magnetic area of the first said magnetic element in intimate engagement with said piece of magnetic material of said second magnetic element during said movement to minimize the magnetic reluctance between them, so that the said magnetic field is caused to pass through the said two engaging magnetic elements despite weakness in the magnetic material on the currency, and so variations in the flux in the said piece of magnetic material of the said second magnetic element are produced that cause generation of voltages in the said conductor that have variations corresponding in pattern to the variations of magnetic properties along the said predetermined path across said currency, the variations in the flux in said piece of magnetic material of said second magnetic element and the consequent voltage variations in said conductor when said one denomination of currency engages said piece of magnetic material of said second magnetic element being distinguishable from the variations in the flux in said piece of magnetic material of said second magnetic element and the consequent voltage variations in said conductor when said other denomination of currency engages said piece of magnetic material of said second magnetic element, means connected with the electrical conductor of the magnetic head operable to produce an indication of authentic currency of said one denomination and also being operable to produce an indication of authentic currency of said other denomination, the last-named means being selectively responsive to the individually different patterns of voltage variations produced in the conductor by relative movement of authentic currency of said one and said other denominations and said magnetic head, said last-named means being inoperable to produce an indication of authentic currency in response to patterns of voltage variations substantially different from the patterns of voltage variations produced in the conductor by relative movement of authentic currency of said one and said other denominations and said magnetic head.

References Cited by the Examiner

UNITED STATES PATENTS

| | | | |
|---|---|---|---|
| 2,731,621 | 1/1956 | Sontheimer. | |
| 2,895,014 | 7/1959 | Johnson | 340—174.1 X |
| 2,950,799 | 8/1960 | Timms | 209—75 X |
| 2,957,387 | 10/1960 | Patzer | 209—111.7 X |
| 2,961,649 | 11/1960 | Eldridge | 340—146.3 |
| 2,995,976 | 8/1961 | Weingart. | |
| 3,004,110 | 10/1961 | Schutze | 179—100.2 |
| 3,011,152 | 11/1961 | Eckdahl | 340—146.3 |

M. HENSON WOOD, Jr., *Primary Examiner.*

ROBERT B. REEVES, *Examiner.*